US011567547B2

(12) United States Patent
Andre et al.

(10) Patent No.: US 11,567,547 B2
(45) Date of Patent: Jan. 31, 2023

(54) COMPUTER TOWER ARCHITECTURE

(71) Applicant: Apple Inc., Cupertino, CA (US)

(72) Inventors: Bart K. Andre, Palo Alto, CA (US); Joel D. Barrera, San Jose, CA (US); Houtan R. Farahani, San Ramon, CA (US); Jerzy S. Guterman, Sunnyvale, CA (US); Richard P. Howarth, San Francisco, CA (US); Mariel L. Lanas, Palo Alto, CA (US); Son C. Le, Sunnyvale, CA (US); Michael D. McBroom, Leander, TX (US); Rodrigo Dutervil Mubarak, Austin, TX (US); Sabrina K. Paseman, Saratoga, CA (US); Chentian Zhu, San Jose, CA (US); James M. Cuseo, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/586,814

(22) Filed: Sep. 27, 2019

(65) Prior Publication Data

US 2020/0379522 A1    Dec. 3, 2020

Related U.S. Application Data

(60) Provisional application No. 62/855,748, filed on May 31, 2019.

(51) Int. Cl.
*H01Q 1/24* (2006.01)
*G06F 1/18* (2006.01)
(Continued)

(52) U.S. Cl.
CPC ............... *G06F 1/182* (2013.01); *G06F 1/20* (2013.01); *H01Q 1/2266* (2013.01); *H01Q 5/30* (2015.01); *H01Q 1/2291* (2013.01)

(58) Field of Classification Search
CPC ........... G06F 1/182; G06F 1/183; G06F 1/20; H01Q 1/22; H01Q 1/2266; H01Q 1/2291;
(Continued)

(56) References Cited

U.S. PATENT DOCUMENTS 4,926,291 A    5/1990  Sarraf
5,432,674 A *  7/1995  Hardt .................. G06F 1/20
                                                361/688

(Continued)

FOREIGN PATENT DOCUMENTS

JP    2005071820 A    3/2005
KR    100928399 B1    11/2009

*Primary Examiner* — Tho G Phan
(74) *Attorney, Agent, or Firm* — Dorsey & Whitney LLP

(57) ABSTRACT

A housing for an electronic device can include a body having an exterior surface and a second surface disposed opposite the exterior surface at least partially defining an interior volume, the body defining a first repeating pattern of apertures extending from the exterior surface to the second surface. The housing can also include a component defining a second repeating pattern of apertures, the component positioned adjacent to the second surface. The first repeating pattern of apertures and the second repeating pattern of apertures can combine to define an open area of at least about 70%.

9 Claims, 32 Drawing Sheets

(51) Int. Cl.
*G06F 1/20* (2006.01)
*H01Q 5/30* (2015.01)
*H01Q 1/22* (2006.01)

(58) Field of Classification Search
CPC .......... H01Q 1/24; H01Q 5/30; H01Q 13/10; H01Q 1/44; H01Q 5/37; H01Q 5/378
See application file for complete search history.

(56) References Cited

U.S. PATENT DOCUMENTS

| | | | |
|---|---|---|---|
| 5,955,955 A * | 9/1999 | Corcoran, Jr. | G06F 1/206 |
| | | | 340/607 |
| 6,134,107 A * | 10/2000 | Kerrigan | G06F 1/181 |
| | | | 165/80.2 |
| 6,462,944 B1 * | 10/2002 | Lin | G06F 1/181 |
| | | | 165/80.3 |
| 6,646,867 B1 * | 11/2003 | Tuttle | G06F 1/182 |
| | | | 174/16.1 |
| 7,134,887 B1 | 11/2006 | Keely | |
| 8,926,414 B1 * | 1/2015 | Kirkpatrick | G06F 1/20 |
| | | | 454/184 |
| 2002/0193015 A1 | 12/2002 | Milan | |
| 2004/0211778 A1 | 10/2004 | Lien et al. | |
| 2005/0135075 A1 * | 6/2005 | Deng | G06F 1/181 |
| | | | 361/797 |
| 2006/0133059 A1 | 6/2006 | Dean et al. | |
| 2006/0267547 A1 | 11/2006 | Godovich | |
| 2009/0038783 A1 | 2/2009 | Chen | |
| 2009/0195976 A1 | 8/2009 | Chang | |
| 2010/0151733 A1 | 6/2010 | Tsou | |
| 2014/0361671 A1 | 12/2014 | Degner et al. | |
| 2019/0329973 A1 | 10/2019 | Chabot | |

* cited by examiner

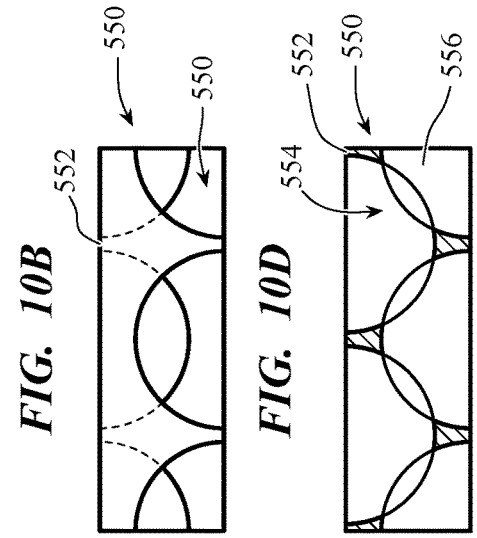
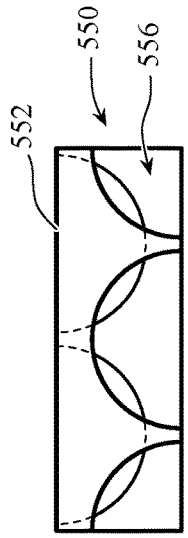
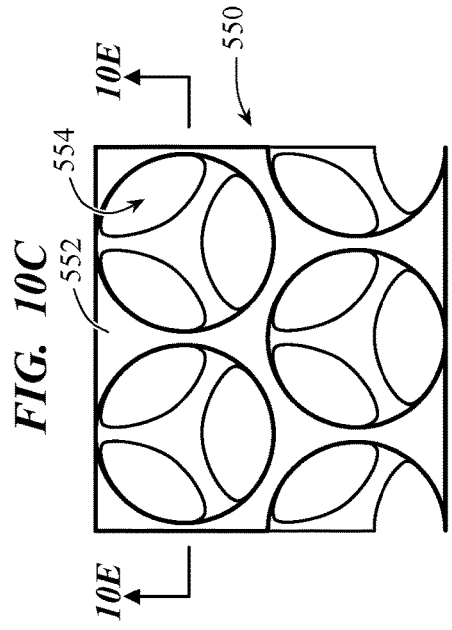
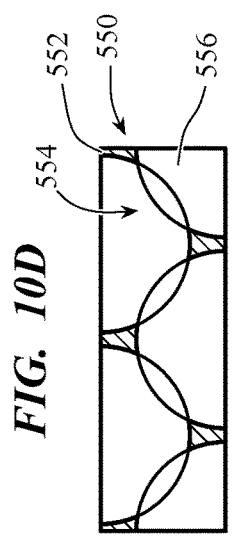
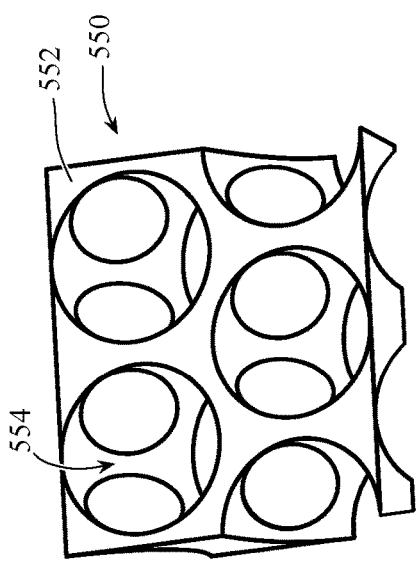
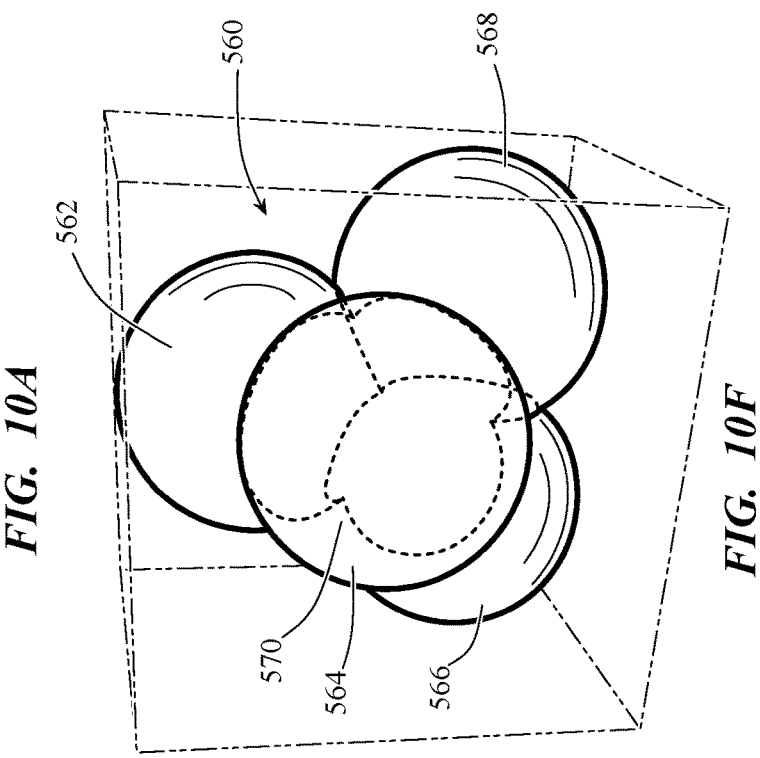

COMPUTER TOWER ARCHITECTURE

CROSS-REFERENCE TO RELATED APPLICATION(S)

This claims priority to U.S. Provisional Patent Application No. 62/855,748, filed 31 May 2019, entitled "COMPUTER TOWER ARCHITECTURE," the entire disclosure of which is hereby incorporated by reference.

FIELD

The described embodiments relate generally to enclosures. More particularly, the present embodiments relate to enclosures for electronic devices.

BACKGROUND

The components of an electronic device, for example, the processors, memory, and cooling apparatuses can partially determine a level of performance of the electronic device. The arrangement of these components relative to one another in the device, however, can also determine the level of performance of the electronic device.

Continued advances in electronic devices and their components have enabled considerable increases in performance. Existing components and structures for electronic devices can, however, limit the levels of performance of such devices. For example, an existing electronic device housing can limit the performance of an electronic device due to an inability to effectively distribute or remove heat generated by the components of the electronic device to the surrounding environment. Further, the components and their arrangement can also impact other properties of the device, such as the ability for a user to easily access and replace one or more of the components, the amount of noise generated by the device, the modularity and configurability of the device, and the cost of manufacturing the device. Consequently, further tailoring and arrangement of components for electronic devices to provide additional or enhanced functionality, without introducing or increasing undesirable device properties, can be desirable.

SUMMARY

According to one aspect of the present disclosure, a housing for an electronic device can include a body having an exterior surface and a second surface disposed opposite the exterior surface, the second surface at least partially defining an interior volume. The body defines a first repeating pattern of apertures extending therethrough from the exterior surface to the second surface, and a component defines a second repeating pattern of apertures extending therethrough, the component positioned substantially adjacent to the second surface in the interior volume. The first repeating pattern of apertures and the second repeating pattern of apertures can combine to define an open area of at least about 70%.

In some examples, the first repeating pattern of apertures defined by the body and the second repeating pattern of apertures defined by the component can reduce electromagnetic emissions therethrough by at least about 5, 10, 20, 30, or even more dBµV for frequencies between about 2 GHz and about 5 GHz. The body can define the first repeating pattern of apertures as a continuous matrix of passageways. The first repeating pattern of apertures and the second repeating pattern of apertures can combine to define an open area of between about 75% and about 85%. The component can be bonded to the second surface by a pressure sensitive adhesive. The component can be a substantially planar sheet of material having a thickness of about 3 mm. The component can define the second repeating pattern of apertures as a pattern of substantially circular apertures, each having a diameter of greater than about 2 mm.

According to some other aspects of the disclosure, an electronic device can include a housing defining an exterior surface including a recess, a port configured to receive and engage with a corresponding connector of a cable, and a component removably attachable to the housing to define an aperture sized to allow the cable to pass therethrough. The component can include a body, a pin sized to engage with the recess in the exterior surface to removably attach the component to the housing, the pin being at least partially retractable into the body when the body is removed from the housing. The aperture can be positioned relative to the port such that the cable is held at an angle of at least about 5°, 10°, 15°, 20°, or 30° or more relative to the connector when the connector is engaged with the port and the cable passes through the aperture.

In some examples, the component can further include a pin magnet that exerts an attractive force on the pin. The housing can include a housing magnet disposed substantially adjacent to the recess, the housing magnet exerting an attractive force on the pin stronger than the attractive force exerted by the component magnet to move the pin away from the body. The exterior can include a second recess, and the component can include a second pin sized to engage with the second recess to removably attach the component to the housing, the second pin being at least partially retractable into the body when the body is removed from the housing. The aperture can be oriented orthogonal to a direction of insertion of the connector into the port. The component can include a protrusion configured to engage with a portion of the housing to prevent removal of the component by a force exerted on the component in a direction parallel to a direction of insertion of the connector into the port. The component can be removable from the housing by exerting a force on the component in a direction orthogonal to the direction of insertion of the connector into the port.

According to some other aspects of the disclosure, a housing for an electronic device can include a body at least partially defining an exterior surface and an internal volume. The body can further define a cavity in a top portion of the exterior surface, a first antenna disposed in a first half of the cavity, a second antenna disposed in a second half of the cavity and oriented parallel and in line with the first antenna in the cavity, and an insert disposed in the cavity and extending substantially an entire length and width thereof. The first and second antenna disposed in the cavity can each be a dual-band antenna. The insert can overlie the first and second dual-band antennas and can define a first central slot aligned with the length of the cavity and can be positioned approximately at a midpoint of the width in the first half of the cavity that can be configured to allow electromagnetic radiation with a frequency of about 5 GHz to pass therethrough. The insert can also define a second central slot aligned with the length of the cavity and positioned approximately at a midpoint of the width in the second half of the cavity that can be configured to allow electromagnetic radiation with a frequency of about 5 GHz to pass therethrough. Moreover, a first pair of edge slots can be aligned with the first central slot and positioned along a perimeter of the insert in the first half of the cavity, the first pair of edge slots can be configured to allow electromagnetic radiation with a frequency of about 2.4 GHz to pass therethrough, and a second pair of edge slots can be aligned with the second central slot and can be positioned along the perimeter of the insert in the second half of the cavity, the second pair of edge slots can be configured to allow electromagnetic radiation with a frequency of about 2.4 GHz to pass therethrough.

In some examples, the housing can further include a seal including a material transparent to electromagnetic radiation having a frequency of greater than 2.4 GHz, the seal can be positioned in the cavity and can occlude the first central slot, the second central slot, the first pair of edge slots, and the second pair of edge slots. The cavity can have a depth of less than about 10 mm. The cavity can have a length and a width. The housing can further include a handle having a length and a width substantially similar to the length and the width of the cavity, the handle overlying the cavity. The body can further define a second cavity in the top portion of the exterior surface oriented parallel to the first cavity, the cavity further including a third dual-band antenna disposed in a first half of the second cavity, a fourth dual-band antenna disposed in a second half of the second cavity and oriented parallel and in line with the third dual-band antenna in the second cavity, a second insert disposed in the second cavity and extending substantially an entire length and width thereof. The second insert can overlie the third and fourth dual-band antennas and can define a third central slot aligned with the length of the second cavity and can be positioned approximately at a midpoint of the width in the first half of the second cavity and can be configured to allow electromagnetic radiation with a frequency of about 5 GHz to pass therethrough. The second insert can also define a fourth central slot aligned with the length of the second cavity and positioned approximately at a midpoint of the width in the second half of the second cavity that can be configured to allow electromagnetic radiation with a frequency of about 5 GHz to pass therethrough. Moreover, a third pair of edge slots can be aligned with the third central slot and can be positioned along a perimeter of the second insert in the first half of the second cavity, the third pair of edge slots can be configured to allow electromagnetic radiation with a frequency of about 2.4 GHz to pass therethrough, and a fourth pair of edge slots can be aligned with the fourth central slot and can be positioned along the perimeter of the second insert in the second half of the second cavity, the fourth pair of edge slots can be configured to allow electromagnetic radiation with a frequency of about 2.4 GHz to pass therethrough.

According some other aspects of the present disclosure, an electronic device can include a frame defining a space configured to receive a power supply unit, and a sleeve defining an internal volume sized to surround the frame, the sleeve being slidably removable from the frame, and the sleeve further defining an opening sized to receive an alternating current (AC) inlet of the power supply unit and expose the AC inlet to an exterior environment. The electronic device can also include a power supply unit including a body defining an exterior surface and an internal volume of the power supply unit and a contact to electrically connect the power supply unit to one or more electronic components of the electronic device to provide direct current (DC) power thereto. The AC inlet can be electrically connected to the contact and mechanically connected to the body by an arm within the internal volume of the power supply such that the AC inlet can be configured to move at least about 0.3 mm in two or more axes relative to the body of the power supply unit.

In some examples, the body of the power supply unit can include aluminum. The body of the power supply unit can have an approximately rectangular prismatic shape and can include a first component that defines a top exterior surface, a bottom exterior surface, and a first side exterior surface and a second component that defines a front exterior surface, a back exterior surface, and a second side exterior surface disposed opposite the first side exterior surface. The sleeve can further include a grounding member including an elongated body, a first set of arms extending from a first side of the body, and a second set of arms extending from a second side of the body opposite the first side, wherein the first set of arms and the second set of arms are offset from one another so that an arm of the second set is positioned between two arms of the first set when the first set of arms and the second set of arms are folded over the body. Each of the arms of the first set and the second set can be configured to act as a leaf spring when folded over the body to provide electrical grounding to the electronic device. The electronic device can further include a modular component including a processor and an attachment feature, wherein the frame further defines a space configured to receive the modular component. A clamp plate including an aperture, and an attachment member sized to extend at least partially through the aperture of the clamp plate can be configured to engage with the attachment feature of the modular component to retain the modular component in the space.

The sleeve can define a recess in a top surface thereof and can further include a handle affixed to the sleeve in the recess, the handle being moveable between a first stable position wherein the handle is disposed substantially entirely within the recess and substantially below the top surface of the sleeve, and a second stable position wherein the handle extends away from the top surface of the sleeve and is configured to be grabbed by a user. The handle can be rotatable with respect to the sleeve in the second stable position, wherein rotating the handle in the second stable position decouples the sleeve from the frame to allow the user to slidably remove the sleeve therefrom. The frame can define a slot including a first slot end and a second slot end positioned higher than the first slot end, and the handle connected to a pin configured to engage with a slot, wherein rotating the handle in the second stable position moves the pin from the first slot end to the second slot end such that the sleeve moves a distance relative to the frame corresponding to a difference in height between the first slot end and the second slot end. The sleeve can further include an input component positioned at a top surface thereof and connected to an electrical contact affixed to the sleeve, wherein the electrical contact is configured to engage with a corresponding electrical contact affixed to the frame such that an input detected by the input component at least partially determines whether the power supply unit provides power to the one or more electronic components. The sleeve can further include an indicator positioned at the top surface thereof, the indicator configured to provide a visible indicia of whether the power supply unit is providing power to the one or more electronic components. The frame can include one or more perforated plates disposed substantially adjacent to the one or more components of the electronic device and the power supply, wherein the sleeve cooperates with the one or more perforated plates to define an exterior surface of the electronic device and the one or more perforated plates allow airflow into the internal volume. The electronic device can further include one or more casters affixed to the frame and configured to physically support the electronic device, the one or more casters each including a ball bearing assembly and defining an aperture through a central portion thereof. The electronic device can include four casters affixed to a bottom portion of the frame. The frame can include a substantially hollow tubular portion extending substantially an entire height of the frame, the hollow tubular portion including an aperture in a sidewall thereof. A retaining component can be disposed within the hollow tubular portion and affixed thereto. An attachment member can be retained in the hollow tubular portion by the retaining component. The fixing member can be accessible by the aperture and can be configured to extend out of the hollow tubular member through an end portion thereof to be received by and to engage with a corresponding attachment feature of a component disposed substantially adjacent to the hollow tubular member.

According to some other aspects of the disclosure, an electronic device can include a processor, a backplate underlying the processor and defining a backplate aperture, a lifter defining a lifter aperture, the lifter disposed over the backplate and positioned substantially adjacent to an edge of the processor such that the lifter aperture is aligned with the backplate aperture. The lifter can further define an attachment feature configured to receive an attachment member. A spring can underlie the backplate and can be in line with the backplate aperture. The spring can be coupled to the backplate and the lifter by a retaining member passing through the spring, the backplate aperture, and the first lifter aperture. A heatsink assembly can overlie the processor and can include an attachment member, the heatsink assembly being coupled to the lifter by the attachment member engaging with the attachment feature. The backplate, the first lifter, and the second lifter can exert at least about 400 N on the processor through the heatsink assembly.

In some examples, the backplate can further define a second aperture and can further include a second lifter defining a second lifter aperture, the second lifter can be disposed over the backplate and can be positioned substantially adjacent to an edge of the processor opposite the first lifter such that the second lifter aperture is aligned with the second aperture. The second lifter can further define a second attachment feature configured to receive a second attachment member and a second spring underlying the backplate and in line with the second aperture. The second spring can be coupled to the backplate and the second lifter by a second retaining member passing through the second spring, the second aperture, and the second lifter aperture, wherein the heatsink assembly is coupled to the second lifter by the second attachment member engaging with the second attachment feature.

According to some aspects of the disclosure, an electronic device can include a frame configured to receive and support one or more electronic components and a shell defining an internal volume sized to surround the frame and the one or more electronic components, wherein the sleeve is slidably removable from the frame. An electronic component can be positioned within the internal volume and can include an aperture. A sealing member including a seal body can at least partially surround the electronic component. The sealing member can include a compressible lip extending from the seal body, wherein the lip can be oriented with respect to the seal body such that the shell compresses the lip in a direction against the seal body at a first position adjacent to the electronic component and in the direction against the seal body at a second position adjacent to the electronic component opposite the first position. Furthermore, the electronic component and the sealing member can divide the internal volume into a first zone and a second zone that are fluidically isolated, except at the aperture.

In some examples, the seal body can include a top portion located above the electronic component, a bottom portion located below the electronic component, and two side portions connecting the top portion to the bottom portion to define an aperture. The lip can extend from the seal body along substantially all of the top portion and all of the bottom portion such that the lip is compressible against the seal body in a same direction along the top portion and the bottom portion. The electronic component can include a main logic board having a first surface including a processor disposed thereon, and a second surface opposite the first surface including a memory component disposed thereon. A cover can be included on the electronic component, the cover being movable between a closed position overlying and substantially surrounding the memory component and an open position exposing the memory component. A latch can be coupled to the cover and can be movable between a first position and a second position. The latch can be configured to secure and retain the cover in the closed position when in the first position, wherein moving the latch to the second position allows the cover to move to the open position and includes a visible indicia to indicate the cover is in the open position. The latch can include a spring configured to force the cover into the open position when the latch is moved to the second position. The cover can be configured to direct airflow entering the internal volume over the memory component.

BRIEF DESCRIPTION OF THE DRAWINGS

The disclosure will be readily understood by the following detailed description in conjunction with the accompanying drawings, wherein like reference numerals designate like structural elements, and in which:

FIG. 10A illustrates a perspective view of a portion of a structure of a component of FIG. 9.

FIG. 10B illustrates a top view of the portion of a structure.

FIG. 10C illustrates a rear view of the portion of the structure of FIG. 10B.

FIG. 10D illustrates a front view of the portion of the structure of FIG. 10B.

FIG. 10E illustrates a cross-sectional view of the portion of the structure of FIG. 10B.

FIG. 10F illustrates a perspective view of the spherical recesses of the structure of FIG. 10B.

DETAILED DESCRIPTION

Figure 1:
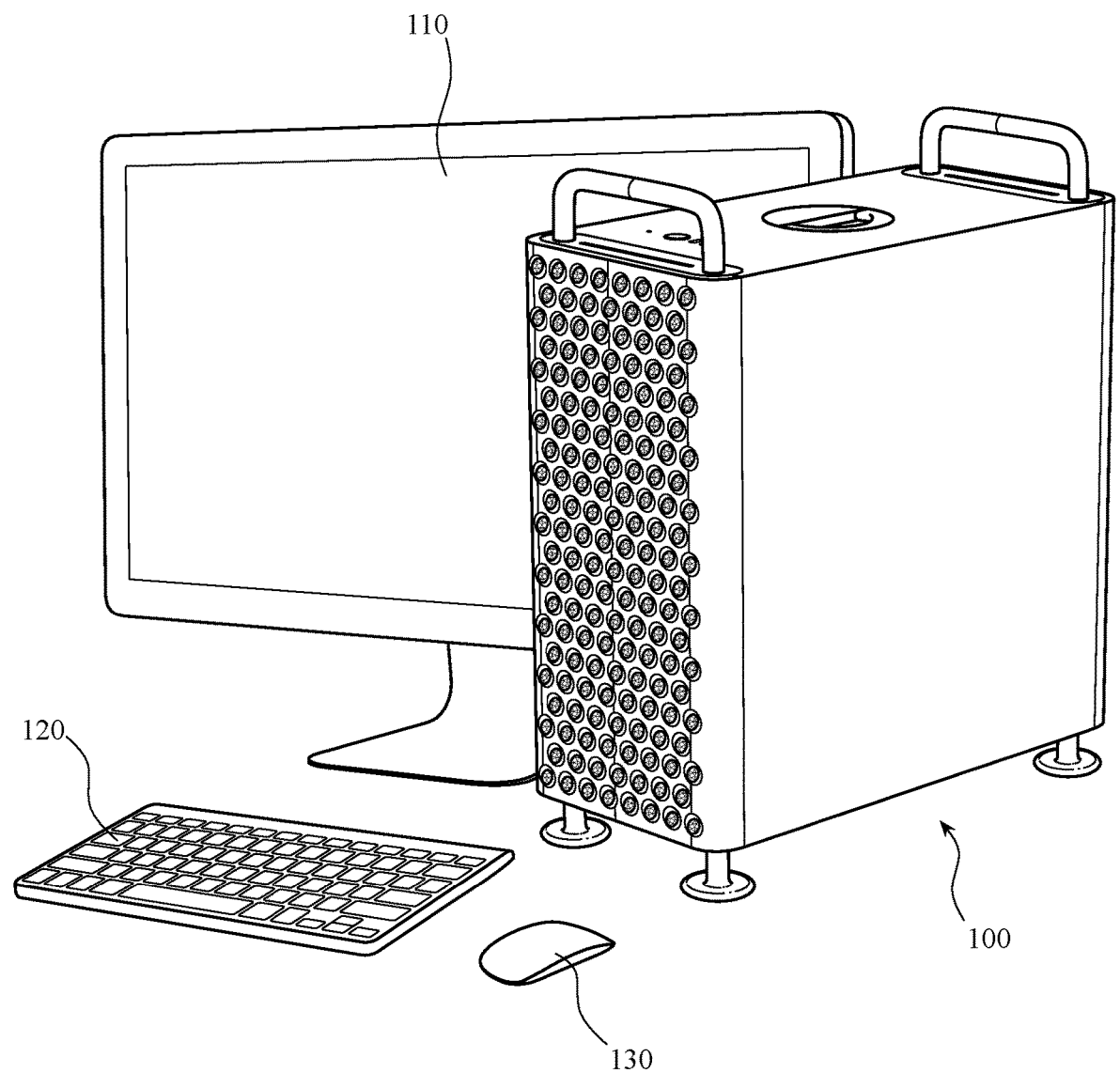
FIG. 1 illustrates a perspective system view of a computing system including an electronic device.

The present description provides examples, and is not limiting of the scope, applicability, or configuration set forth in the claims. Thus, it will be understood that changes can be made in the function and arrangement of elements discussed without departing from the spirit and scope of the disclosure, and various embodiments can omit, substitute, or add other procedures or components, as appropriate. For instance, methods described can be performed in an order different from that described, and various steps can be added, omitted, or combined. Also, features described with respect to some embodiments can be combined in other embodiments.

One aspect of the present disclosure relates to an electronic device including a frame configured to receive and attach removable electronic components thereto. The electronic device can further include a shell that defines an internal volume sized to encompass the frame and electronic components. The shell can be removably affixed to the frame and can cooperate with portions of the frame to define the exterior surface of the electronic device. An electronic component positioned within the internal volume, such as a logic board, can divide the internal volume into one or more zones and can substantially fluidically isolate the first and second zones, except at one or more apertures defined by the component, through which the zones can fluidically communicate. The electronic device can include a first air-moving apparatus, for example, one or more fans, that produces a positive pressure in the first zone and a second air-moving apparatus, for example, a blower, that produces a negative pressure in the second zone. The electronic device can also include a number of additional features and components that can allow for desired levels of device performance, allow for desired levels of accessibility and modularity for components of the device, and that can provide for a desired user experience with the electronic device.

In some examples, the components of an electronic device and their arrangement can allow for a desired user experience with respect to various features of the electronic device. In some examples, a user can interact with an electronic device in a number of ways, including physical interactions with various components of the electronic device, in order to perform certain tasks with the device. For example, in some examples, a user can add, remove, or replace one or more components of the device in order to give the device a desired level of performance, to allow the device to perform certain tasks, to enable certain features, or to customize the device as desired. In some examples, the components of an electronic device and their arrangement can enable a user to add, remove, or replace components in a relatively simple manner that reduces the risk of incorrectly adding, removing, or replacing components and that simultaneously allows a high level of access to the components by the user or a technician.

Traditional electronic devices, such as computer towers, include housings that typically only allow a user to access a single side of the device once the housing is removed. In one example, as described herein, the shell of the present exemplary electronic device can be removable from the frame by unlocking the shell and sliding it off of the frame. Once the shell has been removed, a user can access zones or volumes on, for example, a left side and a right side of the device. Further, the components inside the internal volume of the device that can be exposed when the shell is removed or decoupled from the frame can include features that allow for easy removal, addition, and/or replacement. For example, the frame can include attachment features that allow a user to easily slide a component into a space defined by the frame, whereupon the attachment features can engage with the component to secure it to the frame without the need for numerous or difficult to use attachment hardware. This increased level of access to components inside the internal volume of the device, as defined at least partially by the shell, can allow for the user to easily configure the electronic device as desired.

In some examples, the position of one or more components with respect to other components of the device, as well as the device itself, can allow for a desired level of performance and a desired user experience. In some examples, the electronic device can include a housing that defines a cavity in a top surface of the electronic device and one or more antennas disposed in the cavity. In some examples, these antennas can be Wi-Fi antennas, Bluetooth antennas, cellular antennas, and similar wireless signal antennas. The cavity can be positioned on the top surface of the device in a location configured to provide a high level of performance with respect to the transmission and reception of wireless signals. Further, the antennas can be located under other functional features on the top surface of the device, such as handles, to prevent a user from incidentally blocking some portion of the antenna without the need for additional hardware. In this way, the performance of the device can achieve a desired level based on component orientation and geometry, as well as by the ability of certain components to perform multiple desired functions.

The components and their arrangement within an internal volume of a typical electronic device can create airflow dead spots within the internal volume. That is, there can be locations in the internal volume where the airflow is insufficient to adequately remove heat from the device. These dead spots can be caused by the spatial arrangement of the components within the electronic device, or by canceling interference between airflow from competing fans. Accordingly, these dead spots can demand additional or more powerful fans to be incorporated into the device to achieve a desired level of performance. The use of additional or more powerful fans can, however, increase the noise produced by the electronic device, or can require more space with which to house the fans, thereby undesirably increasing the overall size of the electronic device. Another way in which airflow and heat removal is traditionally enhanced in an electronic device is by providing more space within the internal volume for air to flow amongst the components that require cooling. However, adding space in the internal volume to allow airflow can also undesirably increase the overall volume of the electronic device.

Accordingly, it is desirable to design and arrange the components of an electronic device to produce airflow pathways that can effectively remove or redistribute heat in the electronic device without the need for a significant increase in the internal volume of the electronic device, or for a high powered and noisy air-moving system, for example, by including an undesirably large number of fans. In some examples, the housing or shell of an electronic device can include features that provide for desired levels of airflow and enable desired levels of thermal management. For example, the shell can define a number of perforations or apertures in one or more surfaces to allow for airflow to pass therethrough. Further, the apertures can be arranged and the shell can have a shape or a geometry that defines the apertures such that a high amount of air can pass through the shell without producing high levels of noise. Further, the apertures defined by the shell can have a large surface area, as compared to direct and unconnected through holes. This high amount of surface area can serve to greatly increase the ability of the electronic device to transport heat away from itself or away from other components, for example, by direct convection to the surrounding air.

The electronic device can further include components that cooperate with the shell to provide a desired level of electromagnetic shielding while still maintaining a desired level of airflow and thermal management. For example, the electronic device can include a sheet or panel defining a second set of apertures that cooperate with the apertures or perforations of the shell to act as an electromagnetic interference (EMI) and/or electromagnetic compatibility (EMC) noise shield for other components of the electronic device.

Users of electronic devices, such as desktop computers, often seek to replace one or more of the internal components of the computer. For example, if advances in technology result in the production of a more powerful graphics processing unit (GPU), a user may seek to replace the existing GPU within their electronic device with the more powerful GPU. It can be desirable for the components of the electronic device to be easily accessible and replaceable by a user or technician. Thus, in addition to the desirable airflow and heat removal features described herein, the arrangement and design of the components of an electronic device, such as the housing, can also provide users with access to one or more components of the electronic device.

Traditional desktop computers typically provide access to the internal components on only one side of the device. Accordingly, traditional components are arranged within the desktop computer so that they are accessible and removable from a single side of the device. Such an arrangement, however, may not be compatible with a space efficient component arrangement that produces a desirable amount of airflow through or within the electronic device. This tension between accessibility and thermal management can again lead to dead spots and the need for a larger housing or an undesirably large number of fans, thereby increasing the device size, or resulting in a device that produces a high level of noise during operation.

In some examples, the components and processes for forming and assembling the components described herein can be used to provide electronic devices that utilize multiple isolated volumes or zones which can cooperate to produce a desired level of thermal management without requiring extremely powerful or large air-moving systems, while still providing access to the components for a user or a technician of the electronic device.

Further, the components of the electronic device can be formed and arranged to allow for high configurability, modularity, and accessibility, while minimizing the overall volume and size of the electronic device. In some examples, the multiple zones of the electronic device can be isolated by a seal, but can communicate at select locations to efficiently control and direct airflow provided by an air-moving system. For example, one zone can have a positive air pressure with respect to the ambient environment, while another zone can have a negative air pressure with respect to the ambient environment. The pressure in each zone can be controlled by the air-moving system to provide for airflow into, out of, and between the zones, to achieve a desirable level of thermal management for the components of the electronic device.

FIG. 1 shows a computing system including an electronic device 100. The electronic device 100 shown in FIG. 1 is a computer, for example, a desktop computer, and can be connected to a display or monitor 110. This is, however, merely one representative example of a device that can be used in conjunction with the ideas disclosed herein. The electronic device 100 can, for example, correspond to a portable media player, a media storage device, a portable digital assistant ("PDA"), a tablet computer, a display, a mobile communication device, a GPS unit, a remote control device, and similar electronic devices. The electronic device 100 can be referred to as an electronic device or a consumer device. As shown, the electronic device 100 can also be connected to any number of input devices such as a keyboard 120, a mouse 130, a track pad, a stylus, a microphone, or any combination of known input devices. Further detail of the electronic device 100 is illustrated in FIG. 2.

Figure 2:
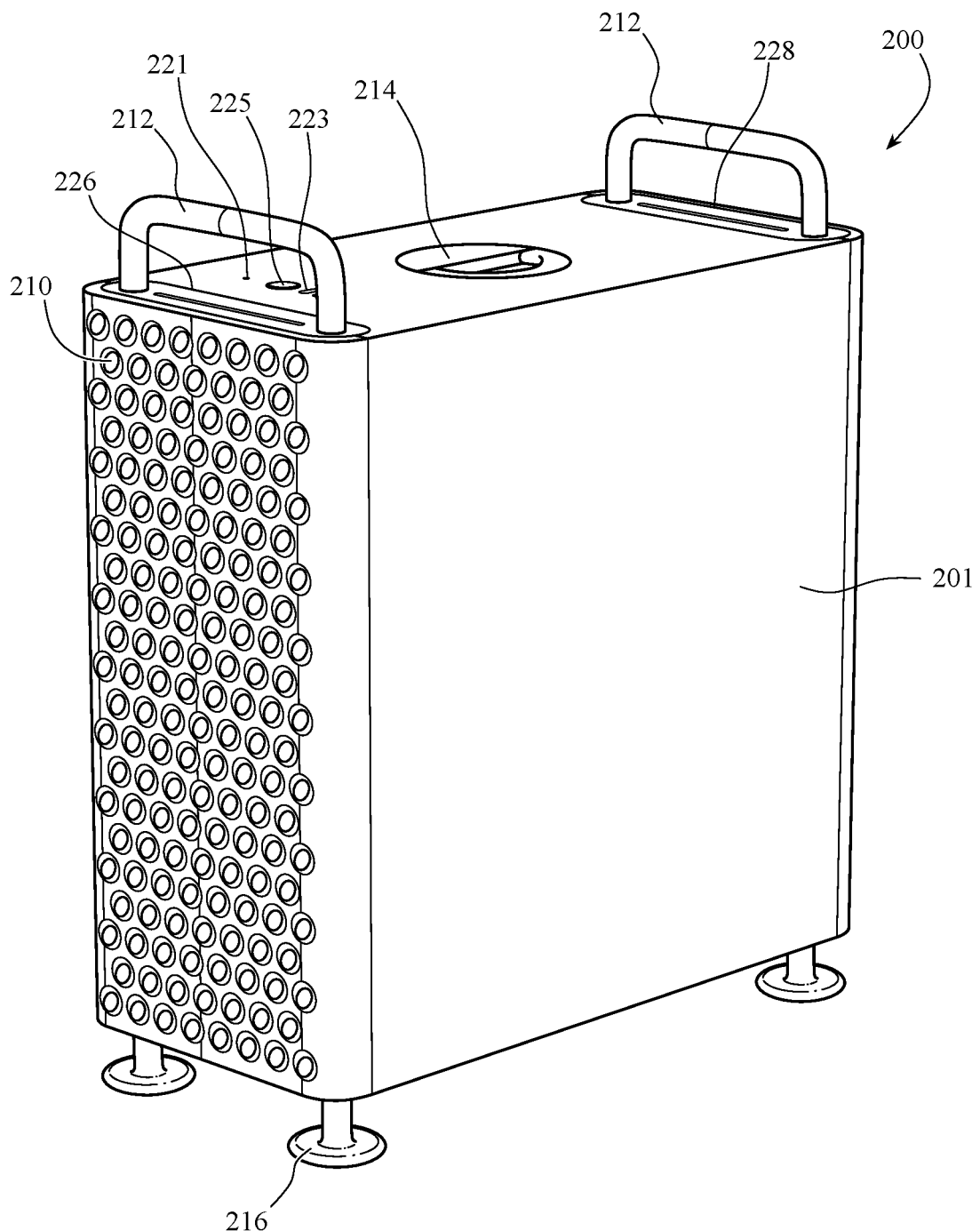
FIG. 2 illustrates a front perspective view of an electronic device.

FIG. 2 illustrates an electronic device 200, for example, as used in the computing system shown in FIG. 1. The electronic device 200 can be connected to a display and one or more input devices. The electronic device 200 is configured for placement upon, underneath, or adjacent to a work surface, such as a table or a desk. In some examples, the electronic device 200 of the computing system can be referred to as a desktop computer. The electronic device 200 can include multiple internal electronic components including at least a central processing unit (CPU), in some examples, located on one or more logic boards, such as a main logic board, one or more graphics processing unit (GPU) boards, and other primary and secondary internal components. The electronic device 200 can also include a housing 201 that can define an internal volume of the electronic device 200 and can at least partially define an external surface of the electronic device 200. Although the housing 201 of electronic device 200 is illustrated as having an approximately rectangular shape, in some examples the electronic device 200 and housing 201 can assume substantially any shape, as desired. In some embodiments, the electronic device can also be coupled to other electronic devices to form a multi-computer system that can be used, for example, as a server computer system (such as in a data farm) or as a network computing system having each electronic device 200 as a node (or nodes).

In some examples, the electronic device 200 can include a housing 201 that can define an internal volume, within which the internal components of the electronic device are disposed. The housing 201 can be easily removed for user access or servicing. The housing 201 can include a metallic material, such as stainless steel or aluminum. In some examples, the housing 201 can have an anodized aluminum oxide layer that both protects the housing 201 and promotes heat transfer for cooling the internal volume. In some examples where the housing 201 includes a metal such as aluminum, the electrical conductivity of the housing 201 can provide a ground for internal electrical components arranged to fit and operate within the housing 201. The housing 201 can also provide an electromagnetic interference (EMI) shield to protect sensitive electronic components from external electromagnetic energy, as well as reducing an amount of electromagnetic energy emanating from internal components within the electronic device from penetrating the housing 201, thereby providing a desired level of electromagnetic compatibility (EMC).

The housing 201 can include a mechanism 214, such as a mechanical latch, which can be used to couple the housing 201 of the electronic device 200 securely to internal structures of the electronic device 200, as described further herein. The mechanism 214 can take the form of a twisting latch or other such operable mechanism that can be manually engaged and disengaged, for example, by a user or technician. In this way, the housing 201 can be easily removed in order to expose internal components and structures of the electronic device 200 for user maintenance, upgrade, or servicing by a technician. In some examples, a detection circuit (not shown) of the electronic device 200 can be used to detect whether the housing 201 is properly situated in place with respect to internal components and structures. The detection circuit can serve a useful function, as the thermal management strategy of electronic device 200 can rely on the proper placement and use of the housing 201 in combination with the arrangement of internal components and an air-moving system within the internal volume defined by the housing 201.

In some examples, the detection circuit can determine that the housing 201 is not in proper placement or alignment with respect to internal structures or components of the electronic device 200, and the detection circuit can prevent the electronic device 200 from operating, or at least from operating at full capacity. In some examples, the detection circuit can include a magnetic sensor (such as a Hall Effect device) located to detect one or more magnets disposed on the housing 201 when the external housing 201 is properly placed and aligned on the electronic device 200. The housing 201 can also include one or more features, such as handles 212 that can allow for a user or technician to handle or transport the electronic device 200.

The housing 201 can further include one or more support features 216, for example, in the form of feet or wheels. The support features 216 can serve to provide a physical support for the electronic device 200 when it is resting on a surface, and can further prevent a large surface of the housing 201 from directly contacting the surface on which it is positioned. In this way, the support features 216 can provide a space between the housing 201 and the surface in order to allow air to flow therethrough and thereby assist in the thermal management of the electronic device 200.

A number of apertures, holes, perforations, or passageways 210 can be formed in a front surface of the housing 201 that can provide fluid communication between the ambient environment and the internal volume defined by the housing 201. The apertures 210 can be substantially any shape, but in some examples, can be circular or spherical, as described herein. In some examples, the apertures 210 can allow for direct fluid communication between the ambient environment and the internal volume. In some examples, however, the apertures 210 can allow for fluid communication between the ambient environment and the internal volume through one or more components, such as an air-moving apparatus or system, as described herein.

In some examples, the apertures or holes 210 can be in the form of a three-dimensional structure that can include spherical recesses that interfere or intersect with each other to create through holes 210 arranged in specified patterns. The spherical recesses can have a base form of three spherical recesses in a common plane that at least partially intersect or interfere with one another, and a fourth spherical recess on an adjacent plane that intersects or interferes with each of the three spherical recesses to create a network of interconnected through holes 210. This base form can then be propagated or repeated throughout the structure to form the aggregate three-dimensional structure. For example, where the housing 201 includes such a three-dimensional structure, the structure can maximize both surface area and aperture 210 distribution for thermal transfer, while maintaining a robust structural lattice. That is, a housing 201 including the interconnected through holes 210 can optimize its ability to distribute or remove heat from the electronic device 200, while remaining both light and strong, thereby improving performance of the electronic device 200 compared to traditional monolithic or closed contiguous structures.

In some examples, the three-dimensional structure or structures defining the apertures 210 can be included as a portion or region of the housing or shell, such as a portion of the housing or shell defining a first exterior surface and a second interior surface. In some examples, the portion of the housing can be a unitary body, for example, a unitary body formed by a single piece, section, or portion of a material. The first surface and the second surface of the body can be opposing surfaces. At least a portion of the housing can include a three-dimensional pattern or matrix of apertures or passageways therein. In some embodiments, the three-dimensional pattern can extend through at least a portion or region of the housing or substantially throughout the entire housing. The three-dimensional pattern can extend across one or more of an entire height, width, and depth of the housing, or a portion thereof. The three-dimensional pattern or matrix can be formed or be defined by a combination of one or more cavities extending into the housing from the first surface, and one or more cavities extending into the housing from the second surface of the housing.

In some examples, the one or more cavities extending into the housing from the first surface can intersect with one or more of the cavities extending into the housing from the second surface, to form the three-dimensional pattern or matrix. That is, in some examples, the negative space of a cavity extending into the housing from the first surface of the housing can intersect or interfere with the negative space of one or more cavities extending into the housing from the second surface of the housing. Further, in some embodiments, the cavities can eccentrically intersect, merge, or interfere to form an aperture 210. The aperture or apertures 210 can be through-holes in the housing. As used herein, the term aperture can refer to a hole in a body that passes entirely through the body. In some embodiments, the three-dimensional pattern of apertures 210, as described herein, can have a surface area that is up to twice as large, up to five times as large, up to ten times as large, or even several orders of magnitude larger than the surface area of a similarly sized and shaped housing that does not include the three-dimensional pattern of apertures 210. This high amount of surface area can serve to greatly increase the ability of the housing to transport thermal energy or heat away from itself or away from other components of an electronic device, for example, by direct convection to the surrounding air. In some examples, the cavities extending into the housing from a surface of the housing can be arranged in a pattern. This pattern can be a regular or repeating pattern of cavities that extends throughout a portion of a surface, or in some examples, substantially an entire surface of the housing.

In some examples, the housing or shell 201 can include an input component disposed on an exterior surface thereof that is operable by a user to at least partially control the power state of the electronic device 200. For example, the shell 201 can include an input component 225 that can receive input from a user and can at least partially determine whether a power supply unit provides power to the one or more electronic components of the electronic device 200. Thus, in some examples, the input component 225 can function as an on/off switch or control for the electronic device 200. In some examples, the input component 225 can take the form of a button, a switch, a touch sensor, and/or combinations thereof. Further, in some examples, the input component 225 can be disposed on the housing 201 at a location that is convenient for a user to operate, such as a top surface of the housing 201. In some examples, the input component 225 accepts a user touch to initiate a power on sequence (including, for example, a boot up process) as well as a power down sequence. In some examples, the input component 225 can be illuminated and provide an activity indication to a user, e.g., under software control of a processing unit in the electronic device 200.

The housing 201, can also include one or more ports 223 disposed at a location on the housing 201 that is convenient for a user to quickly and readily access. In some examples, the port or ports 223 can be configured to receive and connect or engage with cables or additional electronic devices, and can facilitate the transfer of power or signals to or from the electronic device 200. While the electronic device 200 can include numerous ports at various locations, as described herein, one or more ports 223 can be disposed, for example, on a top surface of the housing 201, to maximize ease of use and access by a user. In some examples, the ports 223 can include Universal Serial Bus-type (USB) ports, and Thunderbolt ports.

The electronic device 200 can also include one or more visual indicators 221 integrated into and positioned on the housing 201 at a location that is readily visible by a user. For example, a visual indicator 221 can be positioned on a top surface of the housing 201. In some examples, the visual indicator 221 can be positioned substantially adjacent to or near the input component 225 of the electronic device 200. In some examples, the visual indicator 221 can provide a visible indicia of whether power is being supplied to one or more components of the electronic device 200. In other words, the visual indicator 221 can provide a visible indicia of whether the electronic device 200 is in an 'on' or an 'off' state. In some examples, the visual indicator 221 can provide a visible indicia of other states of the electronic device 200, for example, whether the electronic device 200 is performing certain processes, receiving transmitted data, and/or experiencing an error. The visual indicator 221 can include one or more lights, such as LED lights, and can provide the visual indicia by illuminating the light or lights, or by illuminating a light of a certain color. For example, a green LED can be illuminated to indicate an 'on' state and a red LED can be illuminated to indicate an 'off' state. In some examples, the visual indicator 221 can be illuminated and provide an activity indication to a user, e.g., under software control of a processing unit in the electronic device 200.

In some examples, the housing 201 of the electronic device 200 can define one or more recesses or cavities in a surface thereof configured to receive one or more antenna components. For example, a top surface of the shell 201 can include a cavity and can include an antenna component 226 disposed in the cavity and connected to one or more other components of the electronic device 200. The housing 201 can include a second cavity and a second antenna component 228 disposed at a second, different location on the housing 201. As described further herein, in some examples, an insert can be sized to correspond to the cavity and/or the antenna component 226, 228 and can overlie, underlie, and/or surround the antenna component 226, 228 to provide a surface that is substantially flush or in line with a surface of the housing 201, such as the top surface, while being substantially transparent to the electromagnetic spectrum in frequencies utilized by the antenna component 226, 228 while providing a desired aesthetic appearance. Further, in some examples, the antenna component, for example, antenna component 226, can be disposed at a location on the housing 201 that can prevent or discourage occlusion, or partial occlusion and its subsequent reduction in performance, by a user resting an object on the top surface of the electronic device 200. For example, the antenna components 226, 228 can be disposed under the handles 212 of the electronic device 200. Additional views of the electronic device are detailed below with reference to FIG. 3.

Figure 3:
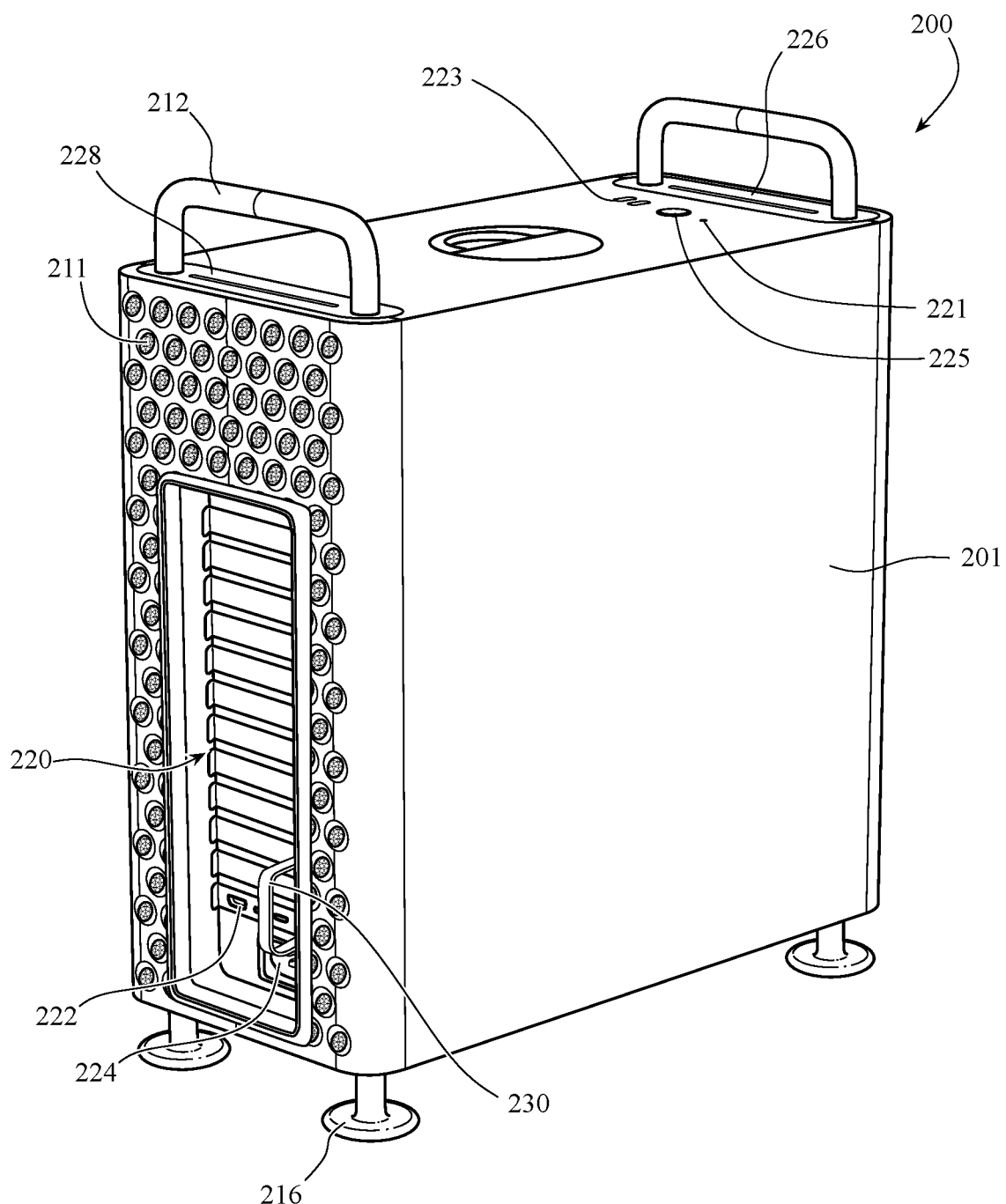
FIG. 3 illustrates a rear perspective view of the electronic device of FIG. 2.

As shown in FIG. 3, in some examples, the housing 201 of the electronic device 200 can include an interface panel 220 located on a rear surface of the housing 201. The interface panel 220 can include various ports 222 that can be used to communicate data and/or power between the electronic device 200 and various external systems. For example, the interface panel 220 can include a set of audio ports that can be used to provide an audio stream to an external audio system, such as headphones, speakers, or an audio processor. The set of audio ports can also be used to receive an audio stream from an external audio system, such as a microphone or an audio recording device. The interface panel 220 can also include one or more ports, including one or more bus ports, one or more high-speed expansion ports, one or more networking ports, and/or one or more video ports. The data ports can be used to transfer data and/or power between one or more external circuits and the electronic device 200. The data ports can be used to accommodate a broad range of data connections according to different wired data communication protocols, for example, one or more Universal Serial Bus (USB) ports, one or more Thunderbolt high speed expansion ports, one or more Ethernet networking ports, one or more high definition media interface (HDMI) ports, and/or other data ports.

The electronic device 200 can be interconnected to other computing systems through one or more of the data ports provided on the interface panel 220, e.g., to data storage devices, portable media players, and/or video equipment, to form a network of computing systems. Accordingly, the interface panel 220 and associated data ports of the electronic device 200 can be used to form connections from the electronic device 200 to a large number and variety of external computing systems and circuits, which can prove particularly useful when a large amount of computing resources is desired. Moreover, the size and shape of the electronic device 200 can lend itself to space efficient computing networks or data farms, in some representative embodiments and uses.

The interface panel 220 can also include a video port that can be used to communicate high-speed video between the electronic device 200 and an external video monitor or other external video processing circuitry, for example, as shown in FIG. 1. The interface panel 220 can include an alternating current (AC) power input port 224, which can be sized and shaped to accept a power plug suitable for transferring external power to operational electronic components within the housing 201, for example, through a power supply unit, as described herein. In some examples, the electronic device 200 can include internal power resources (such as a battery) that can be charged and re-charged in accordance with power delivered by way of power input port 224.

The housing 201 can also include or define a number of apertures, holes, perforations, or passageways 211, for example, formed in a rear surface of the housing 201. The holes 211 can be substantially similar to the holes 210 described with respect to FIG. 2 and can provide fluid communication between the ambient environment and the internal volume defined by the housing 201. The apertures 211 can be substantially any shape, but in some examples, can be circular or spherical, as described herein. In some examples, the apertures 211 can allow for direct fluid communication between the ambient environment and the internal volume. In some examples, however, the apertures 211 can allow for fluid communication between the ambient environment and the internal volume through one or more components, such as an air-moving apparatus or system, as described herein.

In some examples, the electronic device can include a cable retention or cable management component 230. The cable retention component 230 can engage with a portion of the housing 201, such as a recess or slot, and be removable from the housing 201 by a user. As described further herein, in some examples, the cable retention component 230 can be secured by a magnet of the housing 201 that is disposed adjacent to the area where the cable retention component 230 is to be positioned. The cable retention component 230 can at least partially define an aperture and can combine with the housing 201, when attached thereto, to define an aperture sized to allow one or more cables to pass therethrough. In some examples, where one or more cables can be connected to the ports 222 of the interface panel 220, the cables can pass through the aperture defined by the cable retention component 230 and the housing 201. Further, in some examples, the aperture can be disposed substantially perpendicular to the direction of insertion of the cable connectors into the ports 222. Thus, in some examples, the aperture defined by the cable retention component 230 and the housing 201 can maintain a cable passing therethrough at an angle of at least about 5°, 10°, 15°, 20°, or 30° or more relative to the connector when the connector is engaged with the port 222. By maintaining such a cable orientation, the cable retention component 230 can prevent or inhibit accidental removal of one or more cables if a user moves the electronic device 200. The angle of the cable relative to the connector and the port 222 can, for example, ensure that a desired amount of force, for example, greater than about 100 N of force, is required to remove the cable while the cable retention component 230 is attached to the housing. Additional examples or configurations of the electronic device 200 are provided below with reference to FIG. 4.

Figure 4:
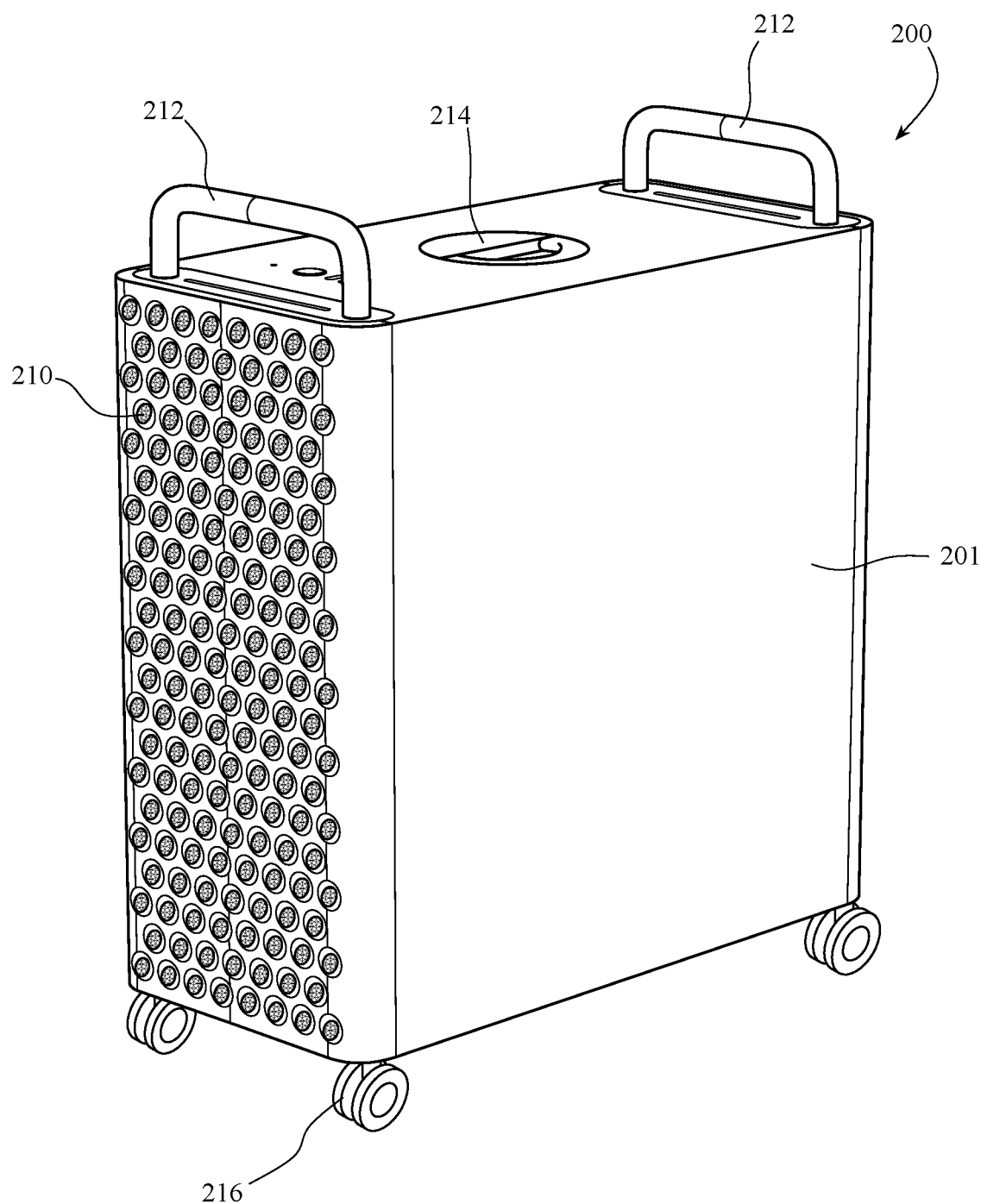
FIG. 4 illustrates a front perspective view of an electronic device.

Turning now to FIG. 4, as described herein, in some examples an electronic device 200 can include one or more support features 216 that serve to provide a physical support for the electronic device 200 when it is resting on a surface, and can further prevent a large surface of the housing 201 from directly contacting the surface on which it is positioned. While the support features 216 can include feet as described herein, in some other examples, the support features 216 can include wheels or casters, as shown in FIG. 4. In some examples, the electronic device 200 can include four casters, each positioned approximately at a corner region of a bottom plate of the housing 201. In some examples, the casters 216 can allow the electronic device 200 to be easily rolled by a user, as desired. In some examples, a caster 216 can include a wheel and ball bearings that allow for the wheel to rotate. Further, in some examples, a central portion of the caster 216, such as an axle, can be substantially hollow or have an aperture therethrough. Additional embodiments of the structure and arrangement of an electronic device including a housing defining an internal volume divided into one or more zones by a component or components within the internal volume are described below, with reference to FIGS. 5A-B.

Figure 5A:
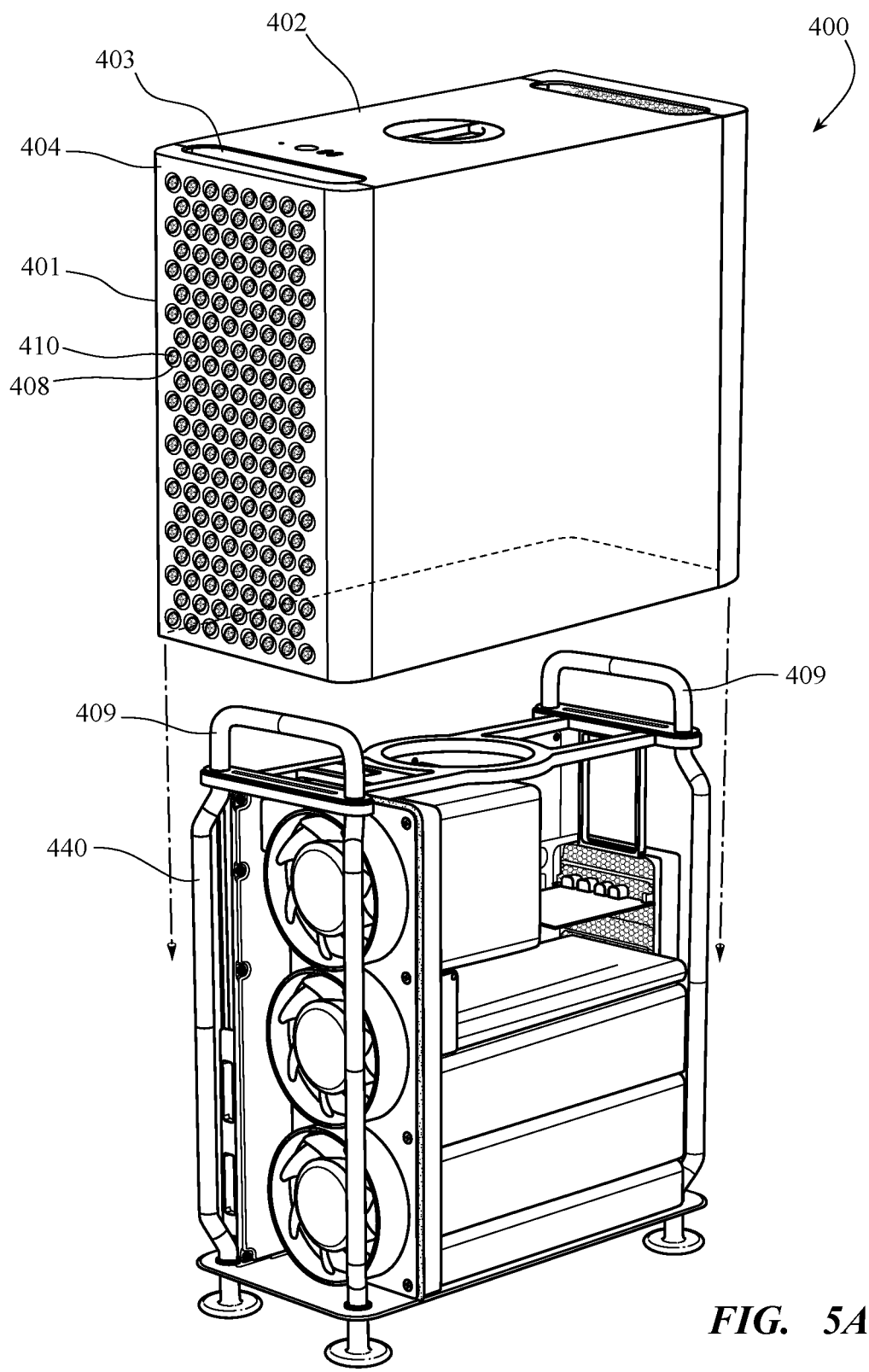
FIG. 5A illustrates a partially exploded front perspective view of components of an electronic device.

FIG. 5A illustrates a partially exploded perspective view of an electronic device 400 including a shell component 401 separated from a frame or chassis component 440. The electronic device 400 can be, for example, a desktop computer and can be substantially similar to, and can include any of the features of the electronic devices 100 and 200 described herein. The housing of electronic device 400 can be substantially similar to the housing 201, described herein, that can define an internal volume and an exterior surface of the electronic device 400.

As can be seen in FIG. 5A, the housing can include a shell 401 that can define an internal volume sized to encompass portions of the frame 440 and the electronic components received and supported by the frame 440, as described herein. The shell 401 can couple with the frame 440 to define the exterior surface of the housing. In some examples, shown in FIG. 5A, the shell 401 can be integrally removed from the frame 440, for example, by a user. In some examples, the shell 401 can be coupled to the frame 440 by a locking mechanism that can have a locked state and an unlocked state. In the locked state, the shell 401 is retained on the frame 440, for example, as illustrated in FIGS. 2-3, while in the unlocked state, the shell 401 can be removed from the frame, as desired, for example, by a user lifting or sliding the shell 401 off of the frame 440.

The shell 401 can include a top panel 402 that can at least partially define an exterior surface of the housing, for example, the top surface thereof. In some examples, the top panel 402 can include or define one or more apertures 403 that can allow a portion of the frame 440 to extend therethrough. For example, the frame 440 can include a handle or handles 409 that can pass through the apertures 403 of the top panel 402, and that can be exposed to the exterior environment. The shell 401 can further include a number of panels that are coupled or affixed to the top panel 402 and that extend therefrom, for example, that extend from and are normal to the top panel 402. The shell 401 can include a first panel or front panel 404 that can be substantially an entire height of the electronic device 400. In some examples, the front panel 404 can define a number of apertures, holes, perforations, or passageways 410 that extend therethrough and that can provide fluid communication between the ambient environment and the internal volume defined by the shell 401. In some examples, the apertures 410 can be substantially similar to apertures 210 described herein.

In some examples, the shell 401 can further include a mesh or perforated component 408 that can be coupled to or disposed substantially adjacent to the surface of the front panel 404. The mesh 408 at least partially defines the internal volume. In some examples, the mesh 408 can substantially cover the apertures 410 such that any fluid, such as air, that passes through the apertures 410 must also pass through the mesh 408. The mesh can include apertures or perforations of substantially any size, shape, or distribution.

Figure 5B:
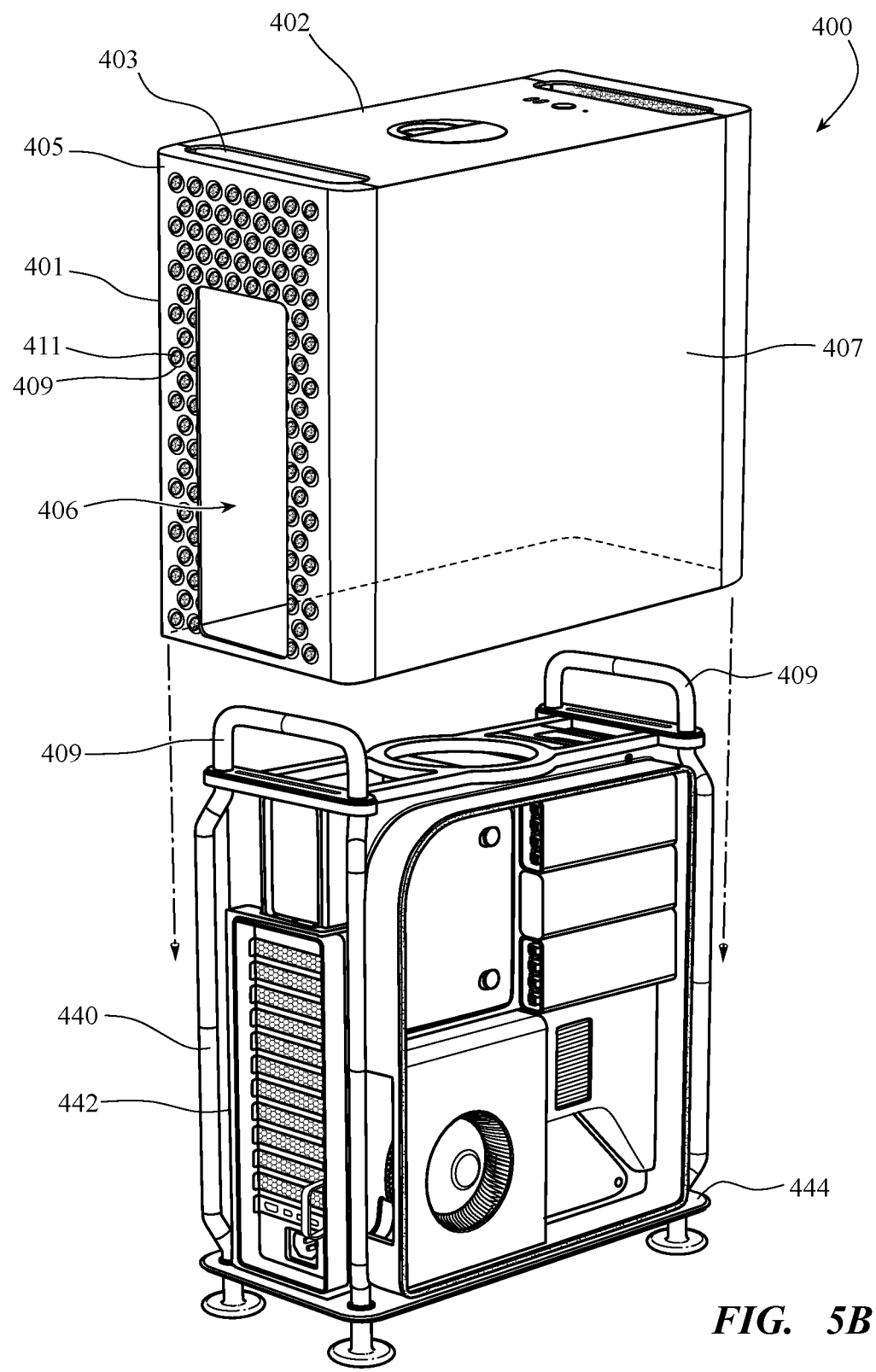
FIG. 5B illustrates a partially exploded rear perspective view of components of an electronic device.

FIG. 5B illustrates a partially exploded rear perspective view of the electronic device 400 including the shell 401 separated from the frame 440. As can be seen, the frame 440 can include a port panel or interface panel 442 that can include one or more ports and can be substantially similar to interface panel 220. The frame 440 can also include a floor panel or bottom panel 444 that can at least partially define the internal volume of the device as well as the external surface of the device. When the shell 401 is positioned over the frame 440 it can engage with the bottom panel 444, for example, at the periphery to at least partially define the exterior surface and the internal volume of the device. The interface panel 442 can be coupled to and disposed substantially normal to the bottom panel 444 and can further define the exterior surface and the internal volume of the electronic device 400.

The shell 401 can include a second panel or rear panel 405 that can be substantially an entire height of the electronic device 400. In some examples, the rear panel 405 can define a number of apertures, holes, perforations, or passageways 411 that extend therethrough and that can provide fluid communication between the ambient environment and the internal volume defined by the shell 401. In some examples, the apertures 411 can be substantially similar to apertures 210 described herein. The rear panel 405 can further define an engagement or mating slot 406 that can be sized to receive and engage with or mate with a periphery of the interface panel 442. Accordingly, the shell 401 and the interface panel 442 and bottom panel 444 of the frame 440 can cooperate to define the exterior surface and internal volume of the electronic device 400.

In some examples, the shell 401 can further include a mesh or perforated component 409 that can be coupled to or disposed substantially adjacent to the surface of the rear panel 405 that at least partially defines the internal volume. In some examples, the mesh can substantially cover the apertures 411 such that any fluid, such as air, that passes through the apertures 411 must also pass through the mesh 409. The mesh 409 can include apertures or perforations of substantially any size, shape, or distribution. As can be seen, in some examples, the front panel 404 and the rear panel 405 of the shell 401 can be connected or coupled to side panels 407 that together, with the top panel 402, form the integrally removable shell 401. Further details of the electronic device 400 and shell 401 are provided below with reference to FIG. 6.

Figure 6A:
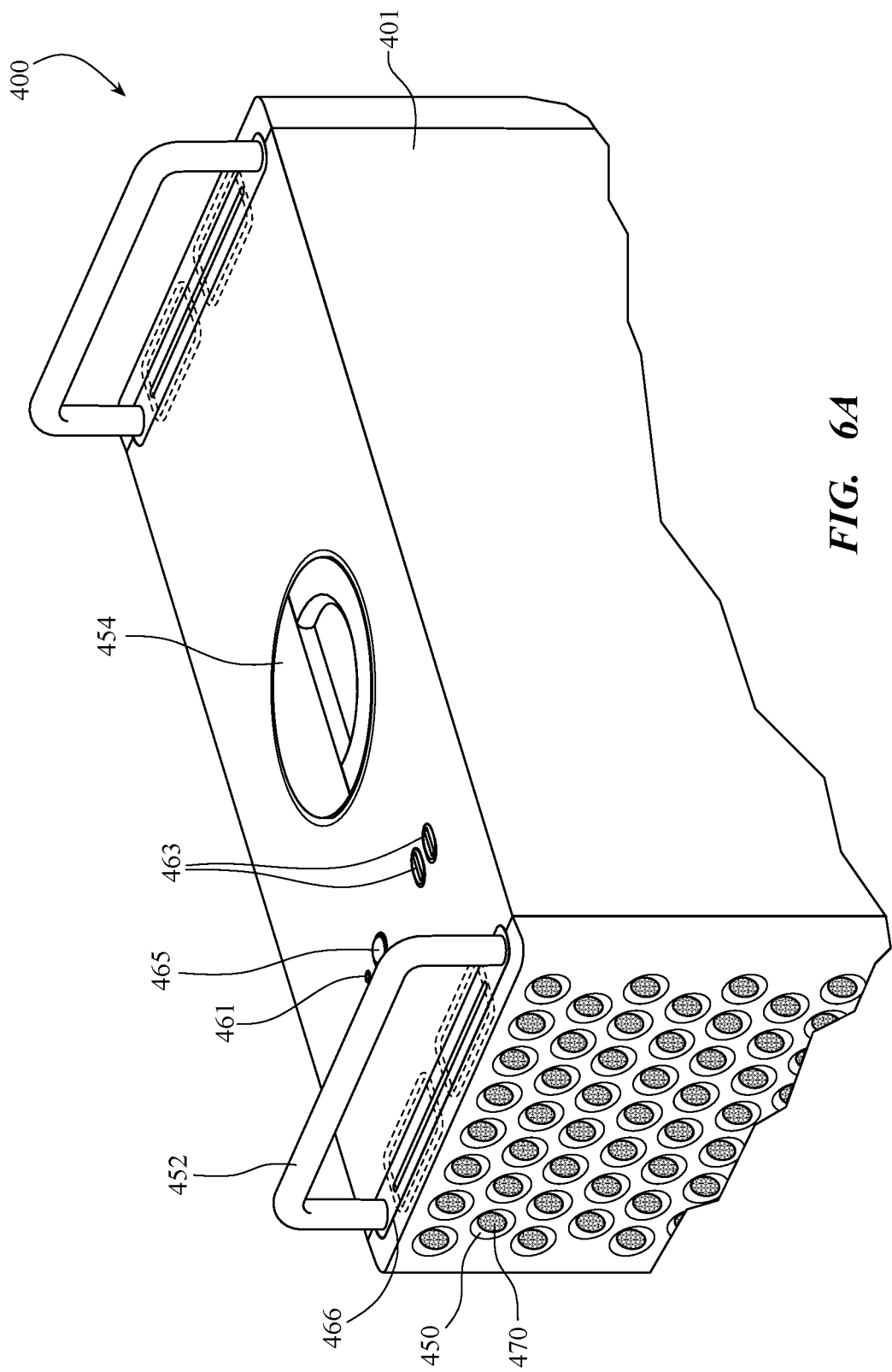
FIG. 6A illustrates a close-up view of a portion of an electronic device.

FIG. 6A illustrates a close-up view of a portion of the electronic device 400, including a top surface of the housing 401. In some examples, the housing 401 can be substantially similar to the housing 201 and can include some or all of the features described with respect to FIGS. 2 and 3, and can define apertures 450 and can include a mesh plate 470, similar to mesh plates 408, 409 described herein.

In some examples, the housing or shell 401 can include an input component 465 disposed on an exterior surface thereof that is operable by a user to at least partially control the power state of the electronic device 400. The housing 401 can also include one or more ports 463 disposed at a location on the housing 401 that is convenient for a user to quickly and readily access. In some examples, the ports 463 can include Universal Serial Bus-type ports, and Thunderbolt ports. The electronic device 400 can also include one or more visual indicators 461 integrated into and positioned on the housing 401 at a location that is readily visible by a user. In some examples, the visual indicator 461 can be illuminated and provide an activity indication to a user, e.g., under software control of a processing unit in the electronic device 400.

Figure 6B:
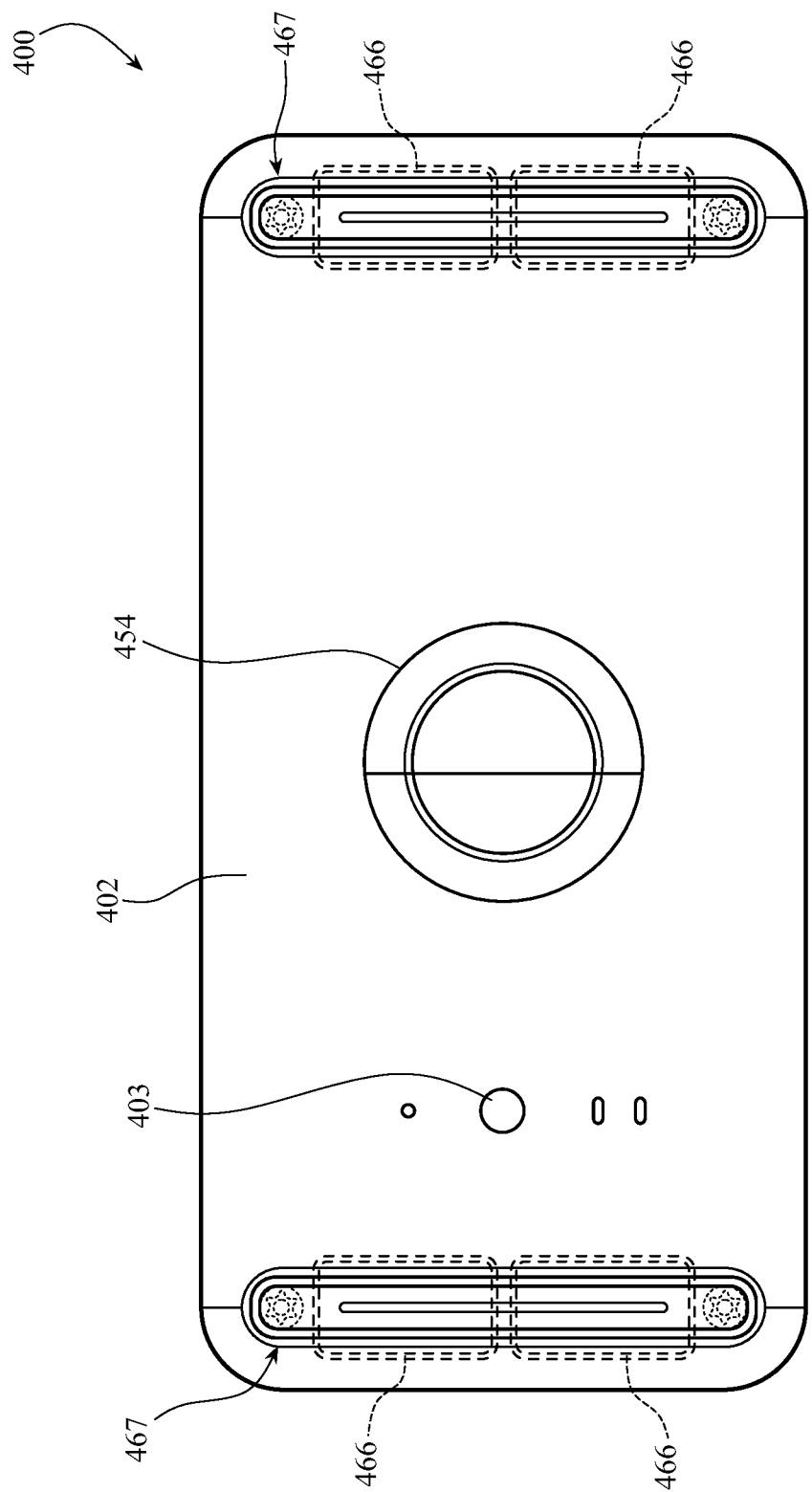
FIG. 6B illustrates a top view of a portion of an electronic device.

As shown in FIG. 6B and as described further herein, in some examples, the housing 401 of the electronic device 400 can define one or more recesses or cavities 467 in a surface thereof configured to receive one or more antenna components 466, also referred to as antenna assemblies 466. For example, a top surface of the shell 401 can include one or more cavities 467 and can include an antenna assembly 466 disposed in each cavity 467 and connected to one or more other components of the electronic device 400. In some examples, the antenna assembly 446 can be disposed under a handle 452 of the electronic device 400. In some examples, multiple antenna assemblies 466 can be disposed in a cavity 467, for example two, three, four, or more antenna assemblies 466 can be disposed in each cavity 467 of the shell 401. In some examples, the antenna assemblies 466 can be disposed substantially adjacent to one another in the cavity 467, for example, with a first antenna assembly disposed in a first half of the cavity 467 and a second antenna assembly disposed in a second half of the cavity 467. In some examples where the antenna assembly 466 includes two antennas, the antennas can be oriented in line with respect to one another in the cavity 467 such that the fields generated by the antennas are perpendicular and the adjacent antennas do not receive each other's signals. In these examples, the cavity 467 can eliminate a physical wall or divider between the portions or halves of the cavity housing each antenna. In some examples, the antenna assembly 466 can include a Wi-Fi antenna, a Bluetooth antenna, a cellular antenna, or combinations or multiples thereof. In some examples, a cavity 467 can include an antenna assembly 466 including two or more different types of antennas, such as a Bluetooth antenna and a Wi-Fi antenna. In some examples, the cavity 467 can have a shape that can create a resonant mode for one or more of the antennas of the antenna assembly 466.

Figure 7A:
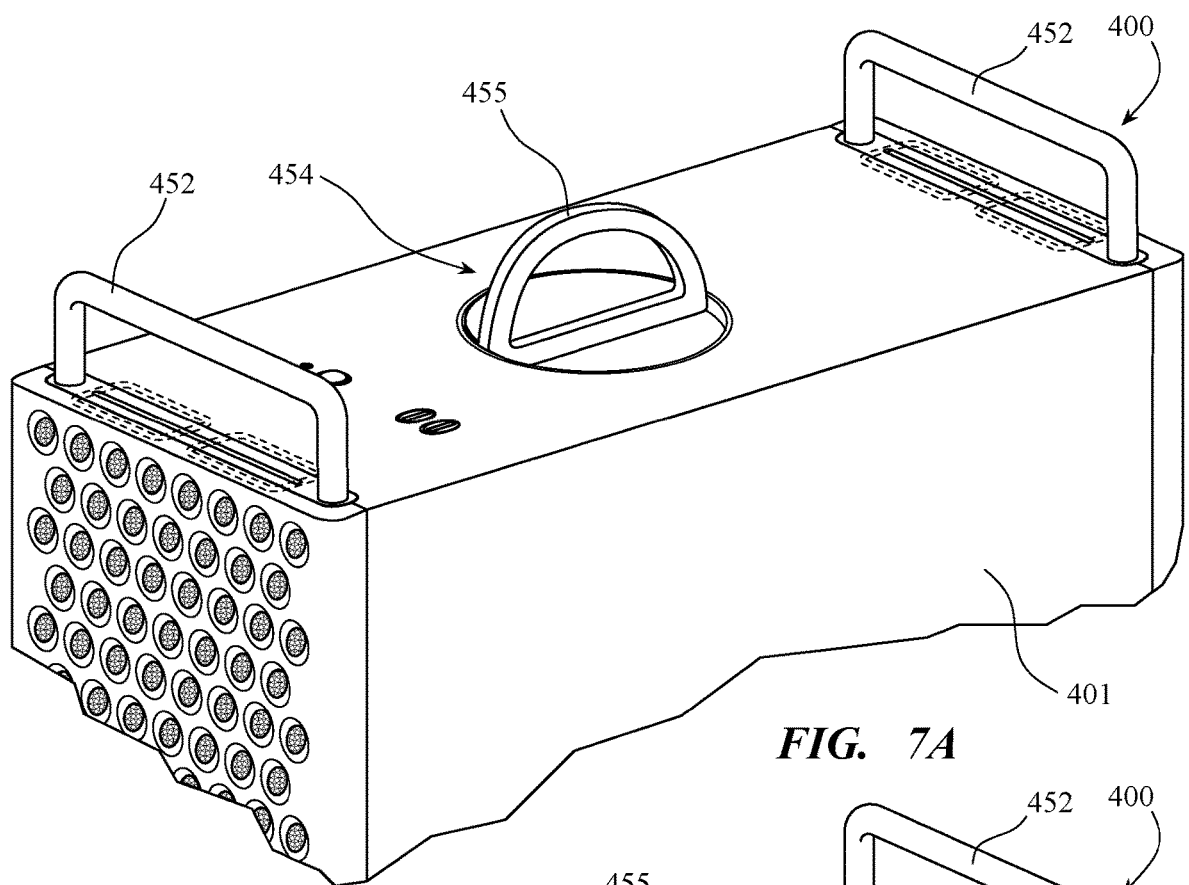
FIG. 7A illustrates a perspective view of a component of an electronic device.
Figure 7B:
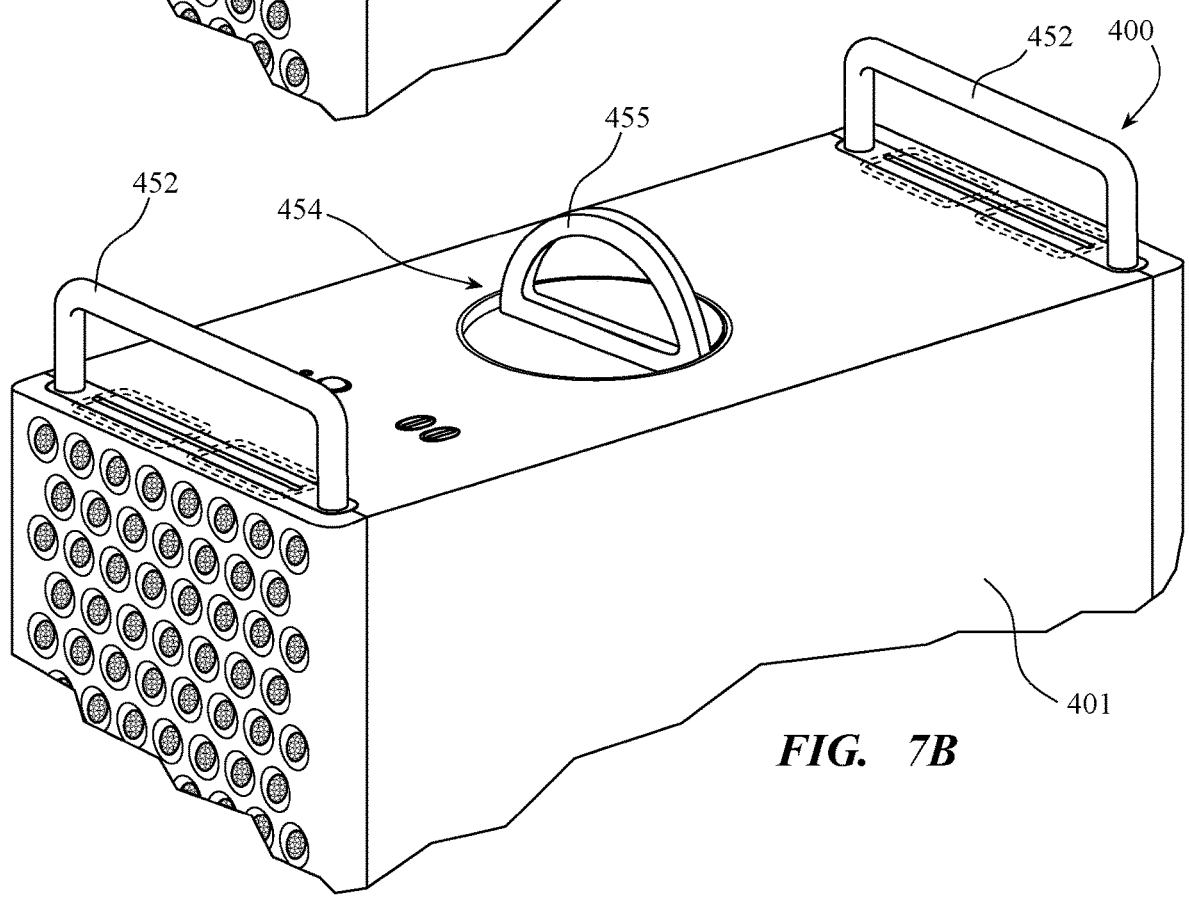
FIG. 7B illustrates a perspective view of the component of an electronic device of FIG. 7A in an alternate configuration.

The housing 401 of the electronic device 400 can also include a locking mechanism 454. In some examples, the locking mechanism 454 takes the form of a handle, for example, a semicircular handle, although the locking mechanism 454 can be substantially any shape or size. In some examples, the locking mechanism 454 can be a bi-stable locking mechanism that includes a first stable position and a second, different stable position. In some examples, the first stable position, as shown in FIGS. 7A-B, can be a position where the handle is disposed approximately horizontally, or level with the top surface of the housing 401. Thus, in some examples, the housing 401 can include a recess sized to receive the locking mechanism 454, such that the locking mechanism 454 is disposed below a level of the top surface of the housing 401.

Further, the first stable position of the locking mechanism 454 can lock the shell 401 to the frame 440, as described herein. Thus, in some examples, the first stable position of the locking mechanism 454, for example, as illustrated in FIGS. 6A and 6B, can indicate to a user that the locking mechanism is in a locked position and that the shell 401 is secured to the frame 440, as described herein. Further details of the locking mechanism are described below with respect to FIGS. 7A-B.

FIG. 7A illustrates the locking mechanism 454, for example, including a handle 455, in a second of two bi-stable positions. In this second bi-stable position, the handle 455 is positioned vertically, or perpendicularly and protruding from the top surface of the shell 401. In some examples, a user can physically move the handle 455 from the first bi-stable position to the second bi-stable position illustrated in FIG. 7A. In some examples, the handle 455 of the locking mechanism 454 can be positioned substantially perpendicular to one or more other handles 452 of the housing 401. Although the handle 455 is illustrated in a second, raised position, the locking mechanism 454 can still be in a locked state. While the locking mechanism can still be in a locked state in the configuration illustrated in FIG. 7A, in this second bi-stable position, the locking mechanism can be rotatable, for example, by a user, to unlock the shell 401 from the frame 440, as described herein. Further, while not a desired use, the handle 455 can be capable of supporting the entire weight of the electronic device 400 when in the second bi-stable position, but still in a locked state.

FIG. 7B illustrates the locking mechanism 454 after having been rotated to achieve an unlocked state, wherein the shell 401 is unlocked from the frame 440 and free to be removed by a user, for example, via the handle 455 of the locking mechanism 454. Thus, in some examples, when the locking mechanism 454 is in an unlocked state, the handle 455 can be positioned substantially parallel to one or more other handles 452 of the housing 401. Further, the position of the handle 455 can provide an indication to a user of the locked or unlocked status of the locking mechanism 454. In some examples, as described herein, twisting or rotating the locking mechanism 454 between the locked and unlocked positions can also move the shell 401 relative to the frame 440. For example, when a user rotates the locking mechanism 454 from a locked to an unlocked position, in addition to unlocking the shell 401 from the frame 440, the shell 401 can be moved vertically relative to the frame 440 to break a seal or otherwise initiate removal therefrom. In some examples, this initial movement of the shell 401 driven by rotating the locking mechanism can serve to overcome any initial static friction between the shell 401 and the frame 440 and/or other components of the electronic device 400, thereby allowing for easier removal of the shell 401 from the frame 440. Additional features of the locking mechanism 454 and the electronic device 400 will now be described with reference to FIGS. 8A-B.

Figure 8A:
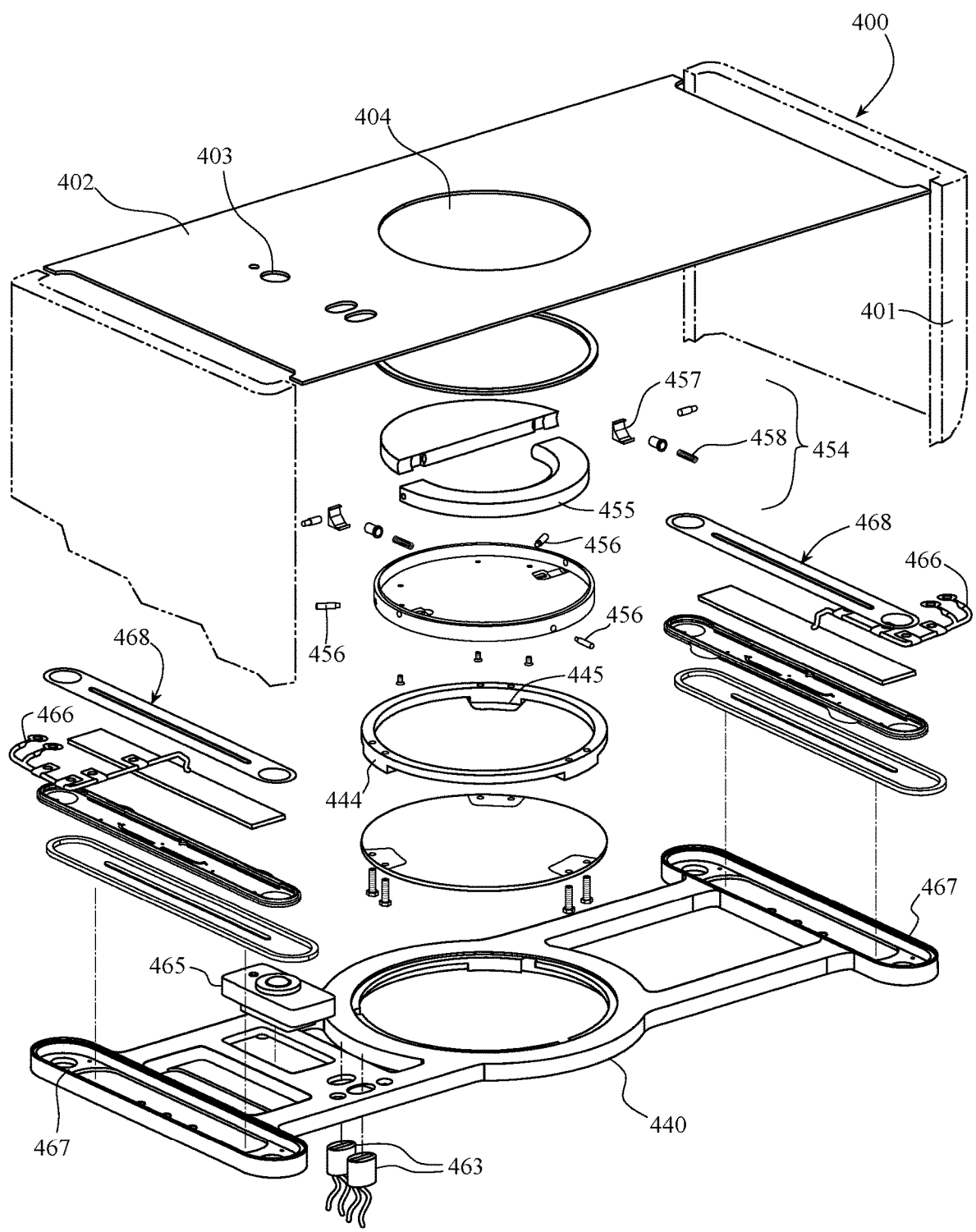
FIG. 8A illustrates an exploded view of various components of an electronic device.

FIG. 8A illustrates an exploded view of the top portion of the electronic device 400, including the locking mechanism 454, the top surface 402 of the shell 401, a portion of the frame 440, and various other components.

As described above with respect to FIGS. 7A-B, the locking mechanism 454 can include a handle 455 that can be bi-stable in two positions, for example, a raised position and a lowered position. In some examples, the locking mechanism 454 can include a plunger 457 that is attached to the handle 455 and that can be driven by a spring 458, for example, a coil spring, into either of the two bi-stable positions. In some examples, the handle 455 can be driven into the bi-stable position which is closest to its physical orientation. For example, if a user moves the handle 455 to a partially raised position that is substantially near to vertical and releases the handle 455, the spring 458 can drive the plunger 457 to move the handle 455 into the second, raised bi-stable position without further input from the user.

In some examples, the locking mechanism 454 can engage with a retention component 444 that is secured to the frame 440. The interplay between the locking mechanism 454 and the retention component 444 can serve to retain the shell 401 on the frame 440 or to allow the shell 401 to be removed therefrom. In some examples, the locking mechanism 454 can include one or more protruding articles, for example, pins 456 that can extend outwardly from the locking mechanism 454 to engage with a feature of the retention component 444. For example, the retention component 444 can include a slot, a recess, or a protrusion 445 sized to receive and engage with a pin 456. The pin 456 can be connected to the rotatable portion of the locking mechanism 454, for example, the handle 455, such that rotation of the handle 455 also results in rotation of the pins 456 relative to the retention component 444. When a desired amount of rotation is achieved, for example, about 90°, the pin 456 can no longer be positioned in the slot 445 and can thus be free to be vertically lifted and separated from the retention component 444, thereby allowing the shell 401 to be removed from the frame 440, as described.

Further, in some examples, the slot 445 can be angled or ramped such that rotation of the pin 456 relative to the slot 445 causes the slot to exert an upwards force on the pin 456 to lift the shell 401 away from the frame 440, for example, by a distance of about 1 mm, about 2 mm, about 3 mm, or about 5 mm or more. In some examples, the slot 445 can include a first slot end and a second slot end, positioned higher than the first slot end, such that rotating the handle 455 in the second bi-stable position moves the pin 456 from the first slot end to the second slot end such that the sleeve 401 moves a distance relative to the frame 440 corresponding to a difference in height between the first slot end and the second slot end, for example, about 3 mm. In some examples, the locking mechanism 454 can include three pins 456 and the retention component 444 can include three corresponding slots 445. In some examples, the pins 456 can be evenly distributed around a periphery of the locking mechanism 454.

In some examples, the electronic device 400 can include a sensor that can indicate to the electronic device 400, for example, to a processor of the electronic device 400, that the shell 401 is locked to the frame 440 and in a desired position, or that the shell 401 has been moved relative to the frame 440. In some examples, certain features or systems of the electronic device 400 can be configured to function only when the sensor detects that the shell 401 and frame 440 are in a desired position with respect to one another. In some examples, the sensor can include a Hall Effect sensor affixed to the frame 440 and a magnet in a corresponding location of the housing 401 or locking mechanism 454. Alternatively, the sensor can be affixed to the shell 401 and a magnet disposed at a corresponding location on the frame 440.

As described herein, the housing 401 of the electronic device 400 can include an input component 465 affixed thereto. In some examples, the top surface 402 of the shell 401 can include an aperture 403 sized to receive a portion of the input component 465 such that a user can access or touch the input component through the aperture 403. In some examples, a portion of the input component 465 can protrude at least partially through the aperture 403, although in some other examples the portion of the input component 465 disposed in the aperture can be substantially level with the top surface 402 of the housing 401. The input component 465 can also include a body and one or more electrical contacts affixed thereto. In some examples, the electrical contacts of the input component 465 can engage with a corresponding electrical contact affixed to the frame 440 such that an input detected by the input component 465 at least partially determines whether the power supply unit provides power to one or more electronic components of the electronic device 400. The position of the input component 465 and its fixture to the shell 401 allows the input component 465 to be removed from the frame 440 when the shell 401 is removed from the frame 440. Accordingly, this removal of the input component 465 from the frame 440 can prevent a user from turning on the electronic device 400 when the shell 401 is not secured to the frame 440 in a desired position.

Figure 8B:
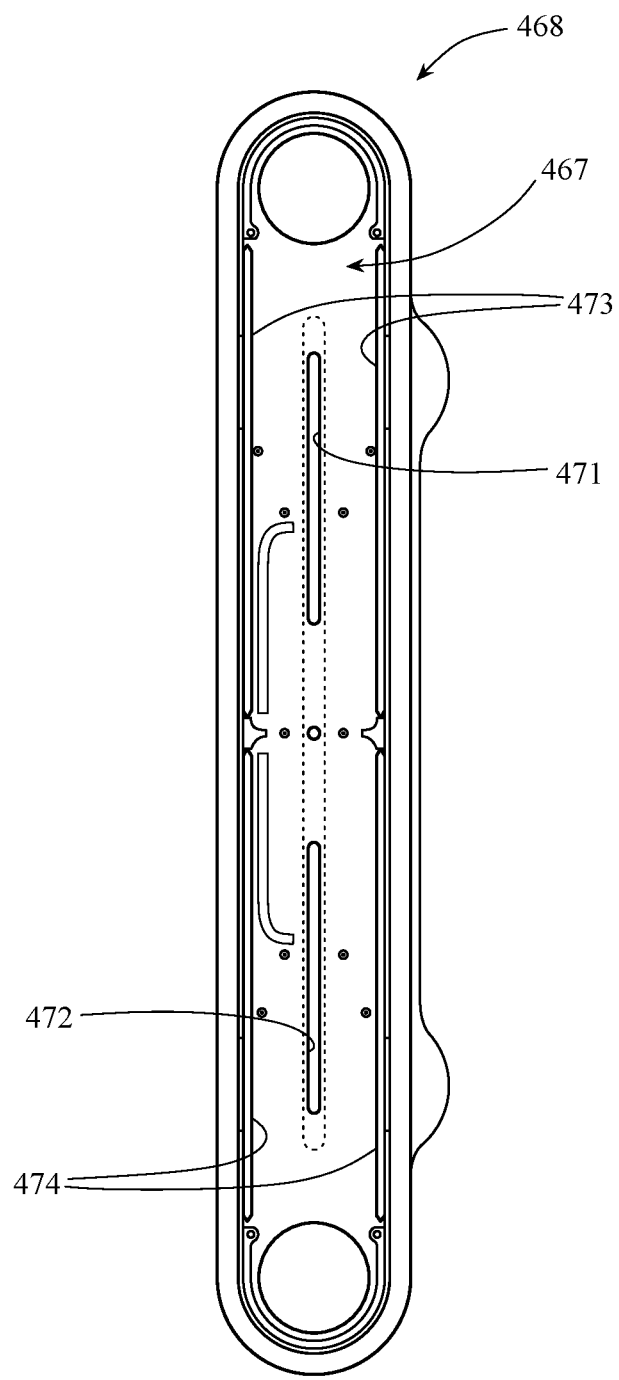
FIG. 8B illustrates a top view of a component of an electronic device.

As shown in FIGS. 8A and 8B, the electronic device 400 can also include a cavity or recess 467 that is sized to receive and house an antenna assembly 466 as described herein. While in some examples, the cavity 467 can be part of, or can be affixed to the shell 401, in some other examples the cavity or recess 467 can be a part of, or can be affixed to the frame 440. In some examples, the cavity or recess 467 can have substantially any depth as desired. In some examples, the cavity can have a depth of about 9 mm, or about 10 mm.

An antenna component or antenna assembly 466 can be disposed in the cavity as described herein. In some examples, the antenna component 466 can include a dual-band antenna that can transmit and receive signals with a frequency of about 2.4 Ghz and about 5 Ghz. The antenna component 466 can also include a printed circuit board and/or a processor disposed thereon. In some examples, the antenna component 466 can include multiple antennas, for example, a first antenna and a second antenna. In some examples, the antennas can be disposed substantially adjacent to one another in the cavity 467, for example, with a first antenna disposed in a first half of the cavity 467 and a second antenna disposed in a second half of the cavity 467. In some examples where the antenna assembly 466 includes two antennas, the antennas can be oriented in line with respect to one another in the cavity 467 such that the fields generated by the antennas are perpendicular and the adjacent antennas do not receive each other's signals. In these examples, the cavity may not have or need a physical wall or divider between the portions or halves of the cavity housing each antenna. In some examples, the antennas can be Wi-Fi antennas, Bluetooth antennas, and cellular antennas. In some examples, the cavity 467 can have a shape that can create a resonant mode for one or more of the antennas of the antenna assembly 466.

The electronic device 400 can also include an insert or cover 468 that can overlie the cavity 467 and antenna assembly 466. In some examples, the insert 468 can be integrated or affixed to the shell 401, for example, the top surface 402. The insert 468 can extend substantially an entire length and width of the cavity 467, and can be a shape corresponding to the shape of the cavity. In some examples, however, the insert 468 can be larger than the length and/or width of the cavity 467. The insert 468 can include one or more apertures to allow signals to be received or transmitted by the antenna component 466 to pass therethrough. Further, the insert 468 can include a dust or tamper seal around the perimeter in order to protect the antenna component 466. In some examples, the seal can include a material transparent to electromagnetic radiation having a frequency of greater than 2.4 GHz, and can be positioned in the cavity 467 or at an edge thereof.

In some examples, the insert 468 can define a first central slot 471 aligned with the length of the cavity 467 and positioned approximately at a midpoint of the width in the first half of the cavity. The first central slot 471 can be configured to allow electromagnetic radiation with a frequency of about 5 GHz to pass therethrough. The insert 468 can also define a second central slot 472 aligned with the length of the cavity and positioned approximately at a midpoint of the width in the second half of the cavity. The second central slot 472 can also be configured to allow electromagnetic radiation with a frequency of about 5 GHz to pass therethrough. The insert 468 can define a first pair of edge slots 473 aligned with the first central slot 471 and positioned along a perimeter of the insert 468 in the first half of the cavity 467, the first pair of edge slots 473 configured to allow electromagnetic radiation with a frequency of about 2.4 GHz to pass therethrough, and a second pair of edge slots 474 aligned with the second central slot 472 and positioned along the perimeter of the insert 468 in the second half of the cavity 467, the second pair of edge slots 474 configured to allow electromagnetic radiation with a frequency of about 2.4 GHz to pass therethrough. In some examples, the seal can occlude all of the slots of the insert 468.

Further, as illustrated in FIG. 8A, the electronic device 400 can include a second cavity with a second antenna assembly disposed therein and a second insert overlying the second cavity and antenna assembly. In some examples, the second antenna assembly can be substantially similar to the first antenna assembly 466. In some other examples, however, the second antenna assembly can include one or more antennas not present in the antenna assembly 466. For example, the antenna assembly 466 can include two dual band Wi-Fi antennas and the second antenna assembly can include one dual band Wi-Fi antenna and one Bluetooth antenna. Additional details of the housing, including the apertures or perforations defined by the shell and associated components are described with reference to FIGS. 9A and 9B.

Figure 9A:
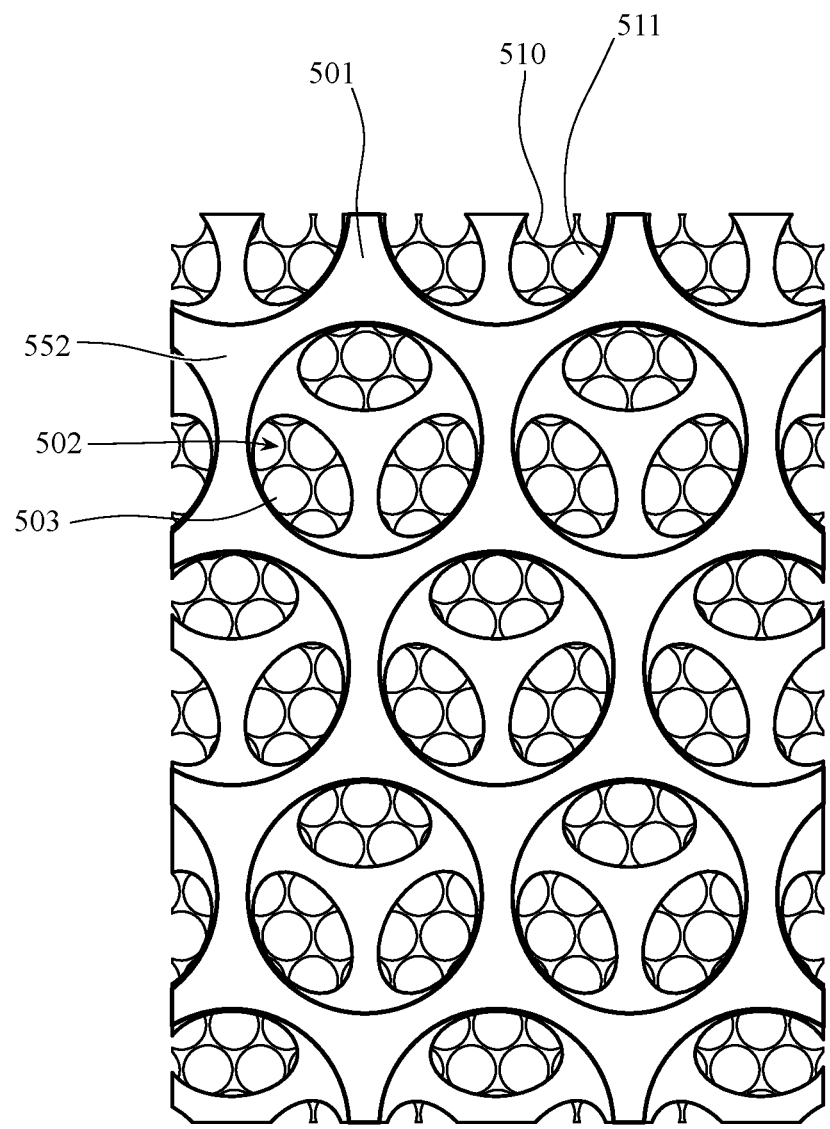
FIG. 9A illustrates a sectioned front view of components of an electronic device.
Figure 9B:
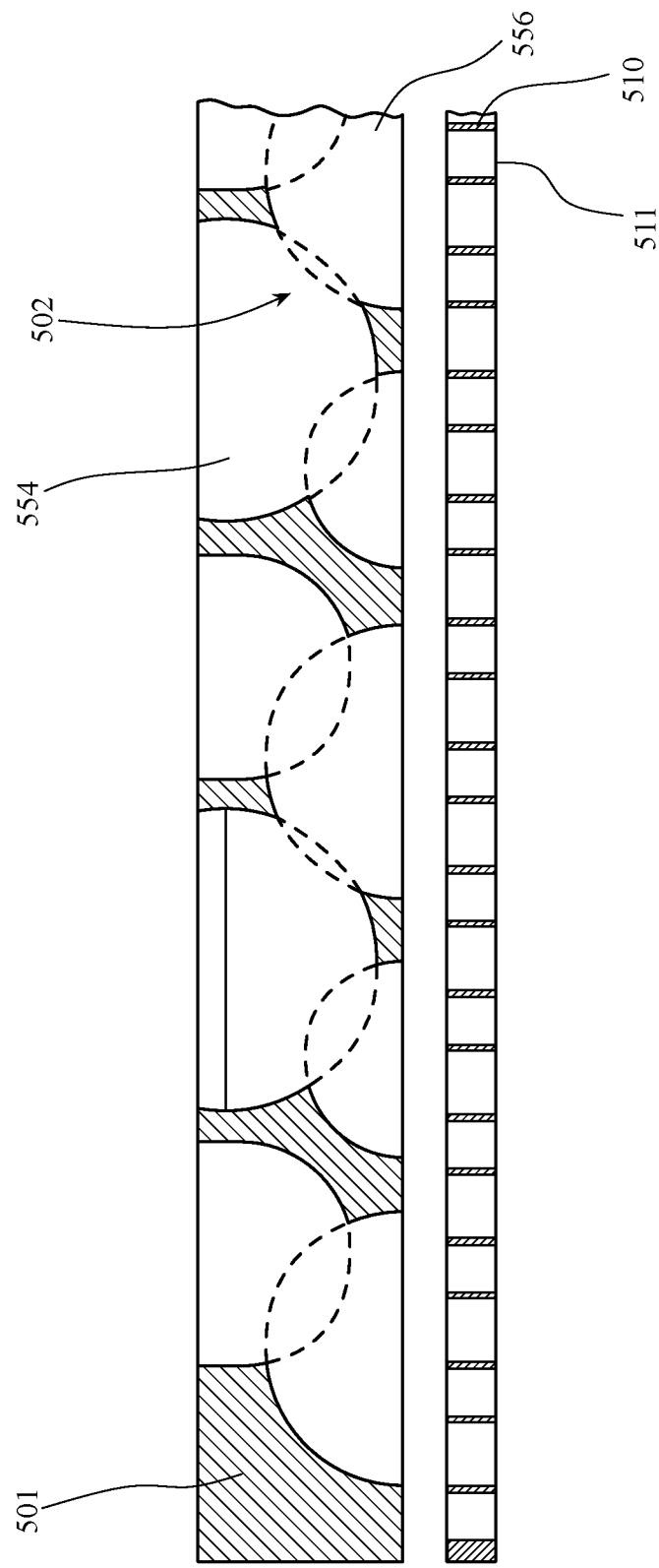
FIG. 9B illustrates a cross-sectional side view of the components of FIG. 9.

As discussed with respect to FIGS. 9A and 9B, the shell 501 of an electronic device can define a number of apertures or perforations 502 that extend through the shell 501 and can provide fluid communication between the ambient environment and the internal volume defined by the housing 501. In some examples, the shell 501 can be substantially similar to and can include some or all of the features of shells 201 and 401 described herein, and the apertures 502 can be substantially similar to the apertures 210, 211, 410, and 411 described herein.

As discussed above, the apertures 502 can be defined by a three-dimensional structure of the housing 501 that includes spherical recesses having a base pattern of three spherical recesses disposed in a common plane and at least partially intersecting or interfering with one another, and a fourth spherical recess on an adjacent plane that intersects or interferes with each of the three spherical recesses to form the aperture 502. Referring now to FIG. 9, which illustrates a front view of an exterior surface of the shell 501, one or more first cavities or recesses 554 can extend into the shell 501 from the exterior surface. The first cavities 554 can have substantially the same size and shape as one another, although in some embodiments the first cavities 554 can vary in size and shape from one another. The first cavities 554 can have a substantially spherical or hemispherical shape, such that the negative space of a cavity 554 can have a shape of a portion or region of a sphere. In some other embodiments, however, the first cavities 554 can have any shape. As can be seen, the first cavities 554 can be arranged in a pattern, for example, a regular or repeating pattern of first cavities 554. In some embodiments, the pattern can include a close-packed pattern of substantially spherical first cavities 554, for example, a hexagonal close-packed pattern of substantially spherical first cavities 554. As used herein, a hexagonal close-packed pattern is intended to be understood as a structure that substantially corresponds to a layer of spheres or portions of spheres packed so that spheres or portions of spheres in alternating layers overlie one another, aligned in the gaps of the preceding layers. As described above, the present system can not only overlie one another, but can interfere or overlap the adjacent spheres. A traditional packing factor for hexagonal close packed systems is typically 0.74, though it can be higher in the present system due to the overlapping or interference pattern created. According to one example, the close packed pattern is established by repeating and propagating a base pattern throughout the structure, in various patterns or geometric arrangements, to form the aggregate three-dimensional structure.

An electronic device including the shell 501 can further include a component, for example, a perforated or mesh component or plate 510, disposed substantially adjacent to a surface of the shell 501 that at least partially defines the internal volume of the device. In some examples, the mesh component or plate 510 can be in direct contact with a surface of the shell 501, however, in some other examples, the mesh component 510 can be spaced apart from a surface of the shell 501, for example, by a distance of up to about 1 mm, up to about 3 mm, up to about 5 mm, or up to about 10 mm, or even more. The mesh component 510 can define a number of perforations or apertures 511 that extend therethrough and that can be arranged in a repeating pattern. In some examples, an aperture 511 can have a diameter of about 1 mm, about 2 mm, about 3 mm, or even larger. For example, the apertures 511 can be arranged in a hexagonal close-packed pattern with a desired separation distance between adjacent apertures 511 that can be less than about 1 mm, less than about 0.75 mm, less than about 0.5 mm, less than about 0.25 mm, or less than about 0.1 mm or lower. The apertures 511 are illustrated as being substantially circular and having a substantially identical shape to one another, however, the apertures can be substantially any size or shape as desired and may not all have the same size or shape.

As described herein, in some examples, the shell 501 and the mesh plate 510 can allow fluid communication between the ambient environment and the internal volume defined by the shell 501 to allow a desired level of airflow into or out of the internal volume, while also acting as an electromagnetic interference (EMI) and/or electromagnetic compatibility (EMC) noise shield for other components of the electronic device. For example, as described further herein, an air-moving system of the electronic device can move air into or out of the internal volume through the apertures 502, 511 of the shell 501 and the mesh plate 510. In some examples, the speed and volume of air moving into or out of the internal volume can be controlled by the air-moving system so that the air movement does not produce noise that is audible to the user.

In some examples, the exterior surface of the shell 501 and a surface of the mesh plate 510 can at least partially define an exterior surface of the electronic component. In some examples, a repeating pattern of apertures 502 of the shell 501 and the repeating pattern of apertures 511 of the mesh plate 510 can combine to define an open area into the internal volume of at least about 70%, at least about 73%, at least about 75%, or at least about 77% or higher. In some examples, the open area defined by the shell 501 and the mesh plate 510 can be less than about 95%, less than about 90%, less than about 85%, or less than about 80%, or lower. As used herein, the term open area can refer to a percentage of the total area of a surface at least partially defined by a component where a particle, fluid, or other essentially dimensionless object incident on that portion of the surface has a path from the side on which it is incident through the component. Further, the surface can be defined by the outermost surface of the component and, in some examples, does not include the surface area of features such as apertures, recesses, or holes that extend into the component's surface. Thus, for example, in the example of the component shown in FIG. 9A, the surface used to define the open area is a continuous planar surface defined by the top surface 552 of the component that extends the height and width of the component and further extends straight across any apertures 502 of the component.

This level of open area can allow a desired amount of air movement into or out of the internal volume as described. The shell 501 and the mesh component 510 can also, however, act as an EMI/EMC shield even with this high level of open area due, to the arrangement and size of the apertures formed therein. For example, the shell 501 and the mesh component 510 can reduce electromagnetic emissions therethrough by at least about 20 dBμV for frequencies between about 2 GHz and about 5 GHz. Further details of the shell 501 and mesh component 510 are described with respect to FIG. 9B.

As further illustrated in FIG. 9B, at least one first cavity 554 extending into the shell 501 from the exterior surface can intersect or interfere with at least one second cavity 556 extending into the shell 501 from an interior surface, to define an aperture 502. In some examples, one or more first cavities 554 can intersect with one or more second cavities 556. Further, one or more first cavities 554 can intersect with different numbers of second cavities 556. For example, an amount of the first cavities 554 can each intersect with three second cavities 556 while an amount of different first cavities 554, for example, those first cavities 554 positioned near a periphery of the shell 501, can each intersect with two second cavities 556.

Similarly, in some embodiments, one or more second cavities 556 can intersect with one or more first cavities 554. Further, one or more second cavities 556 can intersect with different numbers of first cavities 554. For example, a number of the second cavities 556 can each intersect with three first cavities 554 while other second cavities 556, for example, those second cavities 556 positioned near a periphery of shell 501, can each intersect with two first cavities 554.

Together, the intersecting first cavities 554 and second cavities 556 form or define the three-dimensional pattern of apertures 502 extending through the shell 501. In some examples, at least some of the apertures 502 of the three-dimensional pattern can be in fluid communication with one another to form or define a matrix of continuous passageways in the shell 501. In some examples, this matrix of passageways can extend substantially throughout the entire shell 501, or an entire face or panel of the shell 501, or merely a portion of a face or panel of the shell 501, such that any one cavity can be in fluid communication with any other cavity via the passageways. Additionally, the three-dimensional pattern of apertures 502 maintains a structural lattice of the material forming the shell 501 or a panel thereof. This resultant lattice structure provides thermal benefits in that there is an increased surface area for the transmission and release of thermal energy via convection as compared to traditional patterns, while providing passageways for convective transfer of thermal energy. Additionally, the interconnected lattice structure provides structural support for the shell 501.

As described above, an electronic device can also include a mesh component or plate 510 that defines a pattern of apertures 511 extending therethrough. In some examples, the mesh plate 510 can have a thickness of about 1 mm, about 2 mm, about 3 mm, about 5 mm, or even greater. Although illustrated as being spaced apart from the shell 501, in some examples, the mesh plate 510 can be disposed substantially adjacent to an interior surface of the shell 501. In some examples, the mesh plate 510 can be bonded or adhered to the shell 501, for example, by brazing, welding, and/or adhesives. In some examples, the mesh plate 510 can be bonded or adhered to the shell 501 by a pressure sensitive adhesive disposed on portions of the mesh plate 510 between the apertures 511 and contacting the shell 501 at a position between the apertures 502. In some examples, the mesh plate 510 can be electrically grounded along all or a portion of the perimeter of the mesh plate 510. Further, in some examples, the mesh plate 510 can be electrically connected to the shell 501 along all or a portion of the perimeter of the mesh plate 510 to electrically ground the mesh plate 510. Further details of the structure of the housing 501 forming the apertures or through holes 502 are described with respect to FIGS. 10A-10F.

FIG. 10A is a perspective view of one example pattern that can be defined by the housing 501. In some examples, a portion of the housing 501 can have a structure or unitary body 550 that can define one or more apertures 502. As shown, a plurality of top spherical recesses 554 can be formed in the top surface 552 of the unitary body 550. The unitary body 550 can include a three-dimensional structure defined by a number of top spherical recesses 554 that extend from the top surface 552 and engage and interfere with a number of bottom spherical recesses 556 formed in the bottom surface (FIG. 10C). The top spherical recesses 554 and the bottom spherical recesses 556 can interfere with each other to create through holes arranged in specified patterns. FIGS. 10B through 10E show the three-dimensional pattern of the unitary body 550 in various orientations.

FIG. 10B is a top view of the example three-dimensional pattern formed in the unitary body 550. As shown, the top spherical recesses 554 formed in the top surface 552 of the unitary body 550 extend through and create through holes due to their engagement and interference with the bottom spherical recesses 556. The front, rear, and cross-sectional views shown in FIGS. 10C, 10D, and 10E, respectively, illustrate the through holes created by the engagement of the top spherical recesses 554 and the bottom spherical recesses 556. According to one example, the use of spherical recesses increases the exposed surface area of the three-dimensional pattern, enhancing the thermal transfer capabilities via convection. The three-dimensional pattern shown in FIGS. 10A-10E can be a pattern aggregation of a base pattern of orifices or recesses formed in the unitary body 550. One example base orifice pattern is shown in FIG. 10F and described in further detail below.

As mentioned above, the spherical recesses can have a base pattern of three spherical recesses disposed in a common plane and at least partially intersecting or interfering with one another, and a fourth spherical recess on an adjacent plane that intersects or interferes with each of the three spherical recesses. FIG. 10F graphically illustrates one example of a base pattern 560 of the spherical recesses. The base pattern 560 can include a first spherical recess 562, a second spherical recess 564, and a third spherical recess 566 arranged in a first plane and at least partially intersecting one another, as shown by the intersection line 570. The areas of intersection of the cavities result in through holes in the resulting unitary body containing the three-dimensional pattern. A fourth spherical recess 570 is disposed in a different plane relative to the first spherical recess 562, the second spherical recess 564, and the third spherical recess 566. As illustrated, the fourth spherical recess 570 can intersect the first spherical recess 562, the second spherical recess 564, and the third spherical recess 566, as shown by the intersection line 570, thereby forming the through holes in the unitary body. According to one example the first spherical recess 562, the second spherical recess 564, and the third spherical recess 566 can be top spherical recesses originating at a top surface of a unitary body and the fourth spherical recess 568 can be a bottom spherical recess originating at a bottom surface of the unitary body, to form the three-dimensional pattern. This base form or pattern 560 can then be repeated and propagated throughout the structure, in various patterns or geometric arrangements, to form the aggregate three-dimensional structure.

Figure 11A:
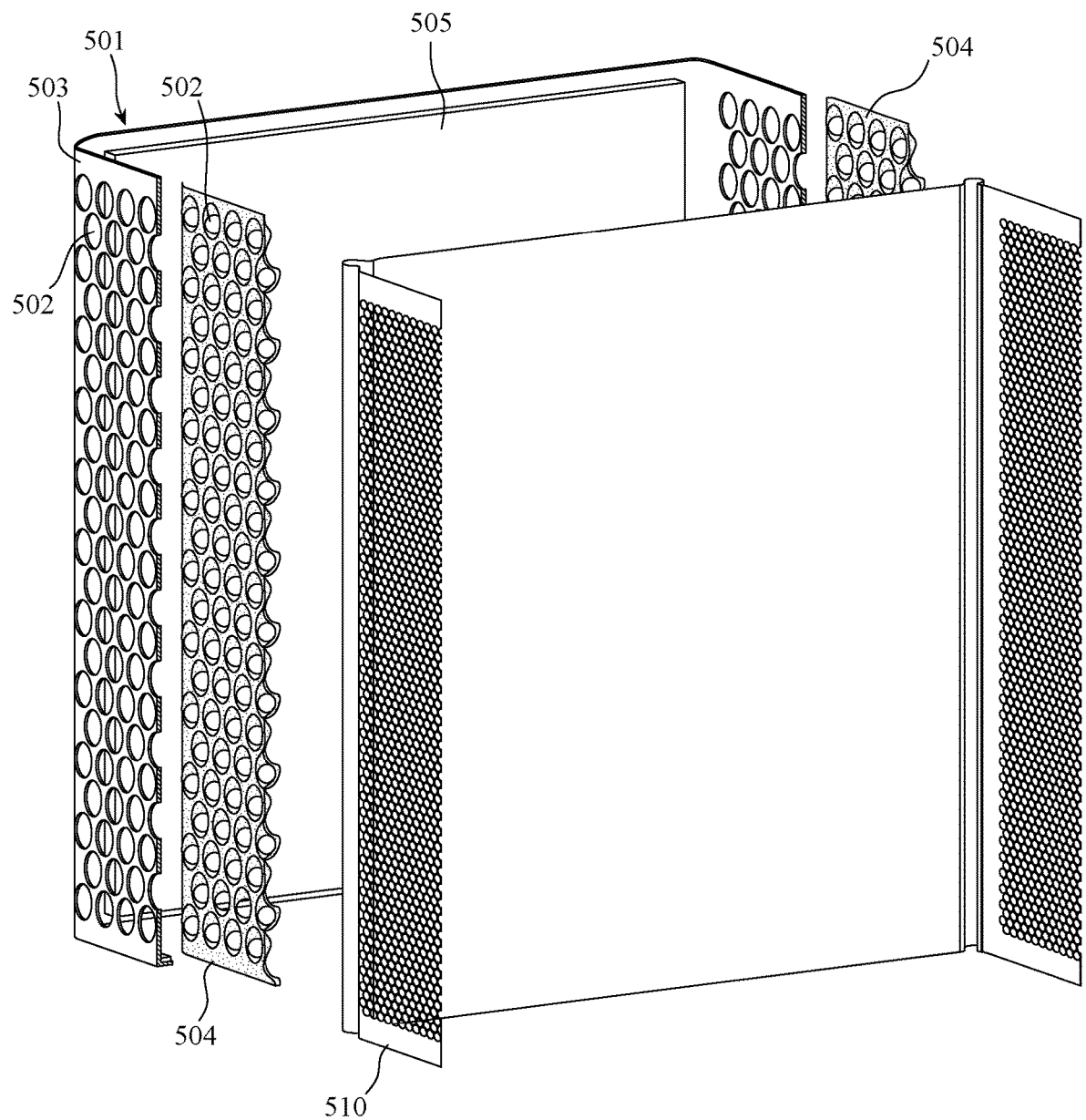
FIG. 11A illustrates a cross-sectional view of components of an electronic device.

In some examples, and as shown in FIG. 11A, the structure of the shell 501 can be formed from or include one or more portions or components that can be joined together to form the structure of the shell 501. In some examples, the shell 501 can include an outer or exterior portion 503 that can at least partially define the exterior surface of the device 500 and can also at least partially define a number of apertures or perforations 502 that can extend into or entirely through the exterior portion 503. As described herein, the exterior portion 503 can include a metallic material, polymeric material, ceramic material, or combinations thereof. In some examples, the exterior portion 503 can include a metallic material such as steel or aluminum.

The shell 501 can also include an interior portion or portions 504, 505 that can be bonded, adhered, fused with, or otherwise joined to the exterior portion 503. For example, an interior portion 504 can be fused to a surface of the exterior portion 503 opposite the exterior surface of the shell 501. In some examples, the interior portion 504 can be joined or fused to substantially all of an inner surface of the exterior portion 503. Further, in some examples, the interior portion 504 can include multiple parts or portions that may or may not be connected or otherwise joined to one another, such as portions 504 and 505. In some examples, an interior portion 504, 505 can be joined directly to the exterior portion 503, however, in some examples, the interior portion or portions 504, 505 can be joined to the exterior portion 503 by an additional layer or material, such as an adhesive. In some examples, such as when the exterior portion 503 includes a metallic material, an interior portion 504 can be cast or molded, for example by injection molding, onto the exterior portion 503. Thus, in some examples, the interior portion or portions 504, 505 can include a flowable material that can be cooled or cured to form the interior portion or portions 504, 505.

In some examples, the interior portion 504 can further define the apertures or perforations 502 that are at least partially defined by the exterior portion 503. Thus, in some examples, an aperture can be partially defined by the exterior portion 503 and can extend into the shell 501, and be further defined by the interior portion 504. In some examples, the structures described with respect to FIGS. 10A-10F can be formed from, or can be defined by, a combination of the exterior portion 503 and the interior portion 504. In some examples, the interior portion 504 can include a metallic material, a polymeric material, a ceramic material, coated materials, and/or combinations thereof. In some examples, the interior portion 504 can include one or more polymeric materials. For example, at least some of the interior portion 504, such as the section of interior portion 504 that at least partially defines the apertures 502, can be formed from a first polymeric material, while other sections, such as the sections joined to the sidewalls of the exterior portion 503, can be formed of a second polymeric material. The second polymeric material can, for example, be lighter, lower density, less expensive, or have superior thermal and/or sonic insulating properties than the first polymeric material.

Figure 11B:
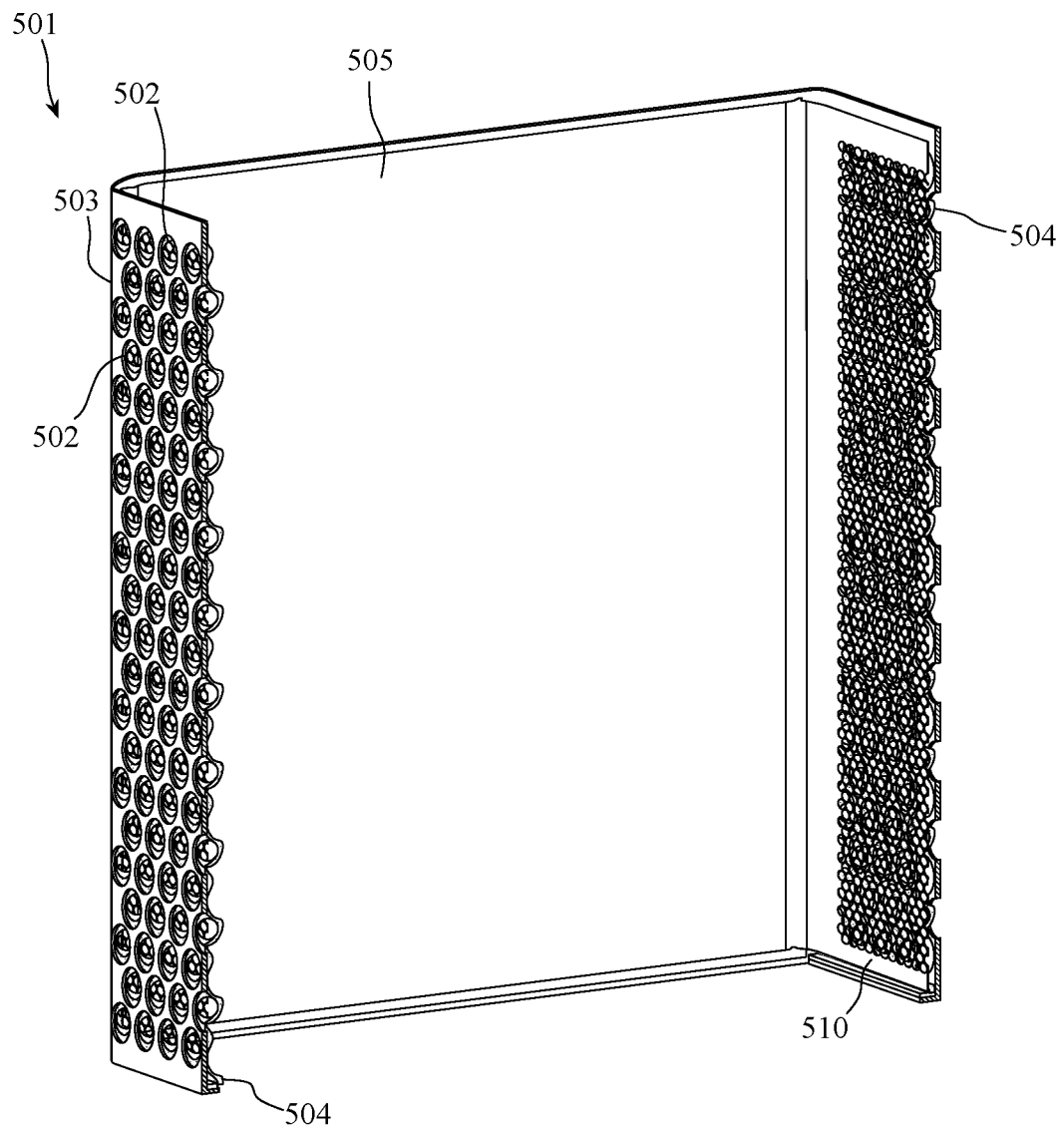
FIG. 11B illustrates an exploded view of components of an electronic device.

As shown in FIG. 11B, in some examples, a mesh component or plate 510 can be disposed substantially adjacent to a surface of the shell 501, for example, a surface at least partially defined by the interior portion 504 that at least partially defines the internal volume of the device 500. Thus the interior portion 504 can act to maintain a desired distance between the exterior portion 503 and the mesh component 510, for example, to provide a desired level of EMI or EMC noise shielding. In some examples, the interior portion 504 can have any desired thickness or thicknesses, such as up to about 1 mm, up to about 3 mm, or up to about 10 mm, or even more.

Figures 11C, 11D:
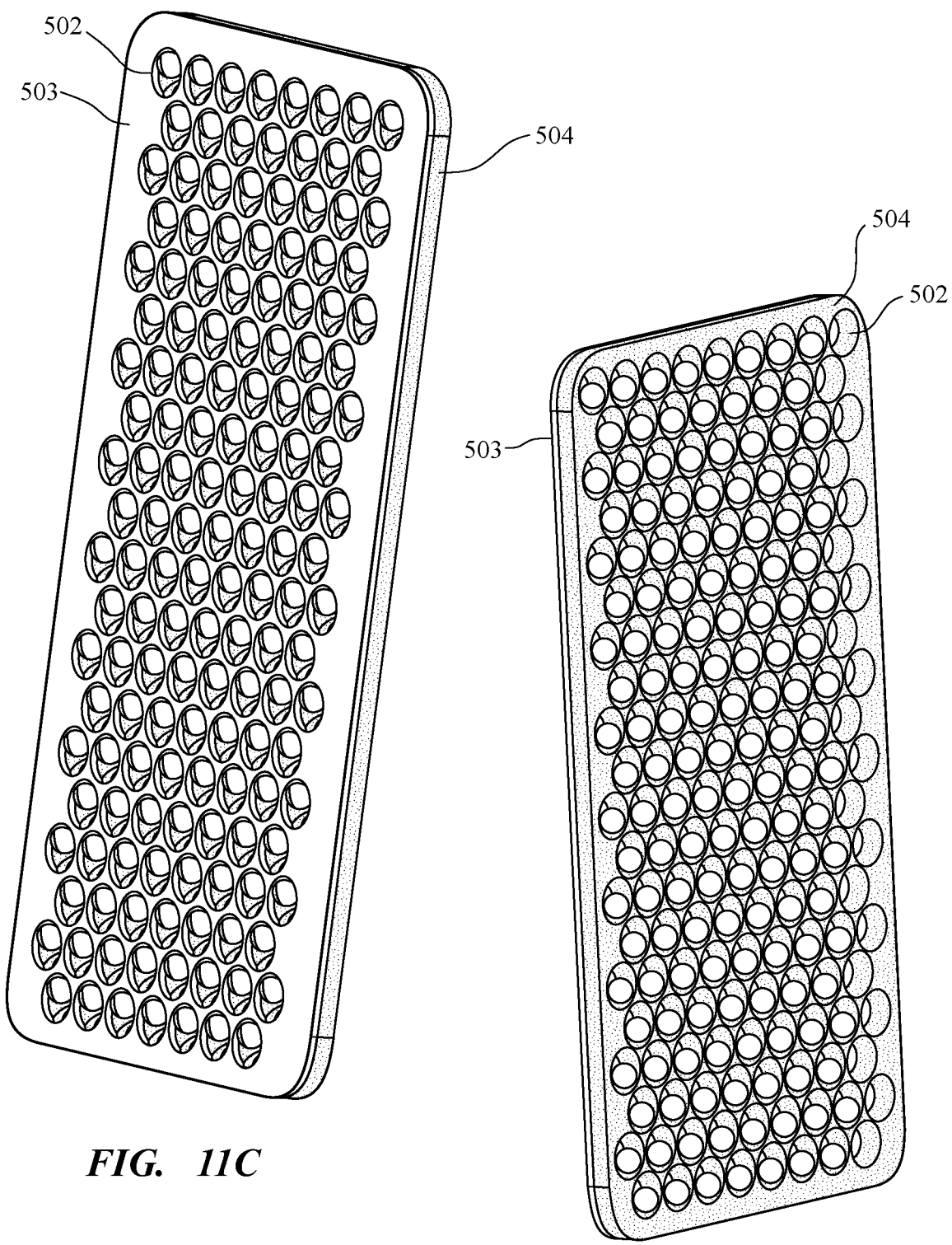
FIG. 11C illustrates a front perspective view of a component of an electronic device.
FIG. 11D illustrates a rear perspective view of a component of an electronic device.

FIGS. 11C and 11D illustrate perspective views of a section of the shell 501, for example, a front section of the shell 501. In some examples, the shell 501 can be assembled from or can include multiple sections or panels that can be joined together or to other components. The sections of panels of the shell 501 can be joined by any means known in the art or developed in the future, for example with adhesives, welding, and/or attachment hardware such as screws or bolts. As can be seen, in some examples, a section of the shell 501 can include an exterior portion 503 and an interior portion 504 bonded thereto, as described herein. The exterior portion 503 and the interior portion 504 can both at least partially define an aperture 502 through the shell 501 and can combine to form the structures described herein with respect to FIGS. 10A-10F. Further details regarding an electronic device including a shell, a frame, and various additional components are described with respect to FIGS. 12-16 below.

Figure 12:
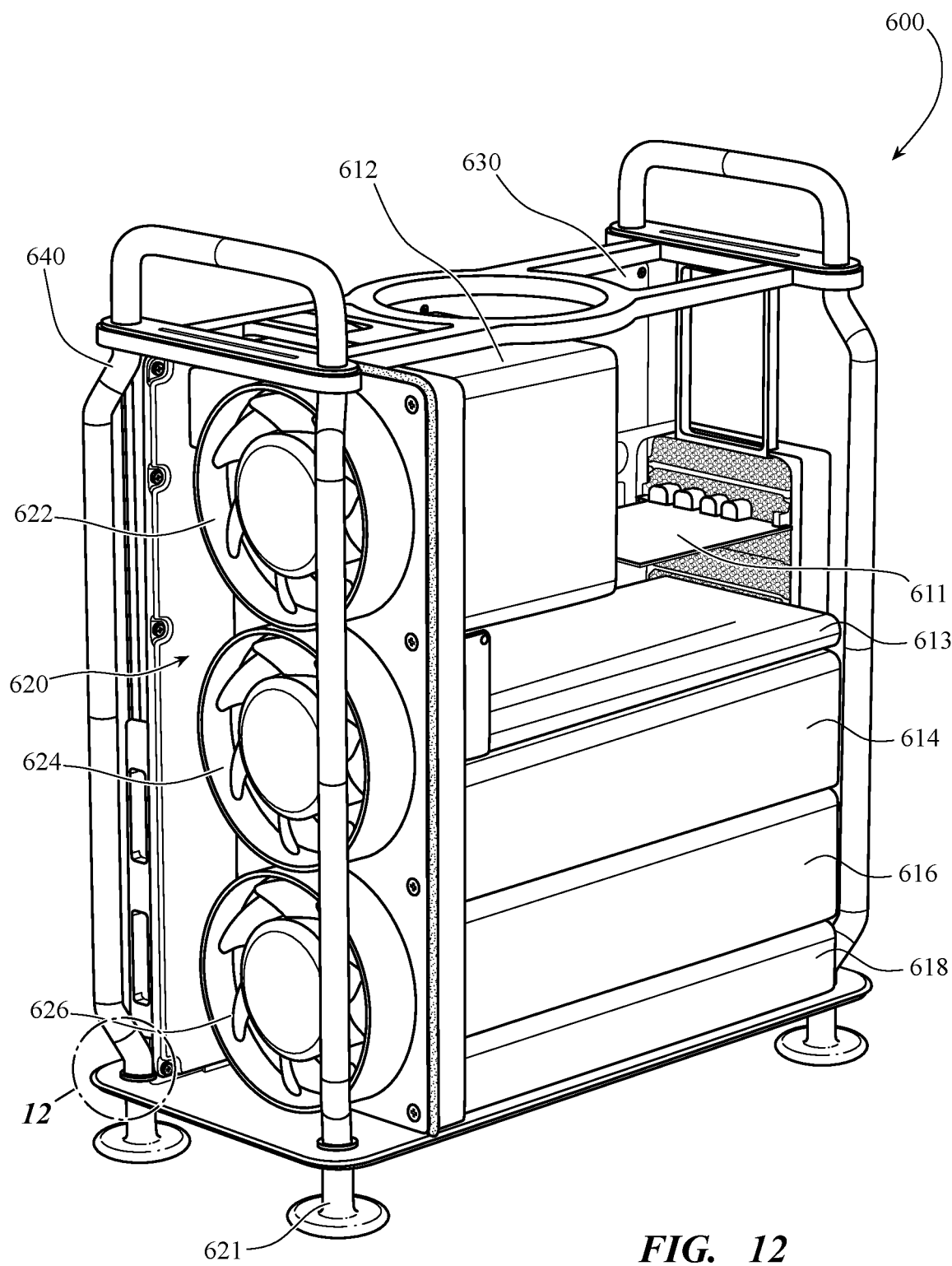
FIG. 12 illustrates a perspective front view of the interior of an electronic device.

FIG. 12 illustrates a perspective view of the interior of an electronic device 600. The electronic device 600 is merely one representative example of a device that can be used in conjunction with the systems and concepts disclosed herein. The electronic device 600 can be, for example, a desktop computer and can be substantially similar to, and include any of the features of the electronic devices 100, 200, and 400 described herein. The electronic device 600 can include a housing, such as the housings 201, 401, 501, described herein, that can define an internal volume and at least partially define an exterior surface of the electronic device 600. In the present example, the shell, which can be similar to shells 201, 401 described herein, is not shown.

The electronic device 600 can include a frame or chassis 640 that can connect to and at least partially support the shell when it is secured to the electronic device 600. The chassis 640 can also define a lower or bottom exterior surface of the device 600. Together, the housing and the chassis 640 can substantially define the exterior surface of the device 600. The chassis 640 can further provide structural support to the electronic device 600. The components of the electronic device 600 can be affixed to the housing and/or the chassis 640 via internal surfaces, attachment features, threaded connectors, studs, posts, and other fastening systems, that are formed into, extending into the body from, or otherwise part of the housing and/or the chassis 440.

In the present example, the main logic board 630 can divide and separate the internal volume into a plurality of zones, such as a first zone and a second zone. FIG. 12 provides a view of the first zone of the internal volume of the electronic device 600. In this example, the main logic board 630 is sized and positioned within the internal volume defined by the housing such that the main logic board 630 extends substantially an entire height and width of the internal volume, thereby dividing the internal volume into a first zone located on one side of the main logic board 630, and a second zone located on the other, opposite side of the main logic board 630.

A number of electronic, electrical, and other components of the electronic device 600 can be disposed within the first zone and can be connected to a first surface or side of the main logic board 630. In this example, a CPU 612, one or more graphics processing units (GPUs) such as GPUs 614 and 616, a power supply unit 618, and a first air-moving apparatus 620, are connected to the first side of the main logic board 630. In some examples, one or more of the components can be directly connected to the main logic board 630, for example, by soldering or by interfacing with one or more ports, such as PCIe ports on the main logic board 630. The electronic device 600 can include additional electronic components that are connected to the main logic board 630, for example, by ports disposed on the main logic board 630. In some examples, the ports can include one or more ports to connect components such as expansion cards to the electronic device 600 through an expansion bus. Accordingly, in some examples, the main logic board 630 can include one or more computer expansion bus interconnects, for example, serial computer expansion bus interconnects such as PCIe slots. The interconnects can allow a user to add additional components, such as components 611 and 613 to the electronic device 600, to allow for additional functionality, as desired.

Further, the configuration of the components within both the internal volume and the first zone, as well as the location of the expansion slots on the main logic board 630, allow for a high level of access to the components when the housing is removed from the electronic device 600, as shown. Thus, a user or a technician can easily add, remove, or replace the components of the electronic device 600 when the housing has been removed.

As described with respect to electronic device 200, the electronic device 600 can include a first air-moving apparatus 620 that can include one or more air-moving components, such as fans. In the present example, the air-moving system can move air from the ambient environment into the first zone through, for example, holes in the housing, to create a positive air pressure in the first zone relative to the ambient environment. The first air-moving apparatus 620 can include a first fan 622, a second fan 624, and a third fan 626. The fans 622, 624, 626 can be affixed together to a component that is secured to, for example, the chassis 640. The first air-moving apparatus 620 can, according to one example, extend substantially an entire height of the electronic device 600, effectively moving a wall of air into the first zone and past the components located therein. In some examples, the speed of each fan 622, 624, 626 can be independently controlled, such as by a processor of the electronic device 600, to create a desired location and amount of airflow into the first volume. In some examples, a fan blade diameter of the fans 622, 624, 626 can be about 140 mm.

The arrangement of the first air-moving apparatus 620 with respect to the components and expansion slots in the first zone allows for the addition or removal of various components from the electronic device 600 without substantially impacting the airflow pathways through the electronic device 600. Whereas the addition of components to a traditionally configured computer can result in airflow blockages and dead spots, the use of zones and a first air-moving apparatus 620 that extends substantially the entire height of the first zone allows for airflow to be provided to the components without regard to whether additional components have been added or removed, thereby achieving a desired level of airflow and heat removal that is compatible with a highly modular and customizable design. As described with respect to electronic device 200, in some examples, the electronic device 600 can include support features, such as feet 621 that are affixed or connected to the frame 640. Additional details of the frame and support features of electronic device 600 are provided below with reference to FIGS. 13A-C.

Figure 13A:
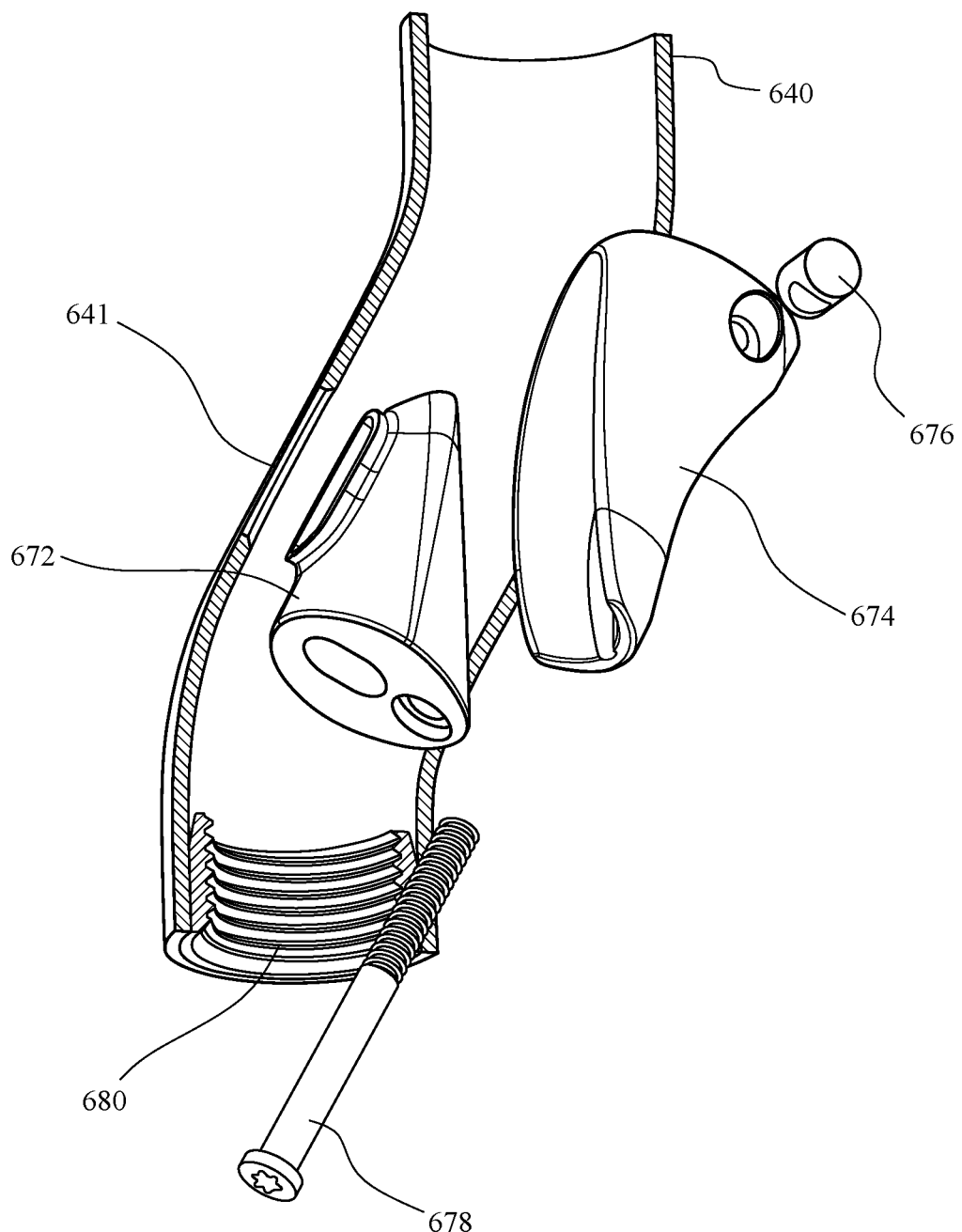
FIG. 13A illustrates an exploded cross-sectional view of a portion of an electronic device.

FIG. 13A illustrates an exploded cross-sectional view of the portion of the frame 640 indicated in FIG. 12, for example, a portion adjacent to one of the support features 621. As can be seen, in some examples, various components can be positioned or contained within a hollow space defined by the tubular member of the frame 640. As shown, the hollow tubular portion of the frame 640 can define a port or aperture 641 that allows for access into the internal space defined by the tubular member of the frame 640.

This aperture 641 can allow a user or technician to access the one or more components that can be contained therein. Additionally, in order to provide a pleasing cosmetic appearance and to limit the accessibility of the remainder of the hollow space defined by the tubular member of the frame 640, a trim ring 672 can be contained with the hollow space and can be disposed substantially adjacent to the aperture 641 such that an aperture of the trim ring 672 substantially abuts the aperture 641. In some examples, the trim ring 672 can be held in place within the frame 640 by a wedge 674 that is configured to receive a nut 676 and a screw 678 which can retain the wedge 674 and the trim ring 672 in a desired location. Thus, when a user or technician seeks to access the interior of the frame 640 through the aperture 641, the trim ring 672 can define which portions of the frame 640 are accessible and block access to certain other undesired locations within the frame 640.

Figure 13B:
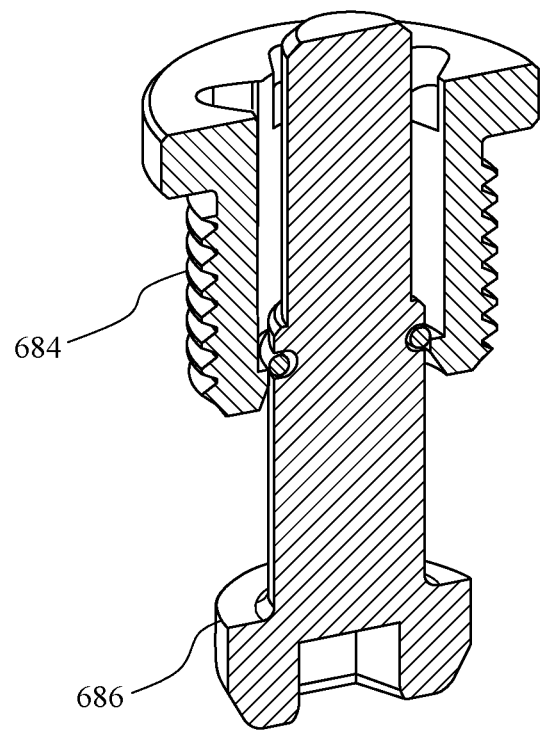
FIG. 13B illustrates a cross-sectional perspective view of a component of an electronic device.
Figure 13C:
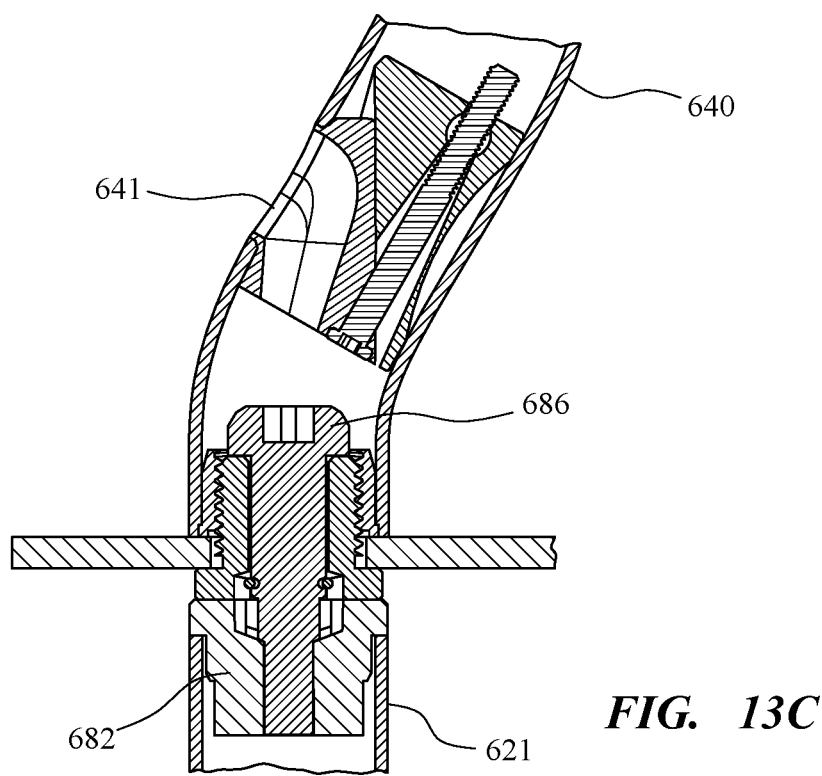
FIG. 13C illustrates a cross-sectional side view of a component of an electronic device.

Turning now to FIGS. 13B and 13C, a user can seek to access the interior of the frame 640 through the trim ring 672 in order to manipulate a captive attachment member 686 that can be stored therein. In some examples, the attachment member 686 can be a screw or bolt, although any form of attachment member can be used, as desired. The attachment member 686 can be retained in the frame 640 by a retention member 684 that can engage with a corresponding feature on the interior of the frame 640, for example, the threads 680 of FIG. 13A. The retention member 684 can hold the attachment member 686 in a desired position until such time as it is manipulated by a user or technician, for example, by inserting a screw driver or other tool into the aperture 641 through the trim member 672 to engage with the attachment member 686. During use, the tool can drive the attachment member 686 to displace it towards, for example, the bottom portion of the frame 640. In this way, the attachment member 686 can thus be moved to protrude from the frame 640 whereupon it can engage with a corresponding engagement feature of a component, such as a support feature 621, for example, a foot or caster, disposed adjacent to the frame 640. In some examples, the support feature 621 can include a threaded portion 682 corresponding to threads of the attachment member 686 and the engagement between the attachment member 686 and the support feature 621 can affix the support feature to the frame 640. In examples where a user or technician may seek to remove or replace the support feature 621, the retention member 684 can retain the attachment member 686 at least partially within the frame 640 in order to ease future alignment and attachment of a support feature. Further features of electronic device 600 and related components are described with respect to FIG. 14.

Figure 14:
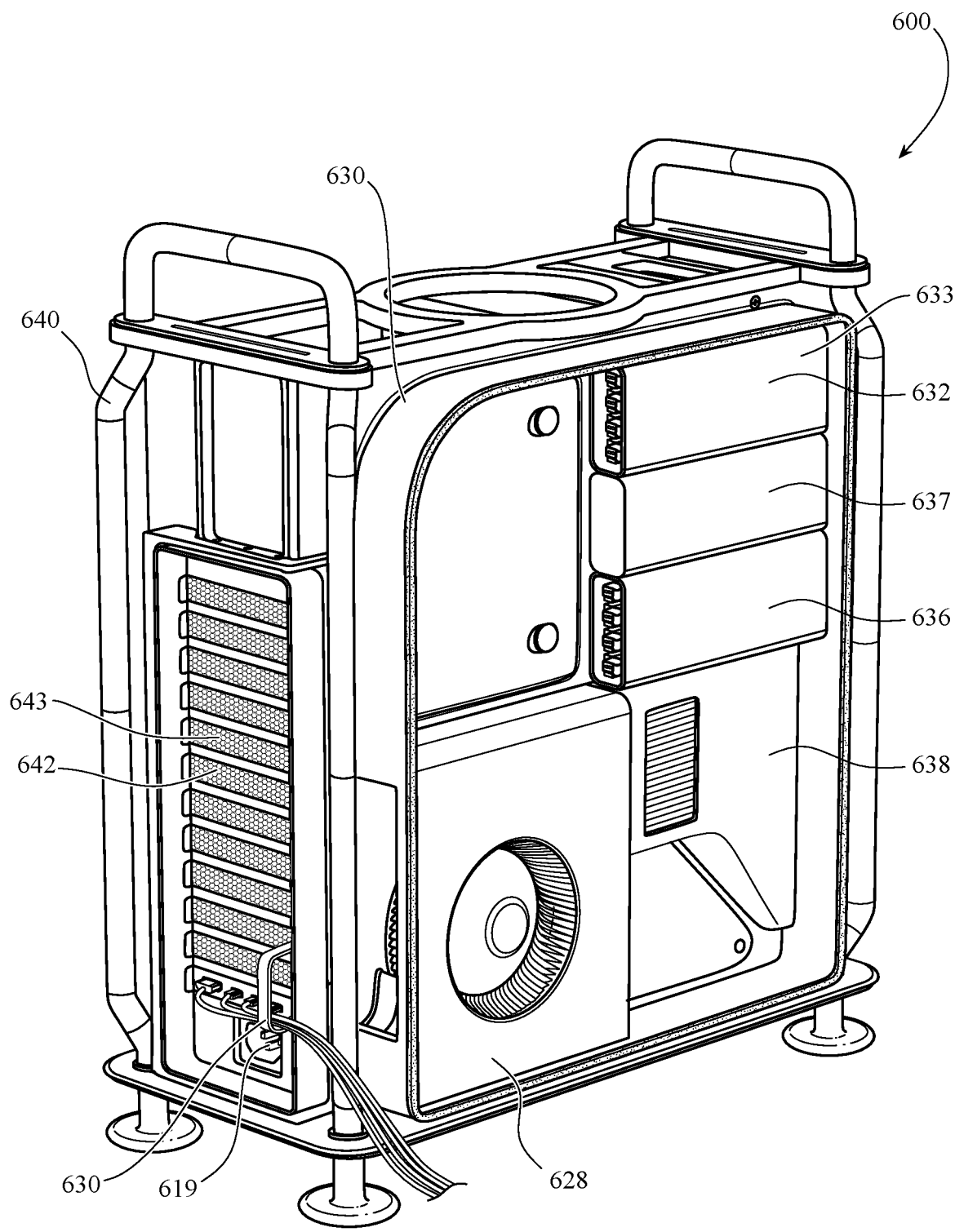
FIG. 14 illustrates a perspective rear view of the interior of the electronic device of FIG. 12.

FIG. 14 illustrates a perspective view of the interior of an electronic device 600. Whereas FIG. 12 depicts the right side of the electronic device 600 including the first zone, FIG. 14 shows the left side of the electronic device 600 including the second zone. In some examples, a component, such as the main logic board 630, can divide the internal volume into a plurality of zones. While the components described above with respect to FIG. 12 are connected to one side or surface of the main logic board 630, the electronic device 600 can include components disposed in the second zone and connected to a second, different side of the main logic board 630. In some examples, the electronic device 600 can include one or more memory modules 632, 636, such as, dual inline memory modules (DIMMs). The memory modules 632, 636 can be positioned and electrically connected to the main logic board 630. Each DIMM can also have a cover 633, 637 associated therewith, as described further herein. The electronic device 600 can also include data storage, for example, in the form of a drive such as solid-state drive (SSD) 638. The SSD 638 can be disposed in the second zone and can also be positioned on the main logic board 630. The SSD 638 can be electrically connected to one or more other components of the electronic device 600.

The air-moving system of the electronic device 600 can further include a second air-moving apparatus 628 positioned within the second zone. In the present example, the second air-moving apparatus 628 can include a blower 628 to move air from the second zone to the ambient environment through the housing, for example, through holes formed in the housing. In this way, the second air-moving apparatus 628 can produce a negative air pressure in the second zone relative to the ambient environment. Creation of the negative air pressure in the second zone causes a flow of air across the components in the second zone. Although the second air-moving apparatus 628 is described as a blower, in some examples, any suitable component capable of moving air or producing airflow can be included in the first air-moving apparatus 620. As used herein, the term blower can refer to a centrifugal fan that can include, for example, an impeller and a ducted housing to direct air moved by the impeller.

The electronic device 600 can include an interface panel 642 that can be substantially similar to the interface panel 220 described with respect to FIG. 3. The interface panel 642 can also include various ports that can be used to communicate data and/or power between the electronic device 600 and various external systems. For example, the interface panel 642 can include an alternating current (AC) power input port 619, which can be sized and shaped to accept a power plug suitable for transferring external power to the power supply unit 618 of the electronic device 600. The interface panel 642 can also include one or more holes, apertures, or perforations that allow air to be moved through the interface panel 642. For example, the interface panel can be located at an edge of a zone, such as the first zone, and air can be moved from the first zone to the ambient environment through the interface panel 642. In some examples, the interface panel 642 can include multiple faceplate portions 643, each faceplate portion 643 defining a number of apertures or through holes. In some examples, a faceplate 643 can be sized to correspond to the dimensions of an associated component connected to an associated PCIe slot. For example, a faceplate 643 can have a height and width that are substantially similar to a height and width of a component such as component 613. In some examples, the faceplate 643 can even be attached or affixed to the component 613. Thus, in some examples, the electronic device 600 can include the same number of faceplates 643 as components connected to PCIe slots in the device 600. The perforated faceplate 643 assists in providing EMC shielding for the components of the electronic device 600 while also allowing airflow to pass therethrough to assist with thermal management. Additionally, the apertures provide a low frontal surface area of the faceplates 643 which prevents significant amounts of thermal transfer to, for example, a user touching the faceplate 643, even if the faceplate itself is at an elevated temperature. Further details regarding the electronic device 600 and the function of components such as the DIMM covers 633, 637 are described with reference to FIG. 15.

Figure 15:
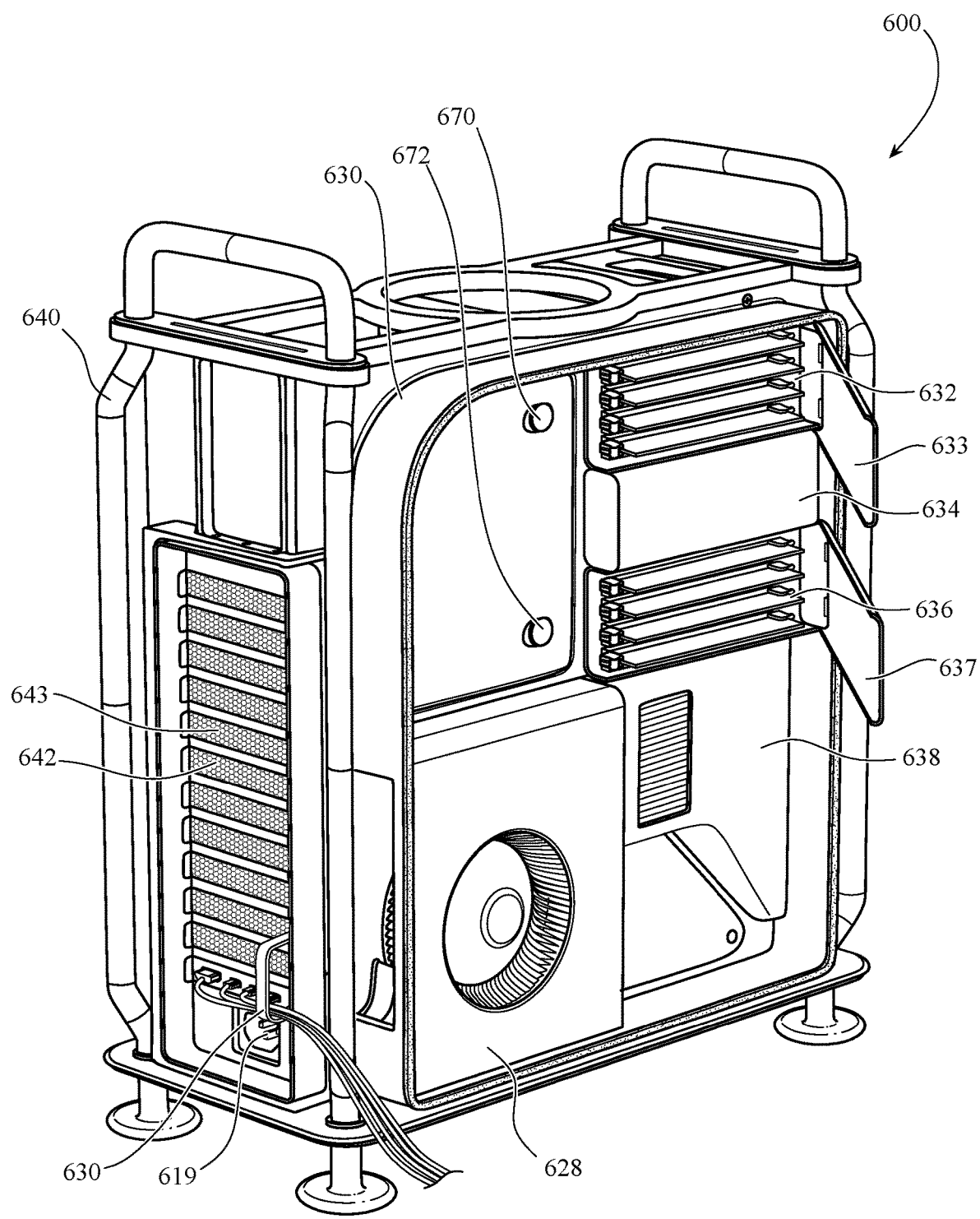
FIG. 15 illustrates a perspective rear view of the interior of the electronic device of FIG. 12 including components in an alternate configuration.

FIG. 15 illustrates electronic device 600 in a manner similar to FIG. 14, but including DIMM covers 633 and 637 moved to an open position, thereby exposing the associated DIMMs 632, 636. In the closed position, for example, as shown in FIG. 15, a DIMM cover 633 can serve to separate airflow between a DIMM 632 and other components of the electronic device 600, such as the SSD 638, in order to control airflow and achieve a desired level of thermal management of the various components of the device 600. Thus, a DIMM cover 633 can cover a portion of the DIMM 632 in the closed position, such as a top portion, while maintaining an opening on the side portions of the DIMM 632, thereby defining an airflow channel or pathway under the DIMM cover 633 and over, for example, heatsink portions of the DIMM 632. The size and shape of the DIMM cover 633 can be chosen as desired to achieve desired levels of airflow management. Additionally, the various apparatuses and components of the air-moving system can be controlled, for example, by a processor, to provide desired levels of airflow to the DIMMs 632, 636, depending on a variety of variables, for example, a level of use by certain applications running on the electronic device 600.

A DIMM cover 633 can be retained in a locked or closed position, for example, as shown in FIG. 14, by a locking mechanism. The locking mechanism can include a toggle or latch, for example, toggles or latches 670, 672 that can be manipulated by a user to unlock and open the corresponding DIMM covers 633, 637. In some examples, the locking mechanism can include one or more springs that can force the cover 633, 637 into an open position when the toggle is manipulated by a user to an unlocked state. Further, the toggle can include a visible indicator that can provide a visible indicia of whether the toggle 670, and thus the associated DIMM cover 633 is in a locked or an unlocked state. When a user seeks to close the DIMM cover 633, the user can manipulate or move the cover 633 into the closed position, whereupon it can engage with the locking mechanism. This engagement with the locking mechanism can occur automatically when the cover 633 is moved to a closed position to automatically lock the cover 633. The automatic engagement can also cause the toggle to move from the unlocked state to the locked state and can cause the visual indicator to display a correct associated visible indicia. In some examples, the visual indicator can include multiple colors, each color associated with a locked or unlocked state and being displayed when the toggle is in such a state. In some examples, the visual indicator can include an associated graphic or graphics, or a light, such as an LED light. Further details of the interior of electronic device 600 are described below with reference to FIG. 16.

Figure 16:
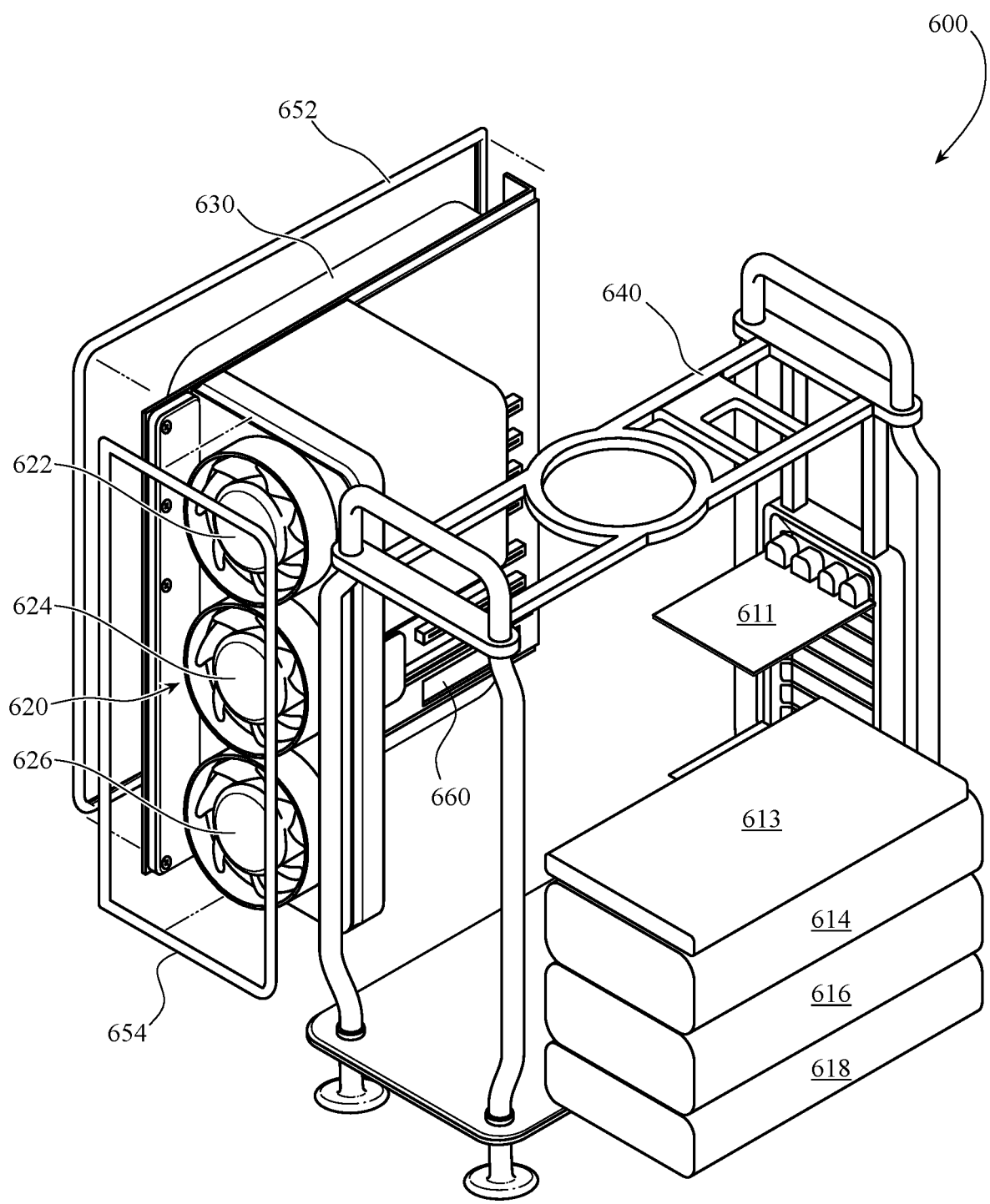
FIG. 16 illustrates an exploded view of the interior of the electronic device of FIG. 12.

FIG. 16 shows an exploded view of the electronic device 600 including the chassis 640, the components disposed within the internal volume, and the air-moving system. As described herein, a component, in this example the main logic board 630 disposed within the internal volume, can serve to divide the internal volume into a plurality of zones. In the present example, the main logic board 630 spans two major dimensions of the internal volume defined by the housing, to thereby divide the internal volume into two zones. Further, the first zone and the second zone can be fluidically isolated from one another, except at one or more desired locations.

In some examples, the electronic device 600 can further include one or more seals that can prevent airflow at undesired locations, such as, for example, between zones defined by the main logic board 630. When the housing is situated on the electronic device, the main logic board 630 and the housing together prevent airflow between zones by providing a physical barrier to airflow. Accordingly, it can be undesirable for unanticipated or unintentional gaps or spaces to exist where the housing and main logic board 630 meet because these gaps can allow undesired airflow and can inhibit the creation of a pressure differential between the zones, as described herein. In order to ensure that the zones are fluidically isolated from one another, except at desired locations, one or more sealing components can be used to create an air impermeable seal at desired locations between the housing and the main logic board 630. In the present example, a seal or sealing component 652 can at least partially surround the main logic board 630, and in some examples, can substantially surround an entire perimeter of the main logic board 630. The seal 652 can include any compressible or compliant material as desired, such as, for example, a polymer material such as rubber that is capable of forming a substantially air impermeable seal between components of the electronic device 600. When the housing is situated on the electronic device 600, the alignment of the housing and a component, such as the main logic board 630, can cooperate with the seal 652 to form a substantially air impermeable barrier. For example, the housing and the main logic board 630 can exert pressure on the seal 652, and in some examples can compress the seal 652, to create a substantially air impermeable barrier.

In some examples, the electronic device 600 can include one or more additional sealing components, for example, at any location in the device 600 where airflow is not desired. In some examples, a seal 654 can at least partially surround one or more other components of the electronic device 600, such as the first air-moving apparatus 620. In the present example, the seal 654 substantially surrounds the first air-moving apparatus 620 and cooperates with the housing to prevent airflow from the first zone back to the ambient environment at this location. In some examples, where the first zone has a positive air pressure, a seal such as the seal 652 can help prevent or inhibit backflow, i.e., airflow from the first zone into the ambient environment at undesired locations.

In some examples, the zones can be fluidically isolated by a main logic board 630 that is substantially impermeable to airflow, except at one or more desired locations. In this way, the main logic board 630 serves to selectively inhibit the movement of air between the first zone and the second zone except at the desired locations. Thus, in some examples, the component such as the main logic board 630 can include or be constructed from a material that is substantially impermeable to airflow. In order to control the airflow between zones, the main logic board 630 can include an aperture or through-hole 660 that can serve to fluidically connect the first zone and the second zone, and can allow air to predictably flow between the zones through the aperture 660. As described further herein, in some examples, one zone can have a positive air pressure while another zone can have a negative air pressure. Accordingly, the relative pressure of each zone will drive air to flow from the positive air pressure zone to the negative air pressure zone, while the aperture 660 provides the path of least resistance for this flow to occur, thereby controlling the location of airflow between the zones.

FIG. 16 also shows the arrangement of the components, for example, components 611, 613, 614, 616, and 618 in the first zone of the internal volume can maximize or increase the surface area of the components exposed to air being moved by the first air-moving apparatus 620. In some examples, one or more of these components can include a heatsink, for example, in the form of a highly thermally conductive material that can transfer heat between the operational parts of the component and the passing air. The orientation of these components with respect to the airflow driven by, for example, the first air-moving apparatus 620, as enabled by the dual-sided configuration of the main logic board 630, can allow for the maximization of heatsink surface area that is exposed to flowing air, as compared to traditional computer and electronic device architectures. Additionally, each component 611, 613, 614, 616, and/or 618 can be a modular component and can include its own processor and attachment feature or features that are configured to engage with a corresponding portion of the frame 640 to retain the modular component in a space defined by the frame sized to correspond to the modular component. A modular component can be secured to the frame 640 of the electronic device by a retention component, such as a clamp plate, that includes an aperture and affixes the component to the frame, for example, by an attachment member, such as a screw, that passes through the aperture of the clamp plate whereupon it can engage with the attachment features of the modular component and frame 640 to retain the modular component. Additional embodiments of the structure and arrangement of an electronic device including a housing defining an internal volume divided into one or more zones by a component or components within the internal volume are described below, with reference to FIGS. 17A-C.

Figure 17A:
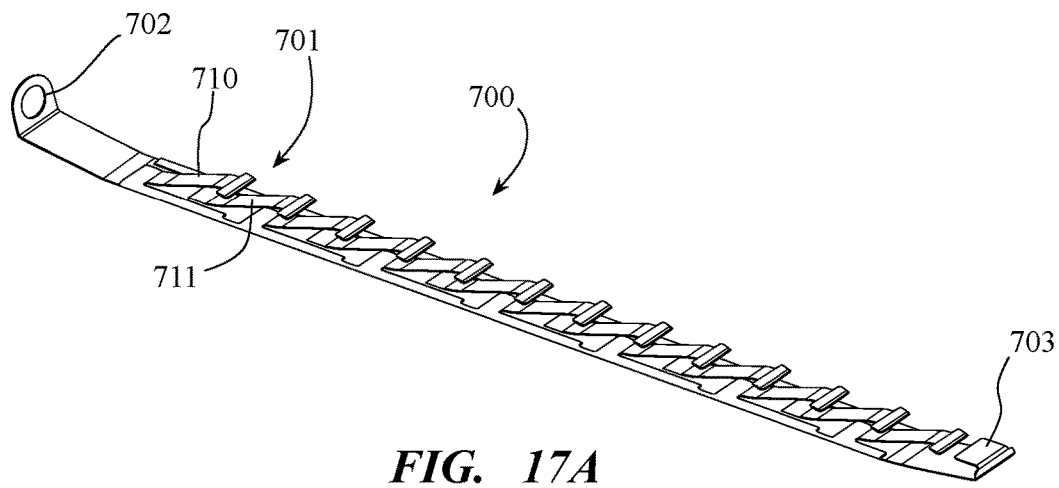
FIGS. 17A-C illustrate various views of a component of an electronic device.
Figure 17B:
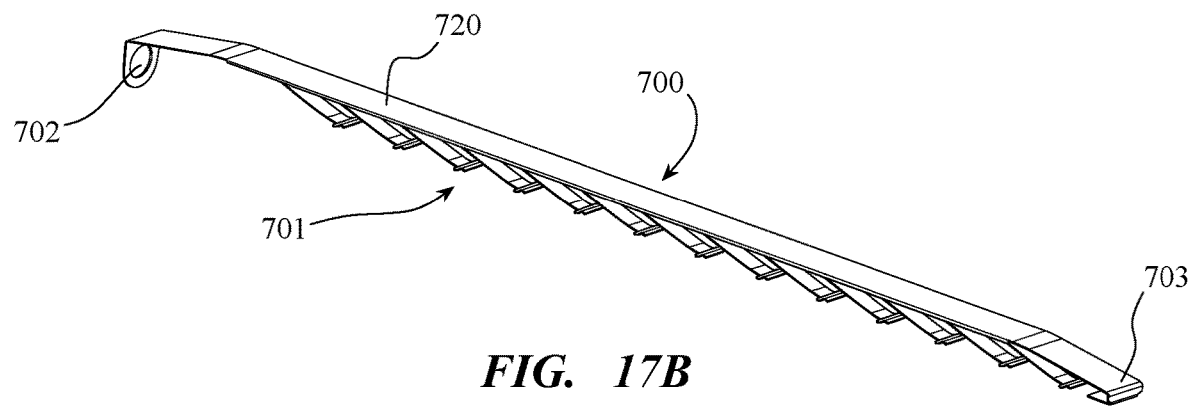

FIGS. 17A and 17B illustrate top and bottom perspective views of a grounding member or grounding component 701 of an electronic device 700, for example, electronic devices 200, 400, 600 described herein, that can facilitate the electrical grounding of one or more components of the electronic device. In some examples, the component 701 can be formed from a metallic material, such as steel or aluminum, although substantially any conductive and flexible material can be used, such as conductive polymers. In some examples, the grounding component 701 can be formed from a single piece of metal, for example, it can be stamped from a single piece of sheet metal.

The grounding component 701 can include an elongated body including a first set of arms 710 extending from a first side of the body and folded thereover. The grounding component 701 can also include a second set of arms 711 extending from a second side of the body opposite the first side. The second set of arms 711 can also be folded over the body. The sets of arms 710, 711 can be offset from one another such that an arm 711 of the second set is positioned between two arms 710 of the first set when the first set of arms 710 and the second set of arms 711 are folded over the body. In this way, the sets of arms can act as leaf springs to provide a flexible electrical contact between a component and another portion of the electronic device.

Figure 17C:
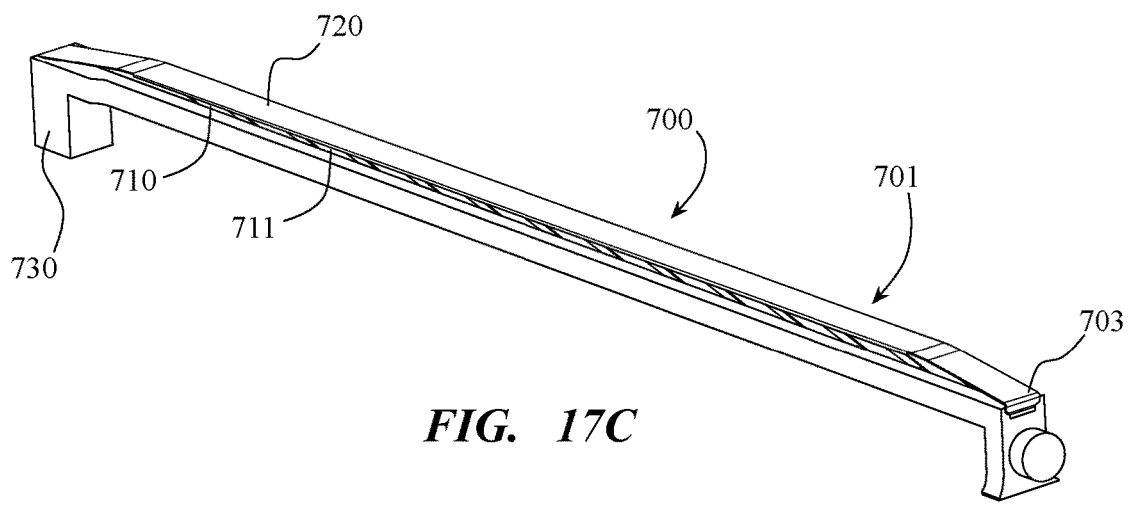

FIG. 17C shows the grounding component 701 attached to a portion of a component 730, for example, by an aperture 702 defined by the grounding component 701 and a hook 703 disposed opposite the aperture 702. The grounding component 701 can be connected to a component 730 by mating the aperture 702 to a corresponding male attachment feature of the component 730 and by engaging the hook or lip 703 with an edge of the component 730. Thus, the arms 710, 711 can directly contact the component 730 and form an electrical connection therewith, while the surface 720 of the grounding component 701 provides a large area for contacting the frame or some other portion of the electronic device to ground the component 730. The spring force generated by the arms 710, 711 of the grounding component 701 ensures that electrical contact is maintained between the component 730 and an electrical ground, even if the component 730 is not perfectly aligned. Further, the arms 710, 711 of the grounding component 701 are arranged so that it is robust to shearing forces. The grounding component 701, or multiple grounding components, can be used to connect any of the electronic device components described herein to an electrical ground, as desired. Additional embodiments of the structure and arrangement of an electronic device, including a housing defining an internal volume divided into one or more zones by a component or components within the internal volume are described below, with reference to FIG. 18.

Figure 18:
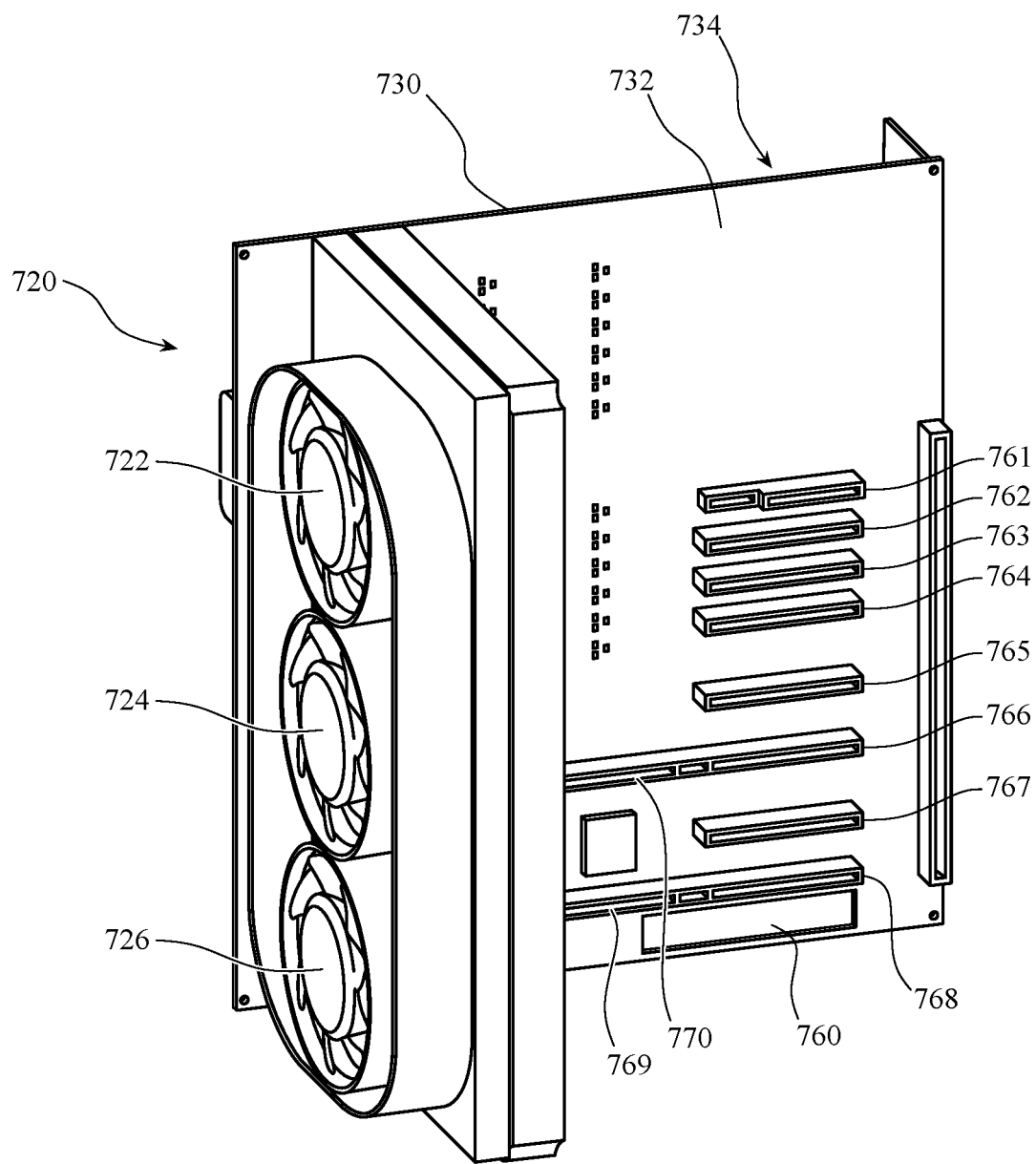
FIG. 18 illustrates a side perspective view of a component of an electronic device.

FIG. 18 shows a perspective view of a component of an electronic device, such as, a main logic board 730. In some examples, the electronic device can be substantially similar to and can include some or all of the features of the electronic devices 100, 200, 400, and 600 described herein. Further, the main logic board 730 can be substantially similar to and can include some or all of the features of components 430 and 630 described herein.

In the present example, the main logic board 730 can be, for example, a printed circuit board including a polymeric substrate. In some examples, the main logic board 730 can include any substrate material as desired, for example, composite materials such as fiberglass material, polymer-based composite, metals, and combinations thereof. The main logic board 730 can include a first surface 732 and a second surface 734 disposed opposite the first surface 732. In some examples, however, the main logic board 730 can have substantially any shape and amount or orientation of surfaces, as desired.

As shown, in some examples, one or more components of the air-moving system of the electronic device can be affixed or otherwise connected to the first surface 732 of the main logic board 730. In some examples, the first air-moving apparatus 720, including a first fan 722, a second fan 724, and a third fan 726 can be connected to the main logic board 730. In this way, the main logic board 730 and the first air-moving apparatus 720 can cooperate to fluidically isolate the first zone from the second zone and the ambient environment. As described herein, other components of the electronic device can be directly connected to the first surface 732 of the main logic board 730, for example, by soldering or other methods of fixture. In some examples, the first surface 732 of the main logic board 730 can include one or more expansion slots. For example, the first surface 732 of the main logic board 730 can include one or more computer expansion bus interconnects. In some examples, a computer expansion interconnect can be serial or parallel computer expansion bus interconnects such as PCI or PCIe slots. The interconnects 761, 762, 763, 764, 765, 766, 767, 768, 769, and 770 can allow a user to add and connect additional components to the electronic device to allow for additional functionality, as desired. Although FIG. 18 shows one particular arrangement of interconnects 761, 762, 763, 764, 765, 766, 767, 768, 769, and 770, the interconnects can be arranged in substantially any orientation on the first surface 732 of the main logic board 730. In some examples, the arrangement of the interconnects 761, 762, 763, 764, 765, 766, 767, 768, 769, and 770 can allow for the easy removal, addition, or replacement of one or more components, as described herein, providing modularity and configurability to the electronic device. In some examples, the main logic board 730 can include 10 interconnects, 11 interconnects, 12 interconnects, or even more.

The main logic board 730 can define an aperture or through-hole 760. The aperture 760 can serve to provide a fluid communication path between pressure zones on either side of the main logic board 730, as described herein. In some examples, the aperture 760 can have a substantially rectangular shape, as depicted. In some examples, the aperture 760 can have any shape or size as desired and as determined by, for example, a desired level of airflow through the aperture 760. In some examples, the main logic board 730 can define multiple apertures, as desired. In some examples, multiple apertures can be located at the approximate location of the aperture 760 or can be positioned at any location on the main logic board 730, as desired to provide a desired level or airflow therethrough. Additional details of the main logic board 730 are provided below with reference to FIG. 19.

Figure 19:
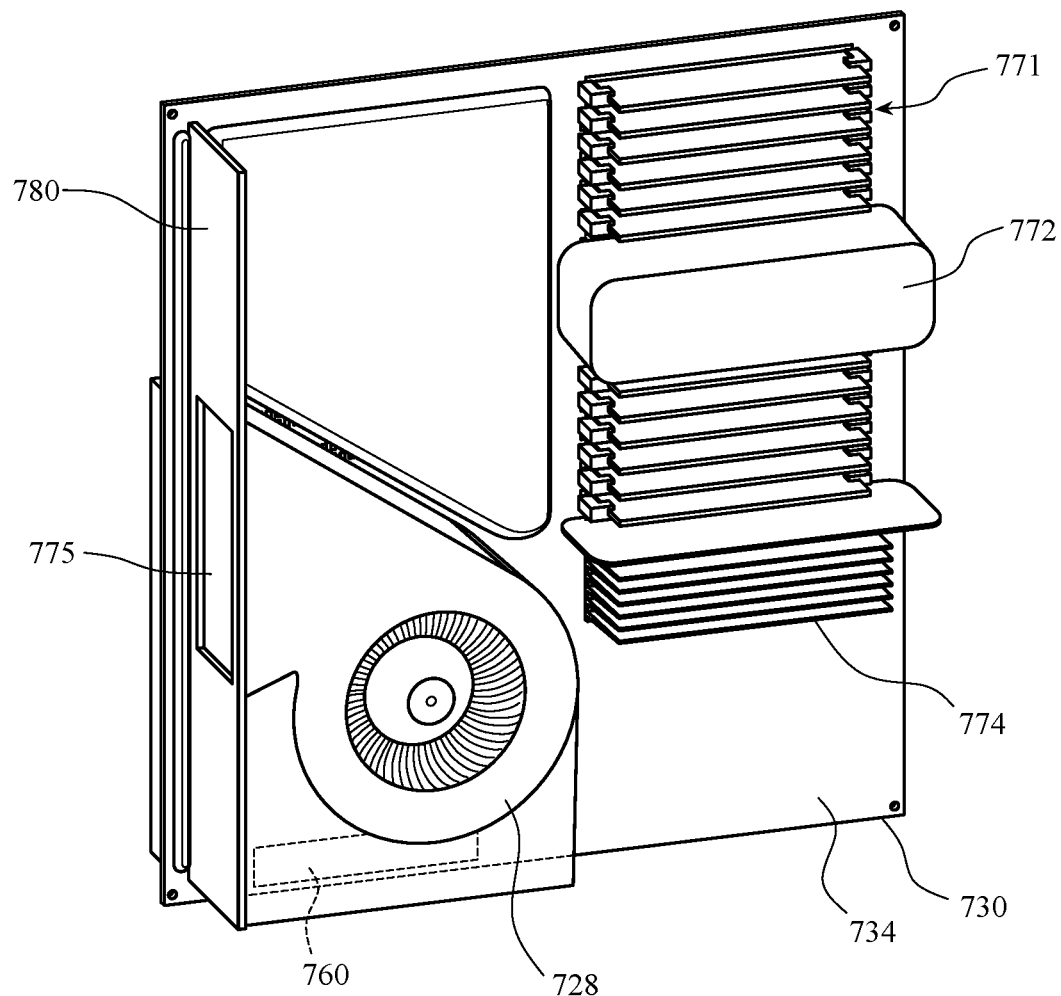
FIG. 19 illustrates a side perspective view of the component of FIG. 18.

FIG. 19 illustrates another perspective view of the main logic board 730, showing the second surface 734 disposed substantially opposite the first surface 732. As discussed herein, the main logic board 730 can include electronic components disposed on two opposite sides, thereby allowing for components of the electronic device to be positioned in different pressure zones, to allow for optimal cooling and thermal management, while still providing ease of access to a user or technician. Whereas components such as CPU and GPU can be connected to the first surface 732 of the main logic board 730, other components, such as memory components, can be positioned on the second surface 734.

In some examples, the main logic board 730 can include a number of slots 771 or connections that can receive modules, such as memory modules, which can be connected to the electronic device. In some examples, one or more memory modules 772, such as dual inline memory modules (DIMMs) can be connected to the main logic board 730. The main logic board 730 can also include components such as a heatsink 774 disposed on the second surface 734. Again, the position of a component such as a heatsink 774 on the second surface 734 allows air to flow past the heatsink 774 to provide cooling and thermal management, without interrupting or impeding airflow to other components, for example, those positioned on the first surface 732. As discussed, the air-moving system of the electronic device can include a second air-moving apparatus, for example, blower 728. In some examples, the blower 728 can be connected to or affixed to the main logic board 730, for example, via any manner of attachment features in the blower housing and/or main logic board 730. In some examples, the blower 728 can be positioned at least partially over or can cover or occlude all or some of the aperture 760 of the main logic board 730. In this way, the blower 728 can move air from the first zone into the second zone and out of the electronic device. That is, the blower 728 can pull or suck in air from the first zone through the aperture 760, as described herein, to create airflow between the zones and to provide a negative air pressure in the second zone. The second air-moving apparatus can also include a panel 780 that can serve to further seal or isolate the second zone, for example, by preventing air from flowing into the second zone from the ambient environment at the location of the panel 780. The panel 780 can also include a cut-out, through hole, or aperture 775 that can align with the exhaust of the blower 728 to allow the blower to expel air from the second zone into the ambient environment. Additional embodiments of the structure and arrangement of an electronic device including a housing defining an internal volume divided into one or more zones by a component or components within the internal volume are described below, with reference to FIG. 20.

Figure 20:
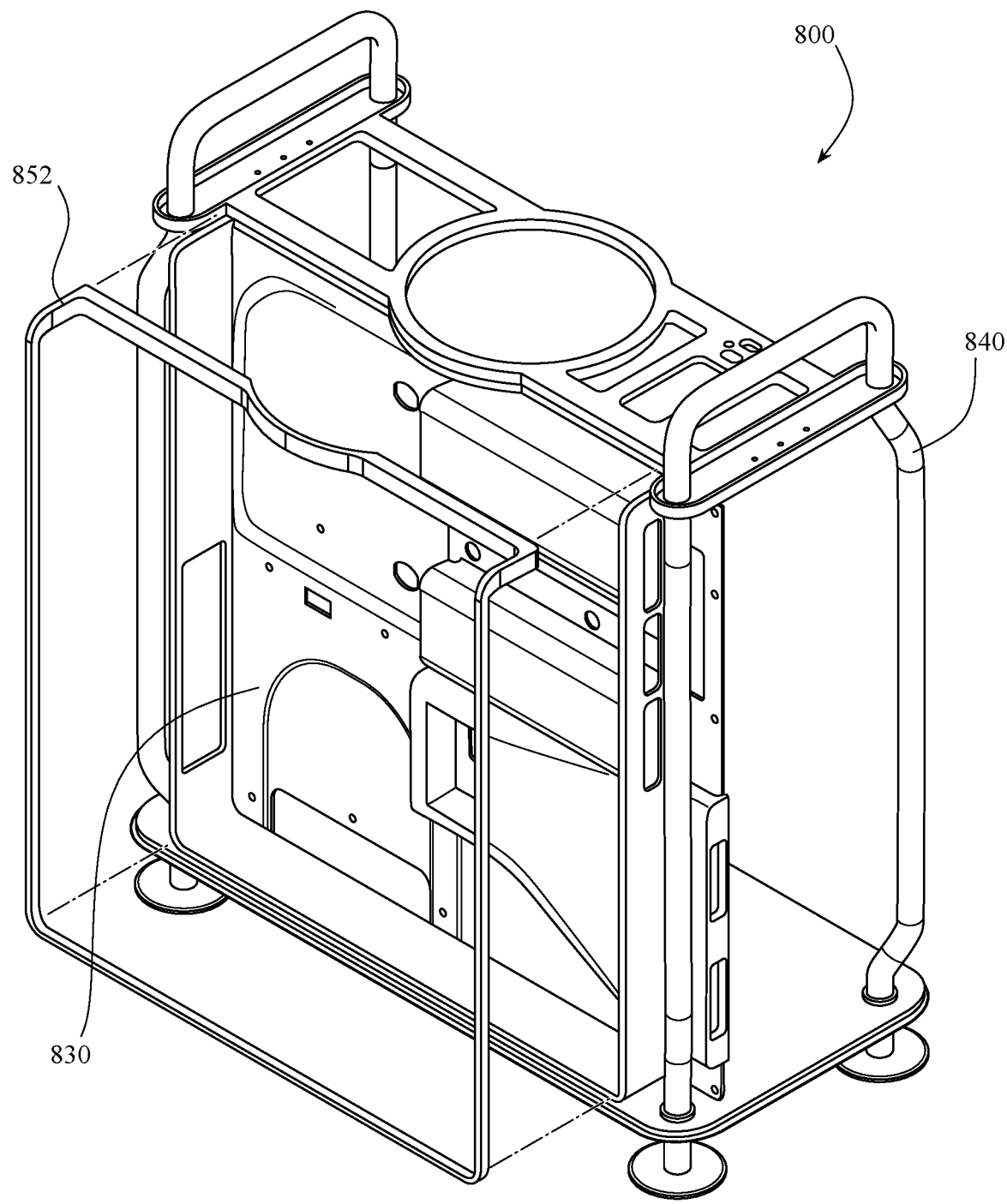
FIG. 20 illustrates a partially exploded perspective view of an electronic device.

FIG. 20 illustrates a perspective view of components of an electronic device 800 including a seal or gasket 852, a frame 840, and a component 830, such as a main logic board. The electronic device 800 is merely one representative example of a device that can be used in conjunction with the systems and concepts disclosed herein. The electronic device 800 can be, for example, a desktop computer and can be substantially similar to, and can include any of the features of the electronic devices 100, 200, 400, and 600 described herein. Additionally, the seal 852 can be substantially similar to the sealing component 652 described with respect to FIG. 16.

As shown, the seal 852 can include multiple portions that can be oriented in multiple directions with respect to the frame 840 and the electronic device 800. For example, top and bottom portions of the sealing member can run approximately along a length of the electronic device 800, for example, along a portion of the periphery of the main logic board 830, while side portions of the seal 852 can run substantially vertically and perpendicular to the top and bottom portions along a portion of the periphery of the main logic board 830. In this way, the seal 852 can ensure that any gap between the main logic board 830 and the frame 840 or the sleeve of the electronic device is filled to a desired degree to prevent undesired airflow therethrough. The seal 852 can include any compressible or compliant material as desired, such as, for example, a polymer material, such as rubber. Importantly, the material of the seal 852 as well as the placement and configuration, can be configured to prevent high levels of static friction between the seal 852 and a shell of the electronic device 800, such that the shell can be readily removed from the frame 840 and the seal 852 without the need for high levels of force.

Figure 21:
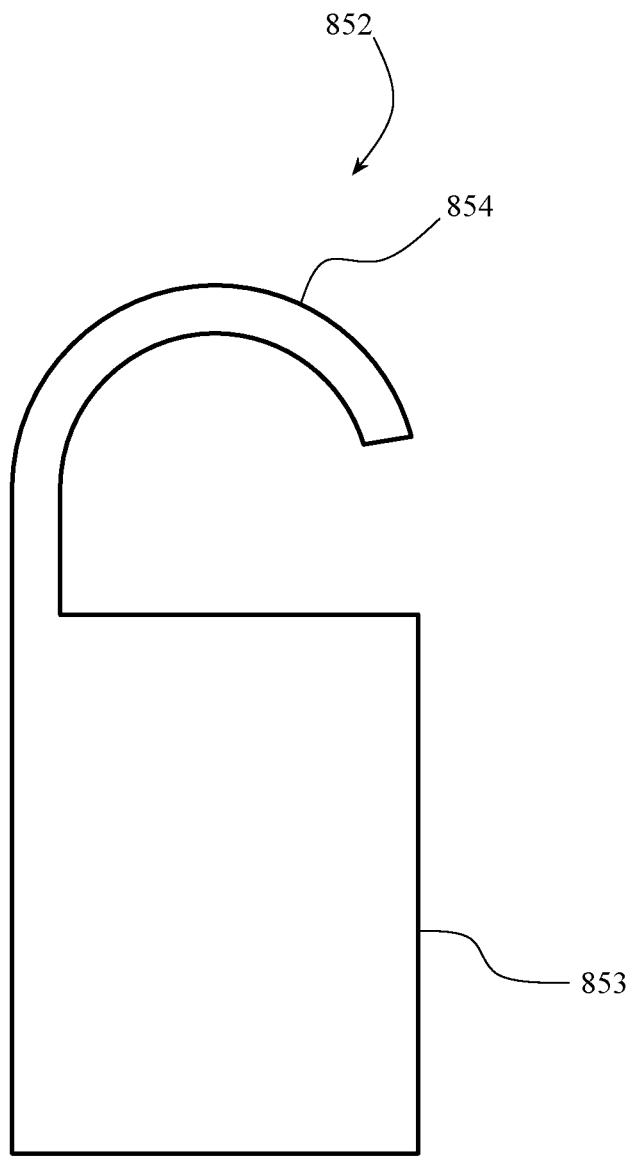
FIG. 21 illustrates a cross-sectional view of a component of FIG. 20.
Figure 22:
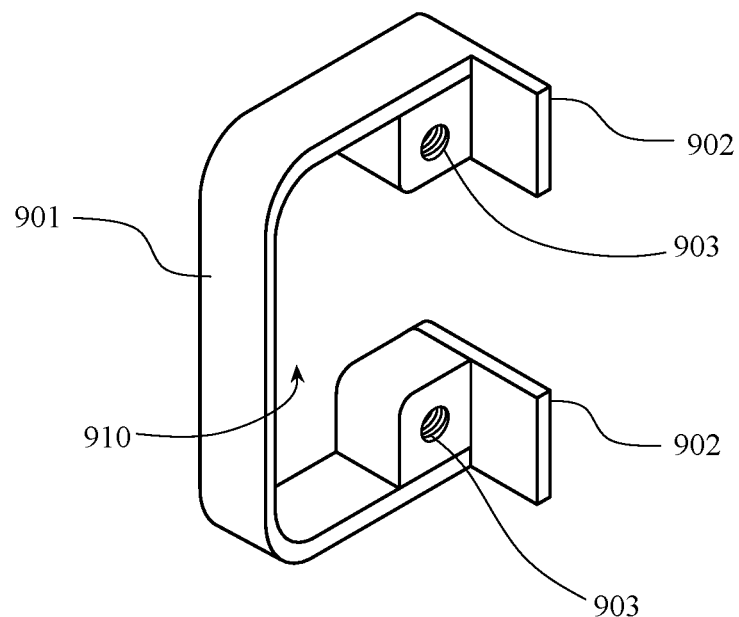
FIG. 22 illustrates a perspective view of a component of an electronic device.
Figures 23A, 23B:
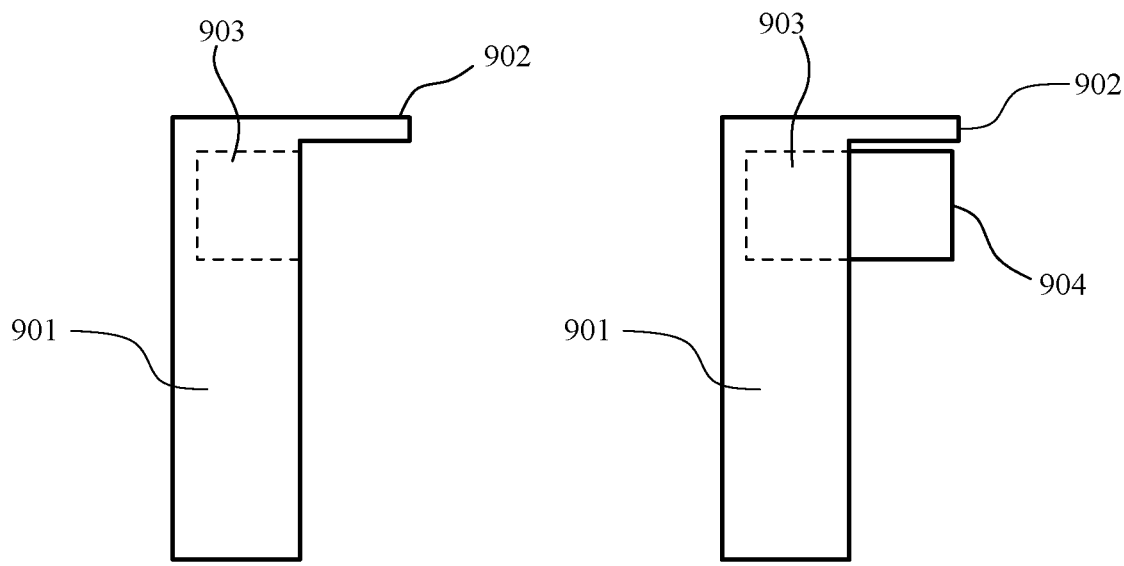
FIGS. 23A-B illustrate top views of the component of FIG. 22 in various configurations.

FIG. 21 illustrates a cross-sectional view of the seal 852, including a body 853 and a compressible lip 854 extending from the body 853. The lip 854 can extend around substantially the entire periphery of the body 853, although the orientation of the lip 854 with respect to the body 853 may vary along different portions of the seal 852. This variance can allow the flexible lip 854 to collapse in the correct direction, namely towards the body 853, when engaged by the shell, rather than being peeled away from the body 853, which may not provide a desired level of sealing. Thus, in some examples, the lip 854 is oriented with respect to the seal body 853 such that the shell compresses the lip 854 in a direction against the seal body 853 at a first position adjacent to the electronic component 830, for example, along a top portion of the seal 852, and in the direction against the seal body 853 at a second position adjacent to the electronic component 830 opposite the first position, for example, along the bottom portion of the seal 852. FIGS. 22 and 23A-B further describe details of additional components of an electronic device, as described herein.

FIG. 22 illustrates a perspective view of a cable retention component 901 of an electronic device. The cable retention component 901 can be substantially similar to the cable retention component 230 described with respect to FIG. 3. The cable retention component 901 can engage with a portion of the housing of an electronic device, such as a recess or slot, and can be removable from the housing by a user. In some examples, the cable retention component 901 can include a protrusion or flange 902 that can extend from the body of the component and can be sized to correspond and engage with the slot of the housing. In some examples, the cable retention component 901 can be secured by a magnet of the housing that is disposed adjacent to the area where the cable retention component 901 is to be positioned. The cable retention component 901 can at least partially define an aperture 910 and can combine with and attach to the housing to define an aperture sized to allow one or more cables to pass therethrough as, described above.

Figure 24:
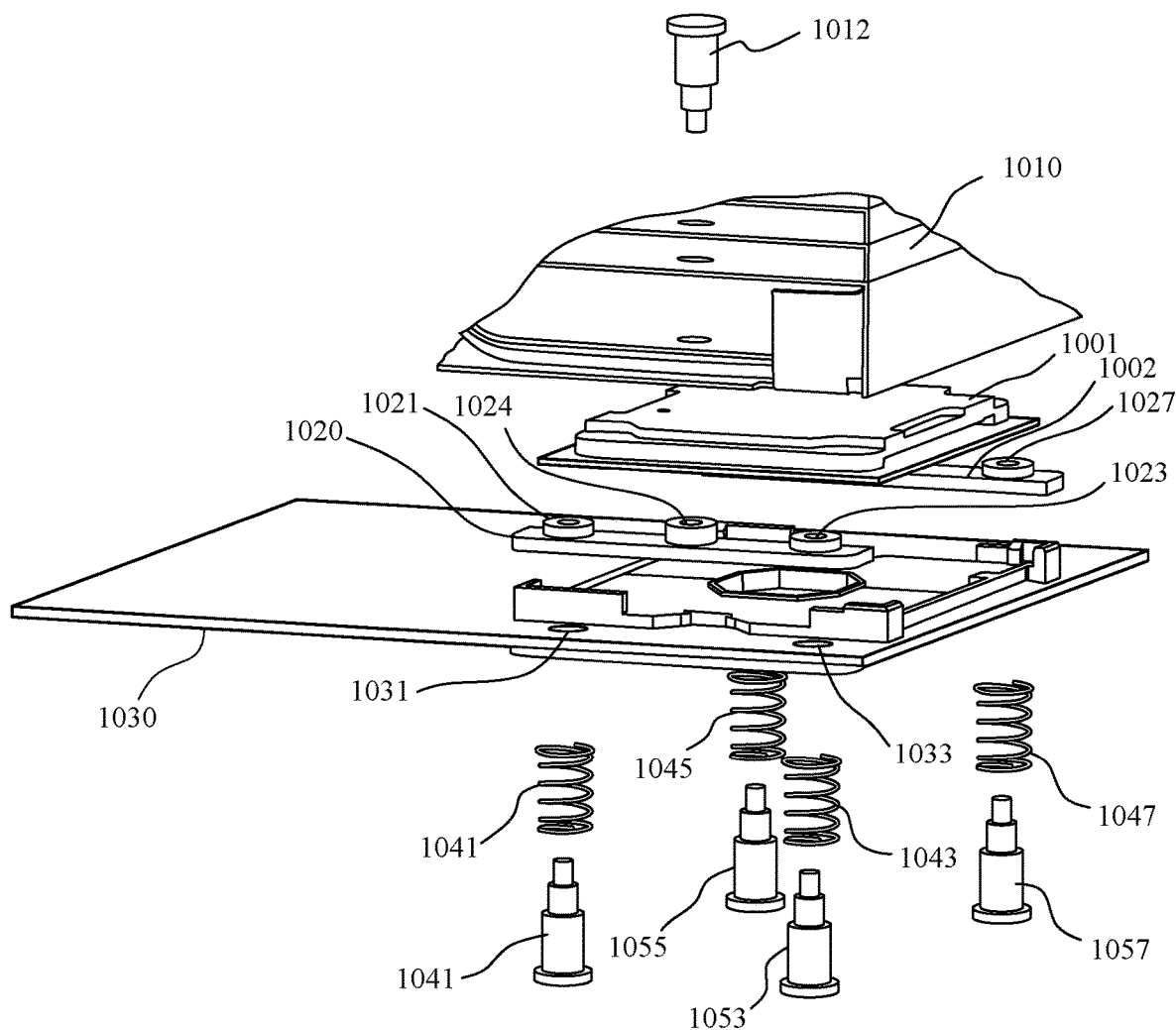
FIG. 24 illustrates an exploded cutaway view of a component of an electronic device.
Figure 25:
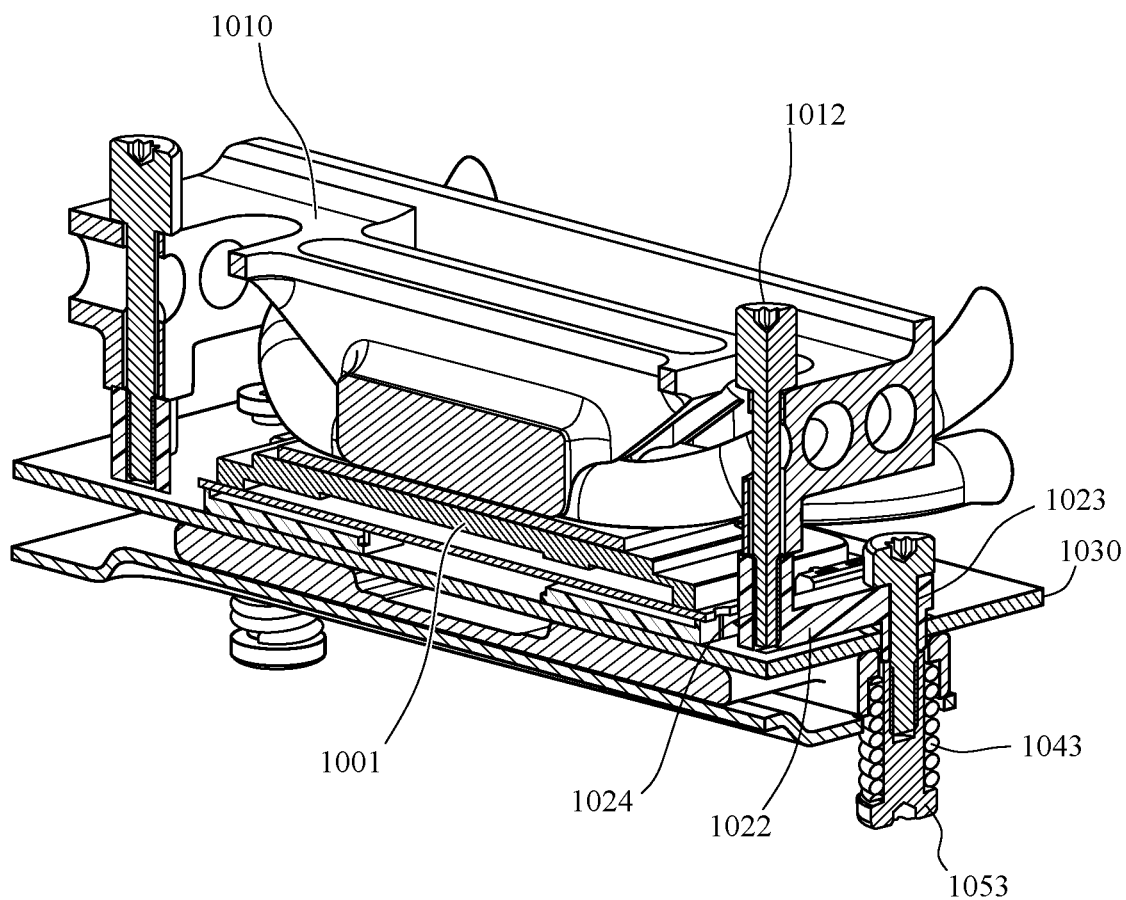
FIG. 25 illustrates a cross-sectional perspective view of the component of FIG. 24.

FIGS. 23A and 23B illustrate a top view of the cable retention component 901 including a recess 903 in the exterior surface of the cable retention component 901 illustrated with dashed lines. The recess 903 can house a pin 904 that is moveable between a first position inside the recess 903 as shown in FIG. 23A and a second position where the pin 904 extends at least partially outside of the recess 903 as shown in FIG. 23B. Thus, the pin 904 is at least partially retractable into the body of the cable retention component 901. In some examples, the cable retention component 901 can include a magnet within the body and/or within the recess 903 that can exert an attractive magnetic force on the pin 904 to retain it within the recess 903, for example, when the cable retention component 901 is not positioned on the electronic device. In use, for example, when the cable retention component 901 engages with the electronic device to define an aperture 910, a magnet included in or on the housing and disposed substantially adjacent to the recess 903 when the cable retention component 901 is attached to the housing can also exert an attractive force on the pin 904. In some examples, the magnet of the electronic device can exert a greater or stronger attractive force on the pin 904 than the magnet of the cable retention component 901 to cause the pin 904 to extend at least partially out of the recess 903. In some examples, the housing can include a recess or an additional feature that can engage the pin 904 once it has at least partially extended from the recess 903, to retain or assist in retaining the cable retention component 901 in a desired position on the housing. In some examples, the cable retention component 901 can include two or more pins and corresponding recesses. For example, as shown in FIG. 22, the cable retention component 901 can include two recesses 903 and two pins disposed therein. FIGS. 24 and 25 further describe details of additional components of an electronic device as described herein.

FIG. 24 illustrates an exploded view of a processor 1001 of an electronic device that can be substantially similar to the electronic device 100, 200, 400, 600, described herein, along with a heatsink assembly 1010 that is configured to contact and exert pressure on the processor 1001 to draw heat away from the processor 1001 and to assist with the thermal management of both the processor 1001 itself and the electronic device as a whole. In some examples, the processor 1001 can be a central processing unit of an electronic device and can be affixed to, disposed on, or otherwise attached to a logic board, such as any of the main logic boards 630, 730 described herein.

The heatsink assembly 1010 can be retained against the processor 1001 by one or more lifting components or lifters 1020, 1022 that can cooperate with a backplate 1030 and the heatsink assembly 1010 to cause the heatsink assembly 1010 exert a desired amount of pressure on the processor 1001. In some examples, the lifters 1020, 1022 and backplate 1030 can exert at least about 400 N on the processor 1001 through the heatsink assembly 1010. In some examples, the associated components of the electronic device can exert at least about 900 N, 1000 N, 1100 N, or an even greater amount of force on the processor 1001 through the heatsink assembly 1010. The pressure exerted on the processor 1001 by the heatsink assembly 1010 can provide for an intimate thermal contact between the processor 1001 and the heatsink assembly 1010, and can provide desired levels of thermal conduction away from the processor 1001 in order to achieve desired levels of processor performance. Additionally, as described herein, the geometry and configuration of the lifters 1020, 1022, heatsink assembly 1010, backplate 1030, processor 1001, and the electronic device can provide for airflow pathways over the heatsink assembly 1010 to allow for desired levels of thermal management, while still allowing access to the processor 1001 from a single side when the heatsink assembly 1010 is removed, for example, to allow for repair, replacement, or upgrade of the processor 1001.

Accordingly, in some examples, the processor 1001 can be disposed on or over the backplate 1030 such that the backplate 1030 underlies the processor 1001. The backplate can also define a number of backplate apertures 1031, 1033 that can be positioned substantially adjacent to a periphery of the processor 1001. A first lifter 1020 can be disposed over the backplate 1030 and substantially adjacent or near to a periphery of the processor 1001. The first lifter 1020 can have an elongated form, although it can be substantially any shape or design, as desired. The first lifter 1020 can define a first aperture 1021 that can be positioned near an end or edge of the first lifter 1020 and a second aperture 1023 that can be positioned near an end or edge of the first lifter 1020 opposite the first aperture 1021, although substantially any configuration of apertures can be used. The first lifter 1020 can be positioned such that the first and second apertures 1021, 1023 can be substantially in line with the apertures 1031, 1033 of the backplate 1030.

As illustrated in the cross-sectional view of FIG. 25, the first lifter 1020 can also define a lifting feature or attachment feature 1024 that can, for example, be centrally positioned on the first lifter 1020, although substantially any location can be used. The lifting feature 1024 can be configured to engage with a corresponding attachment member 1012 that can pass through an aperture of the heatsink assembly 1010 to engage lifting feature 1024 and secure the heatsink assembly 1010 thereto. The heatsink assembly 1010 can thus directly overlie the processor 1001 and can be coupled to the first lifter 1020 through attachment member 1012 and the lifting feature 1024. In some examples, the lifting feature 1024 can include threads and the attachment member 1012 can include corresponding threads such that the engagement between the two retains the heatsink assembly 1010 against the processor 1001.

The lifter 1020 can further include a first spring 1041 and a second spring 1043 underlying the backplate 1030 and substantially in line with the backplate aperture 1031, 1033. The first and second springs 1041, 1043 can be coupled to the backplate 1030 by corresponding retaining members 1051, 1053 that can extend at least partially through a spring 1041, 1043 and can engage with the lifter 1020, for example, through the apertures 1031, 1033 to cause the lifter 1020, and the attached heatsink assembly 1010, to exert a desired amount of force on the processor 1001.

Figure 26:
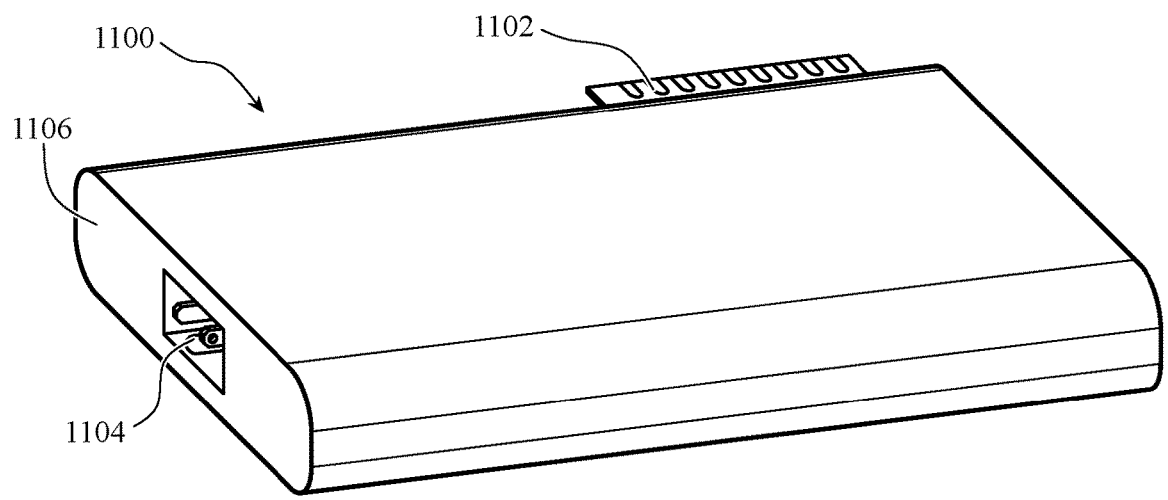
FIG. 26 illustrates a perspective view of a component of an electronic device.
Figure 27:
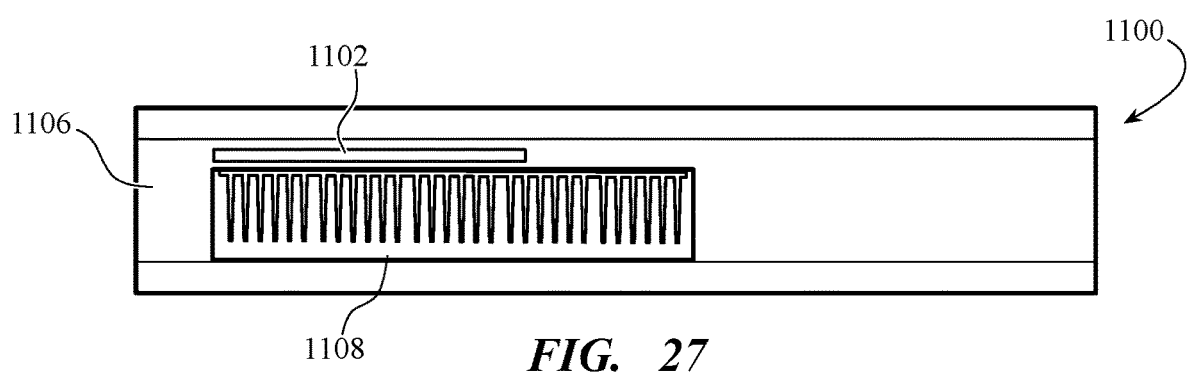
FIG. 27 illustrates a side view of the component of FIG. 26.
Figure 28:
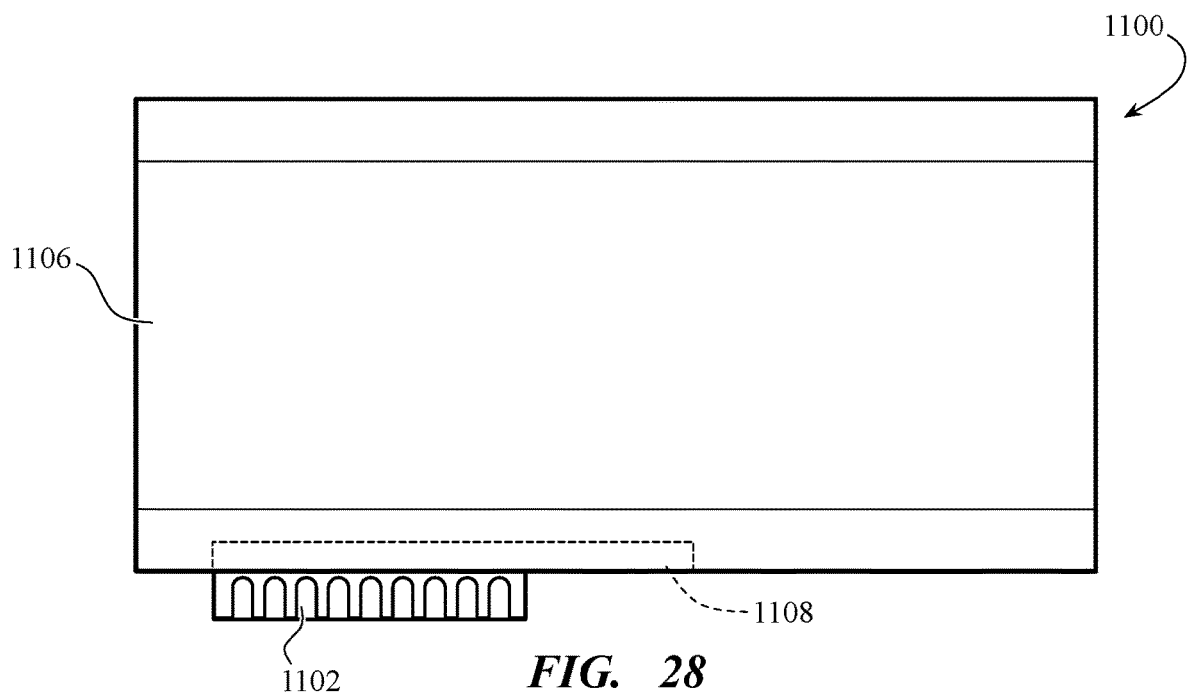
FIG. 28 illustrates a top view of the component of FIG. 26.

The electronic device can also include a second lifter 1022 that can be substantially similar to the first lifter 1020 and can likewise define apertures 1027 that can be in line with the apertures of the backplate 1030. Springs 1045, 1047 can be retained with retaining members 1055, 1057 in a similar manner as the first lifter 1020, and a second attachment member can engage with a lifting feature of the second lifter 1022 as described with respect to the first lifter 1020. Although two lifters are illustrated in the present example, any number of lifters can be used as desired. FIGS. 26, 27, and 28 further describe details of additional components of an electronic device, as described herein.

FIG. 26 illustrates a perspective view of a component of an electronic device, in this example, a power supply unit 1100. The power supply unit 1100 can be a component of any of the electronic devices described herein, including electronic devices 100, 200, 400, and 600. The power supply unit 1100 can also be substantially similar to, and can include any of the features of the power supply units 418 and 618 described herein.

As explained herein, in some examples, it can be desirable to cause air to flow directly at or through a particularly high-power component of an electronic device. In some examples, such a component can be positioned directly in an airflow pathway in the internal volume of the electronic device, for example, at a location of communication between a positive air pressure zone and a negative air pressure zone. In this way, a relatively large volume of air can be moved over or through the component to provide a desired level of thermal energy removal and thermal management for the component, such as the power supply unit 1100, and the electronic device as a whole.

In some examples, as described herein, the power supply unit 1100 can be positioned in an airflow pathway because it is typically the densest component of the electronic device, and prevents the largest obstruction to airflow. As such, it can be desirable to position the power supply unit 1100 in a high-volume airflow pathway. Further, in some examples, the power supply unit 1100 can be responsible for up to about 10% of the power, and thus generated thermal energy, for the components within the internal volume of the electronic device. Accordingly, in some examples, it can be desirable to provide high levels of air flow, and thus cooling, to the power supply unit 1100.

The power supply unit 1100 can include a housing or body 1106 that can define an exterior surface of the power supply unit 1100. In some examples, the body 1106 of the power supply 1100 has an approximately rectangular prismatic shape and can be formed by the combination of two mating components. According to one example, a first component can define a top exterior surface, a bottom exterior surface, and a first side exterior surface and a second component can define a front exterior surface, a back exterior surface, and a second side exterior surface disposed opposite the first side exterior surface. In some examples, the body 1106 can include or be formed from aluminum and can be, for example, anodized to a desired color.

The power supply unit 1100 can also include a connector or contact 1102 that can, for example, connect to an expansion slot or other interface on a main logic board, as described herein. Such a connection can allow for the electronic device to control the power supply unit 1100 and the power distributed from the power supply unit 1100. An alternating current (AC) power input port 1104 of the power supply unit 1100 can be used to connect to an external source of AC power which the power supply unit can transform into DC power for use by the components of the electronic device. In some examples, the AC input port or inlet 1104 can be electrically connected to the connector 1102 and mechanically connected to the body 1106 by an arm within the internal volume of the power supply, the AC input port 1104 can be configured to move at least about 0.3 mm, at least about 0.5 mm, or at least about 1 mm in two or more axes relative to the body 1106 of the power supply unit 1100. Further details of the power supply unit 1100 are provided below with reference to FIGS. 27 and 28.

FIG. 27 illustrates a side view of the power supply unit 1100, including a heatsink 1108. The heatsink 1108 can be thermally connected to the power supply unit to assist in distributing thermal energy generated by the power supply unit 1100 to the air flowing past the power supply unit 1100. In some examples, the heatsink 1108 can include any highly thermally conductive material, such as metallic materials like copper, aluminum, and other metals or alloys. As air moved by the air-moving system of the electronic device moves past the heatsink 1108, thermal energy is transferred to the air which is then expelled from the electronic device into the ambient environment, thereby cooling the power supply unit 1100 and the device.

FIG. 28 illustrates a top view of the power supply unit 1100. As can be seen, in some examples, the heatsink 1108 can be recessed in the body 1106 of the power supply unit 1100. This recess can provide for a pathway for air to flow to the heatsink 1108 and past the power supply unit 1100, thereby assisting in thermal management. In some examples, the recess can be aligned with an aperture in the main logic board of an electronic device to provide an airflow pathway between pressure zones of the device.

As noted above, any number or variety of components, as described herein, can be included in an electronic device. The components can include any combination of the features described herein and can be arranged in any of the configurations described herein. The structure and arrangement of an electronic device including a housing defining an internal volume divided into one or more zones by a component or components within the internal volume, as well as the concepts regarding zone pressures and airflow can apply not only to the specific examples discussed herein, but to any number of embodiments in any combination.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

As used herein, the terms exterior, outer, interior, inner, top, and bottom are used for reference purposes only. An exterior or outer portion of a component can form a portion of an exterior surface of the component but may not necessarily form the entire exterior of outer surface thereof. Similarly, the interior or inner portion of a component can form or define an interior or inner portion of the component but can also form or define a portion of an exterior or outer surface of the component. A top portion of a component can be located above a bottom portion in some orientations of the component, but can also be located in line with, below, or in other spatial relationships with the bottom portion depending on the orientation of the component.

Any direction, positional, and relational terms as used herein, for example, terms such as orthogonal, adjacent, and parallel, are intended to include not only the specific and exact direction, position, and/or relation, but also any direction, position, and/or relation that is within 1%, 5%, 10%, 15% or thereabouts. For example, the term orthogonal can be intended to refer not only to two bodies positioned at an angle of 90° relative to one another, but also two bodies positioned at any angle between 80° and 110° relative to one another.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A housing for an electronic device, comprising:
   a body having an exterior surface and a second surface disposed opposite the exterior surface at least partially defining an interior volume;
   the body defining a first repeating pattern of apertures having a first size extending from the exterior surface to the second surface; and
   a component defining a second repeating pattern of apertures having a second size different than the first size, the component positioned adjacent to the second surface;
   wherein an aperture of the first repeating pattern of apertures is aligned with at least two apertures of the second repeating pattern of apertures.

2. The housing of claim 1, wherein the first repeating pattern of apertures and the second repeating pattern of apertures reduce electromagnetic emissions by at least about 20 dBμV for frequencies between about 2 GHz and about 5 GHz.

3. The housing of claim 1, wherein the first repeating pattern of apertures form a continuous matrix of passageways.

4. The housing of claim 1, wherein the first repeating pattern of apertures and the second repeating pattern of apertures combine to define an open area of between about 75% and about 85%.

5. The housing of claim 1, wherein the component is bonded to the second surface by a pressure sensitive adhesive.

6. The housing of claim 1, wherein the component comprises a planar sheet of material having a thickness of about 3 mm.

7. The housing of claim 1, wherein the second repeating pattern of apertures comprises a pattern of circular apertures, each having a diameter of greater than about 2 mm.

8. The housing of claim 1,
   wherein the first repeating pattern of apertures and the second repeating pattern of apertures further comprise apertures that are not aligned, and wherein the first repeating pattern of apertures and the second repeating pattern of apertures combine to define an open area of at least about 70%.

9. The housing of claim 1, wherein the first repeating pattern of apertures and the second repeating pattern of apertures combine to define an open area of at least about 70%.

* * * * *